United States Patent
Muto et al.

(10) Patent No.: US 10,830,187 B1
(45) Date of Patent: Nov. 10, 2020

(54) ABNORMALITY DETECTION DEVICE OF FUEL VAPOR ESCAPE PREVENTION SYSTEM

(71) Applicant: TOYOTA JIDOSHA KABUSHIKI KAISHA, Toyota (JP)

(72) Inventors: Harufumi Muto, Miyoshi (JP); Akihiro Katayama, Toyota (JP); Yosuke Hashimoto, Nagakute (JP); Kazuki Tsuruoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/792,952

(22) Filed: Feb. 18, 2020

(30) Foreign Application Priority Data

Apr. 16, 2019 (JP) ................................. 2019-077760

(51) Int. Cl.
*F02M 25/08* (2006.01)
*G05B 13/02* (2006.01)

(52) U.S. Cl.
CPC .... *F02M 25/0809* (2013.01); *F02M 25/0836* (2013.01); *F02M 25/0854* (2013.01); *F02M 25/0872* (2013.01); *G05B 13/027* (2013.01)

(58) Field of Classification Search
CPC ........... F02M 25/0809; F02M 25/0854; F02M 25/0872; F02M 25/0836; G05B 13/027
See application file for complete search history.

(56) References Cited

U.S. PATENT DOCUMENTS

| 5,657,737 A * | 8/1997 | Ishida ................... F02D 41/047 123/674 |
| 5,781,700 A * | 7/1998 | Puskorius ........... F02D 41/1405 706/14 |
| 5,954,783 A * | 9/1999 | Yamaguchi ........... F02D 41/047 123/480 |
| 7,181,334 B2 * | 2/2007 | Kropinski ............. F02D 41/222 701/106 |
| 7,386,388 B2 * | 6/2008 | Akazaki .............. F02D 41/1405 123/435 |
| 8,818,676 B2 * | 8/2014 | Peng ....................... F02D 41/22 701/84 |
| 2020/0123990 A1 * | 4/2020 | Yokoyama .............. F02D 28/00 |
| 2020/0125042 A1 * | 4/2020 | Oyagi ...................... G06N 3/08 |
| 2020/0143607 A1 * | 5/2020 | Kitagawa ............ F02D 41/1405 |

FOREIGN PATENT DOCUMENTS

JP          2004-044396 A    2/2004

\* cited by examiner

*Primary Examiner* — Carl C Staubach
(74) *Attorney, Agent, or Firm* — Oblon, McClelland, Maier & Neustadt, L.L.P.

(57) ABSTRACT

At the time of stopping operation of the vehicle, the pressures inside of the fuel tank (5) and inside of the canister (6) detected at every constant time are stored in the storage device. A learned neural network using the pressures inside the fuel tank (5) and inside the canister (6) for each fixed time stored in the storage device and the atmospheric pressure as input parameters of the neural network and using a case where perforation occurs in the system causing fuel vapor to leak as a truth label is stored. At the time of stopping operation of the vehicle, a perforation abnormality causing fuel vapor to leak is detected from these input parameters by using the learned neural network.

8 Claims, 32 Drawing Sheets

FIG. 1
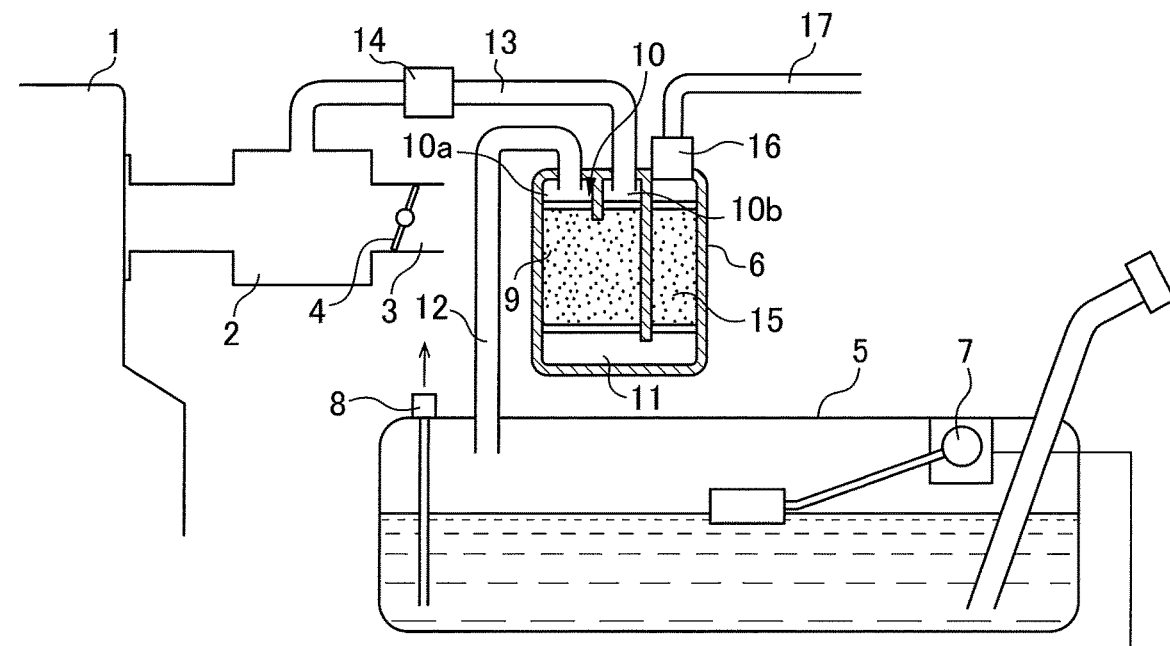
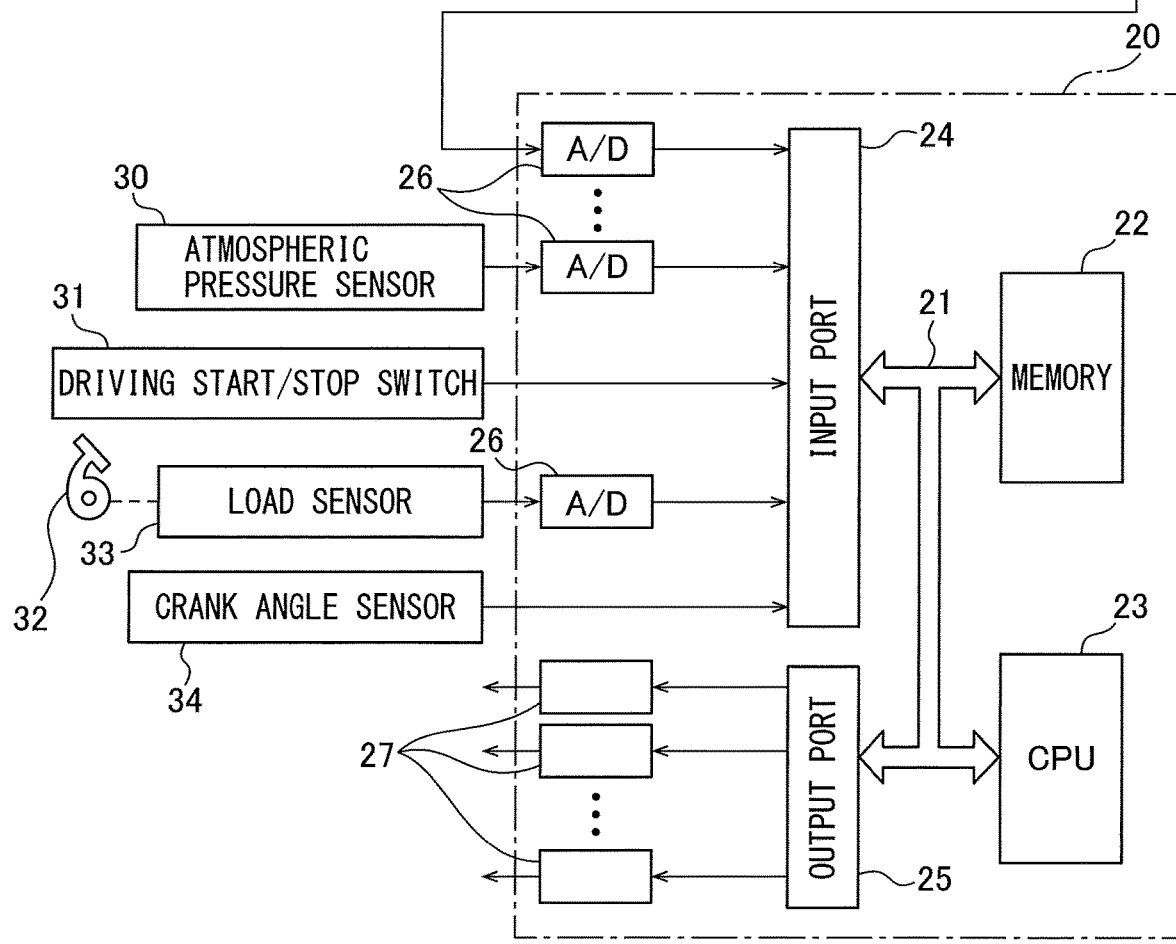

| | INPUT PARAMETERS |
|---|---|
| ESSENTIAL | SYSTEM INTERNAL PRESSURES $x_1, x_2 \cdots x_n$ AT DIFFERENT TIMES |
| | ATMOSPHERIC PRESSURE $xx_1$ |
| LARGE INFLUENCE | REMAINING AMOUNT OF FUEL $xx_2$ |
| AUXILIARY | TEMPERATURE OF FUEL $xx_3$ |
| | CHARACTERISTIC VALUE OF PUMP FLOW RATE $xx_4$ |

FIG. 15

| OUTPUT VALUE | STATE |
|---|---|
| $y_1', y_1$ | PERFORATION ABNORMALITY |
| $y_2', y_2$ | VALVE OPENING ABNORMALITY OF PURGE CONTROL VALVE |
| $y_3', y_3$ | VALVE CLOSING ABNORMALITY OF PURGE CONTROL VALVE |
| $y_4', y_4$ | NORMAL |

FIG. 16

| No. | $x_1$ | $x_2$ | ... | $x_n$ | $xx_1$ | ... | $xx_k$ | $yt_1$ | ... | $yt_s$ | |
|---|---|---|---|---|---|---|---|---|---|---|---|
| 1 | $x_{11}$ | $x_{21}$ | ... | $x_{n1}$ | $xx_{11}$ | ... | $xx_{k1}$ | $yt_{11}$ | ... | $yt_{s1}$ | |
| 2 | $x_{12}$ | $x_{22}$ | ... | $x_{n2}$ | $xx_{12}$ | ... | $xx_{k2}$ | $yt_{12}$ | ... | $yt_{s2}$ | |
| ... | ... | ... | ... | ... | ... | ... | ... | ... | ... | ... | |
| m−1 | $x_{1m-1}$ | $x_{2m-1}$ | ... | $x_{nm-1}$ | $xx_{1m-1}$ | ... | $xx_{km-1}$ | $yt_{1m-1}$ | ... | $yt_{sm-1}$ | |
| m | $x_{1m}$ | $x_{2m}$ | ... | $x_{nm}$ | $xx_{1m}$ | ... | $xx_{km}$ | $yt_{1m}$ | ... | $yt_{sm}$ | |

Groupings: $x_1 \ldots x_n$ → x; $xx_1 \ldots xx_k$ → xx; $yt_1 \ldots yt_s$ → yt.

FIG. 34

| OUTPUT VALUE | STATE |
|---|---|
| $y_1', y_1$ | PERFORATION ABNORMALITY |
| $y_2', y_2$ | VALVE OPENING ABNORMALITY OF PURGE CONTROL VALVE |
| $y_3', y_3$ | VALVE CLOSING ABNORMALITY OF PURGE CONTROL VALVE |
| $y_4', y_4$ | ABNORMALITY OF PRESSURE SENSOR |
| $y_5', y_5$ | ABNORMALITY OF FLOW PATH SWITCHING VALVE STICKING AT NORMAL POSITION |
| $y_6', y_6$ | ABNORMALITY OF FLOW PATH SWITCHING VALVE STICKING AT TEST POSITION |
| $y_7', y_7$ | ABNORMALITY OF SUCTION PUMP CONTINUING OPERATION |
| $y_8', y_8$ | ABNORMALITY OF SUCTION PUMP CONTINUING STOPPED |
| $y_9', y_9$ | NORMAL | under that US 10,830,187 B1

ABNORMALITY DETECTION DEVICE OF FUEL VAPOR ESCAPE PREVENTION SYSTEM

FIELD

The present invention relates to an abnormality detection device of a fuel vapor escape prevention system.

BACKGROUND

In an internal combustion engine, to prevent fuel vapor from escaping to the outside atmosphere, in the past use has been made of a fuel vapor escape prevention system comprising a canister formed with a fuel vapor chamber and atmospheric pressure chamber at the two sides of an activated carbon layer, making the fuel vapor chamber on the one hand communicate with an inside space above a fuel level of a fuel tank and on the other hand connecting it through a purge control valve to an intake passage of the engine. In such a fuel vapor escape prevention system, for example, if the walls of a fuel vapor flow pipe connecting the fuel vapor chamber and purge control valve of the canister are perforated by a hole, fuel vapor will end up escaping through the hole to the outside atmosphere.

Therefore, known in the art is a diagnosis device designed to detect a pressure at the inside space above the fuel level at the inside of the fuel tank (simply referred to as the "pressure inside the fuel tank") and diagnose if an abnormality has occurred in the fuel vapor escape prevention system from a change of the pressure inside the fuel tank, for example, if the walls of the fuel vapor flow pipe are perforated by a hole (for example, see Japanese Unexamined Patent Publication No. 2004-44396).

In this diagnosis device, by making the purge control valve open in the state where the atmospheric pressure chamber of the canister is cut off from the atmosphere when the vehicle is being driven steadily and stably, the pressure inside the fuel tank is lowered below the atmospheric pressure, then by making the purge control valve close, the inside of the fuel tank is made to be in a sealed state. At this time, for example, if the walls of the fuel vapor flow pipe are perforated by a hole, the pressure inside the fuel tank will rise a little at a time. Therefore, in this diagnosis device, when the pressure inside the fuel tank increases more than a fixed value after the inside of the fuel tank is made in a sealed state, for example, it is judged that the walls of the fuel vapor flow pipe are perforated by a hole.

SUMMARY

In this case, if the diameter of the hole formed in the walls of the fuel vapor flow pipe is small, the amount of rise of the pressure inside the fuel tank will become small. On the other hand, the pressure inside the fuel tank also fluctuates due to other factors, for example, the temperature of the fuel inside the fuel tank. Therefore, if it is judged that the walls of the fuel vapor flow pipe are perforated by a hole when the pressure inside the fuel tank increases more than a fixed value, there is the risk of mistaken judgment.

The present invention provides an abnormality detection device of a fuel vapor escape prevention system using a neural network to, for example, detect perforation of the walls of a fuel vapor flow pipe and able to accurately detect such perforation of the walls of the fuel vapor flow pipe even if, at this time, the diameter of the hole is small.

That is, according to the present invention, there is provided an abnormality detection device of a fuel vapor escape prevention system comprising:

a canister formed with a fuel vapor chamber and atmospheric pressure chamber at the two sides of an activated carbon layer, the fuel vapor chamber being on the one hand communicated with an inside space above a fuel level of a fuel tank and on the other hand communicated through a purge control valve with an intake passage of an engine, a flow path switching valve able to selectively connect the atmospheric pressure chamber to the atmosphere and a suction pump, and a pressure sensor detecting pressure at an inside of the fuel tank and inside of the canister, wherein at the time of stopping operation of the vehicle, processing for detection of an abnormality is performed to generate a valve closing instruction making the purge control valve close, a switching instruction switching a switched position of the flow path switching valve to a switched position at which the atmospheric pressure chamber is connected to the suction pump, and a pump operation instruction making the suction pump operate to make the inside of the fuel tank and inside of the canister a negative pressure, at the time the processing for detection of an abnormality is performed, a pressures at the inside of the fuel tank and inside of the canister detected by the pressure sensor at every fixed time are stored in a storage device, a learned neural network learned in weights using the pressures at the inside of the fuel tank and inside of the canister at every fixed time stored in the storage device and at least the atmospheric pressure when the processing for detection of an abnormality is performed as input parameters of the neural network and using a case where perforation occurs in the system causing leakage of fuel vapor as a truth label is stored, and at the time of stopping operation of the vehicle, a perforation abnormality causing fuel vapor to leak is detected from the above mentioned input parameters by using the learned neural network.

Furthermore, according to the present invention, there is provided an abnormality detection device of a fuel vapor escape prevention system comprising:

a canister formed with a fuel vapor chamber and atmospheric pressure chamber at the two sides of an activated carbon layer, the fuel vapor chamber being on the one hand communicated with an inside space above a fuel level of a fuel tank and on the other hand communicated through a purge control valve with an intake passage of an engine, a flow path switching valve able to selectively connect the atmospheric pressure chamber to the atmosphere and a suction pump, a passage from the flow path switching valve toward the atmospheric pressure chamber and a suction passage from the flow path switching valve toward the suction pump being connected by a reference pressure detection passage having a restricted opening, and a pressure sensor arranged in the suction passage from the flow path switching valve toward the suction pump, at the time of stopping operation of the vehicle, processing for detection of an abnormality is performed to generate a valve closing instruction making the purge control valve close, a pump operation instruction making the suction pump operate to make an inside of the fuel tank and inside of the canister a negative pressure while maintaining a switched position of the flow path switching valve at a switched position where the atmospheric pressure chamber is connected to the atmosphere when a predetermined time elapses after stopping operation of the vehicle, a switching instruction switching the switched position of the flow path switching valve to a switched position at which the atmospheric pressure chamber is connected to the suction pump after generation of the pump operation instruction, and a valve opening instruction making the purge control valve open after the generation of the switching instruction, at the time the processing for detection of an abnormality is performed, a pressures at the inside of the fuel tank and inside of the canister detected by the pressure sensor at every fixed time are stored in a storage device, a learned neural network learned in weights using the pressures at the inside of the fuel tank and inside of the canister at every fixed time stored in the storage device and at least the atmospheric pressure when the processing for detection of an abnormality is performed as input parameters of the neural network and using a case where perforation occurs in the system causing leakage of fuel vapor as a truth label is stored, and, at the time of stopping operation of the vehicle, a perforation abnormality causing fuel vapor to leak is detected from the above mentioned input parameters by using the learned neural network.

Advantageous Effects of Invention

By using the pressures at the inside of the fuel tank and inside of the canister detected by the pressure sensor at every fixed time and at least the atmospheric pressure as input parameters of the neural network for learning the weights of the neural network, for example, it is possible to accurately detect perforation of the walls of the fuel vapor flow pipe even if a small diameter hole is formed in the walls of the fuel vapor flow pipe.

BRIEF DESCRIPTION OF DRAWINGS

FIG. 1 is an overall view of a fuel vapor escape prevention system.

FIG. 15 is a view showing a list of output values.

FIG. 16 is a view showing a training data set.

FIG. 34 is a view showing a list of output values.

DESCRIPTION OF EMBODIMENTS

Overall Configuration of Internal Combustion Engine

Figure 2A:
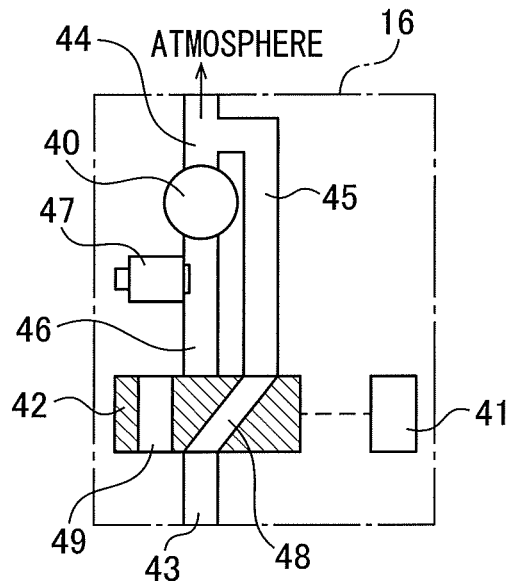
FIG. 2A and FIG. 2B are enlarged views schematically showing the pump module shown in FIG. 1.

FIG. 1 shows an overall view of a fuel vapor escape prevention system. Referring to FIG. 1, 1 indicates an engine body, 2 a surge tank, 3 an intake duct, 4 a throttle valve, 5 a fuel tank, and 6 a canister. At the fuel tank 5, a fuel level gauge 7 for detecting a height of a fuel level in the fuel tank 5 and a temperature sensor 8 for detecting a temperature of the fuel in the fuel tank are attached. On the other hand, the canister 6 has an activated carbon layer 9 and a fuel vapor chamber 10 and atmospheric pressure chamber 11 respectively arranged at the two sides of the activated carbon layer 9. Note that, in FIG. 1, the fuel vapor chamber 10 is formed from a first fuel vapor chamber 10a and a second fuel vapor chamber 10b, but this fuel vapor chamber 10 may also be configured from a single common fuel vapor chamber.

As shown in FIG. 1, the first fuel vapor chamber 10a is communicated through a fuel vapor flow pipe 12 to an inside space above a fuel level of the fuel tank 5, while the second fuel vapor chamber 1b is connected through a fuel vapor flow pipe 13 with the inside of the surge tank 2, that is, the inside of the intake passage. Inside this fuel vapor flow pipe 13, a purge control valve 14 is arranged. On the other hand, the atmospheric pressure chamber 11 is communicated through a small volume activated carbon layer 15 and suction pump module 16 to an atmosphere communication pipe 17.

In FIG. 1, 20 shows an electronic control unit for controlling engine operation and the fuel vapor escape prevention system. As shown in FIG. 1, the electronic control unit 20 is comprised of a digital computer provided with a storage device 22, that is, a memory 22, a CPU (microprocessor) 23, input port 24, and output port 25, which are connected with each other by a bidirectional bus 21. At the input port 24, an output signal of the fuel level gauge 7, an output signal of the temperature sensor 8, an output signal of an atmospheric pressure sensor 30 for detecting the atmospheric pressure, and an output signal of a driving start/stop switch 31 are input through respectively corresponding AD converters 26.

In a hybrid engine provided with an electric motor as a drive source, if the driving start/stop switch 31 is set to ON, operation of the vehicle by the engine or electric motor is started, while if the driving start/stop switch 31 is set to OFF, operation of the vehicle by the engine or electric motor is stopped. On the other hand, in an engine not provided with an electric motor as a drive source, if the driving start/stop switch 31 is set to ON, the engine is started and operation of the vehicle is started, while if the driving start/stop switch 31 is set to OFF, the engine is stopped and operation of the vehicle is stopped.

Further, as shown in FIG. 1, at an accelerator pedal 32, a load sensor 33 generating an output voltage proportional to an amount of depression of the accelerator pedal 32 is connected. The output voltage of the load sensor 33 is input through a corresponding AD converter 26 to the input port 24. Furthermore, at the input port 24, a crank angle sensor 34 generating an output pulse every time a crankshaft rotates by for example 30° is connected. In the CPU 33, the engine speed is calculated based on the output signal of the crank angle sensor 34. On the other hand, the output port 25 is connected through corresponding drive circuits 27 to the purge control valve 14, the suction pump module 16, and an actuator for the throttle valve 4.

Figure 2B:
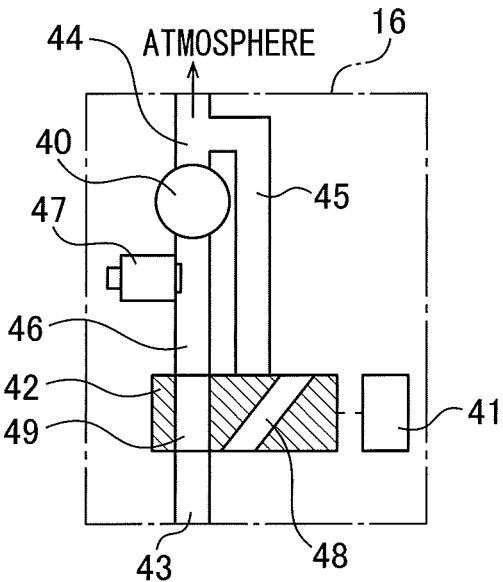

FIG. 2A and FIG. 2B are enlarged views schematically showing the suction pump module 16 shown in FIG. 1. Referring to FIG. 2A and FIG. 2B, the suction pump module 16 is provided with a suction pump 40 and a flow path switching valve 42 driven by an actuator 41. Furthermore, the suction pump module 16 has an atmospheric pressure chamber connection path 43 connected through the small volume activated carbon layer 15 to the atmospheric pressure chamber 11, an atmosphere communication pipe connection path 44 connected through an atmosphere communication pipe 17 to the atmosphere, an atmosphere communication path 45 extending from the atmosphere communication pipe connection path 44 to the flow path switching valve 42, and a suction passage 46 extending from the suction pump 40 toward the flow path switching valve 42. A pressure sensor 47 is arranged in the suction passage 46.

Inside the flow path switching valve 42, a first passage 48 able to connect the atmospheric pressure chamber connection path 43 and the atmosphere communication path 45 as shown in FIG. 2A and a second passage 49 able to connect the atmospheric pressure chamber connection path 43 and the suction passage 46 as shown in FIG. 2B are formed. The flow path switching valve 42 is normally, as shown in FIG. 2A, held at a position where the atmospheric pressure chamber connection path 43 is connected through the first passage 48 to the atmosphere communication path 45. At this time, the atmospheric pressure chamber 11 is communicated to the atmosphere through the small volume activated carbon layer 15, atmospheric pressure chamber connection path 43, first passage 48, atmosphere communication path 45, atmosphere communication pipe connection path 44, and atmosphere communication pipe 17. As shown in FIG. 2A, the switched position of the flow path switching valve 42 at which the atmospheric pressure chamber 11 is communicated with the atmosphere is referred to as the "normal position".

On the other hand, when detecting an abnormality of the fuel vapor escape prevention system, the flow path switching valve 42 is switched to a position at which the atmospheric pressure chamber connection path 43 is connected to the suction passage 46 through the second passage 49 as shown in FIG. 2B. The position where the atmospheric pressure chamber 11 is connected to the suction passage 46 as shown in FIG. 2B is referred to as the "test position". If at this time operating the suction pump 40, the air inside the atmospheric pressure chamber 11 is sucked in through the small volume activated carbon layer 15, atmospheric pressure chamber connection path 43, second passage 49, and suction passage 46. If at this time the purge control valve 14 is closed, the pressure at the inside of the fuel tank 5, the inside of the canister 6, the inside of the fuel vapor flow pipe 12, and the inside of the fuel vapor flow pipe 13 between the canister 6 and the purge control valve 14 falls. Note that, below, the pressure at the inside of the fuel tank 5, the inside of the canister 6, the inside of the fuel vapor flow pipe 12, and the inside of the fuel vapor flow pipe 13 between the canister 6 and the purge control valve 14 will be simply referred to as the "pressure of the inside of the fuel tank 5 and the inside of the canister 6". Further, in this embodiment according to the present invention, the pressure detected by the pressure sensor 47 will be referred to as the "pressure inside the fuel vapor escape prevention system", that is, the system internal pressure. Therefore, when the pressure of the inside of the fuel tank 5 and the inside of the canister 6 is detected by the pressure sensor 47, the pressure of the inside of the fuel tank 5 and the inside of the canister 6 becomes the system internal pressure.

Figure 3:
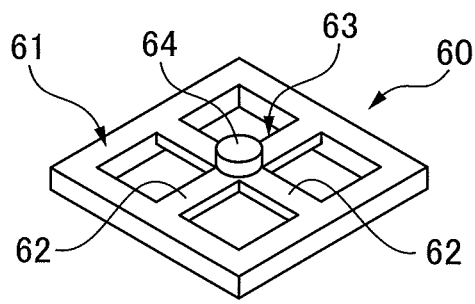
FIG. 3 is a perspective view of the gravity sensor.
Figure 4:
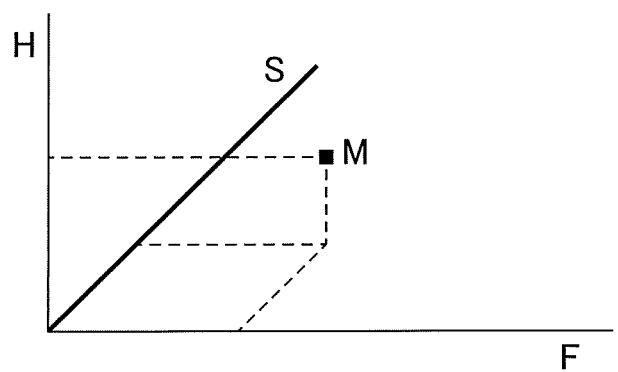
FIG. 4 is a view showing a remaining amount of fuel in the fuel tank.

Next, referring to FIG. 3 and FIG. 4, the method of accurately finding the remaining amount of fuel in the fuel tank 5 will be simply explained using the case of using a gravity sensor as an example. As shown in FIG. 3, the gravity sensor 60 is comprised of a square-shaped frame 61, a cross-shaped sheet 63 having four sheet-shaped arms 62 supported by the frame 61, and a weight 64 attached to a center part of the cross-shaped sheet 63. At the arms 62 of the cross-shaped sheet 63, strain gauges are respectively attached. This gravity sensor 60 is attached to the vehicle so that the frame 61 is positioned inside a horizontal plane when the vehicle is stopped on a horizontal surface.

Gravity acts on the weight 64 in the vertical direction, so force downward in the vertical direction acts at the center of the cross-shaped sheet 63. At this time, if the frame 61 is positioned in a horizontal plane, the amounts of strain of the arms 62 are the same. Therefore, when the vehicle is stopped on a horizontal surface, the amounts of strain of the arms 62 become the same. As opposed to this, if the vehicle is stopped inclined with respect to the horizontal plane, the amounts of strain of the arms 62 become different values. The direction of inclination and amount of inclination of the vehicle with respect to the horizontal plane can be learned from the differences in amounts of strain of the arms 62. On the other hand, the height of the fuel level inside of the fuel tank 5 when the vehicle is positioned on a flat surface can be learned from the detected value of the fuel level gauge 7.

Therefore, no matter what shape the fuel tank 5, the remaining amount of fuel in the fuel tank 5 can be learned from the detected value of the fuel level gauge 7 and the direction of inclination and amount of inclination of the vehicle with respect to the horizontal plane detected by the gravity sensor 60. Therefore, in this example, as shown in FIG. 4, the relationship among the amount of inclination F in the longitudinal direction of the vehicle detected by the gravity sensor 60, the amount of inclination S in the lateral direction of the vehicle, the detected value H of the fuel level gauge 7, and the remaining amount M of the fuel at the inside of the fuel tank 5 is found in advance by experiments and the remaining amount M of fuel at the inside of the fuel tank 5 is found based on the relationship shown in FIG. 4.

Figure 5:
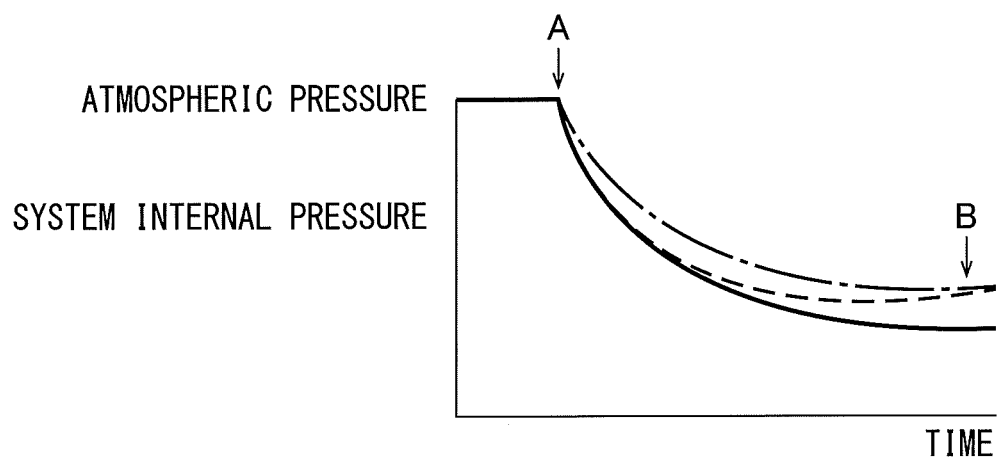
FIG. 5 is a view showing a change in the system internal pressure.

Next, the basic thinking of the present invention will be explained. As will be understood from FIG. 1 and FIG. 2B, if closing the purge control valve 14, switching the flow path switching valve 42 to the test position, and in that state operating the suction pump 40, the pressure in the fuel tank 5, in the canister 6, in the fuel vapor flow pipe 12, and in the fuel vapor flow pipe 13 between the canister 6 and the purge control valve 14, that is, the system internal pressure, will fall. The change in the system internal pressure at this time is shown in FIG. 5. Note that, in FIG. 5, the point A shows when the suction action by the suction pump 40 is started while the point B shows when there is no longer a pressure drop.

Now then, in FIG. 5, a solid line shows the case where the fuel vapor escape prevention system is normal, while the broken line, for example, shows the case where the walls of the fuel vapor flow pipe 12 are perforated by a hole or where the walls of the fuel vapor pipe 13 between the canister 6 and the purge control valve 14 are perforated by a hole. If the walls of the fuel vapor flow pipe 12 or 13 are perforated by a hole, outside air flows in from the hole, so the pressure at the point B, as shown by the broken line, becomes higher than that at the normal time shown by the solid line. Therefore, it becomes possible to judge if the walls of the fuel vapor flow pipe 12 or 13 are perforated by a hole from the magnitude of the pressure at the point B.

On the other hand, a dash dot line of FIG. 5 shows the case where the walls of the fuel vapor flow pipe 12 or 13 are not perforated by a hole, but for some reason of another, the amount of evaporation of fuel per unit time in the fuel tank 5 increases, for example, when the temperature of the fuel in the fuel tank 5 is higher than the case shown by the solid line. In this case as well, in the same way as when the walls of the fuel vapor flow pipe 12 or 13 are perforated by a hole shown by the broken line, the pressure at the point B becomes higher than that at the normal time shown by the solid line. Therefore, if judging that the walls of the fuel vapor flow 12 or 13 are perforated by a hole just because the pressure at the point B becomes higher than the normal time shown by the solid line, a mistaken judgment would be caused.

However, if the walls of the fuel vapor circulation pipe 12 or 13 are perforated by a hole, that is, in the case shown by the broken line, compared with the cases shown by the solid line and the dash and dot line, the degree of drop of pressure will become smaller in the middle of the drop in pressure, and the overall shape of the curve of the drop differs between the case shown by the broken line and the cases shown by the solid line and the dash and dot line. Therefore, if finding the overall shape of the curve of the pressure drop, it becomes possible to accurately judge if the walls of the fuel vapor flow pipe 12 or 13 are perforated by a hole from the differences in the overall shape of the curve of the pressure drop. Therefore, in the present invention, the system internal pressure is detected at every fixed time, and a neural network is used to judge if an abnormality occurs in the fuel vapor escape prevention system based on the system internal pressure detected at every fixed time.

Summary of Neural Network

Figure 6:
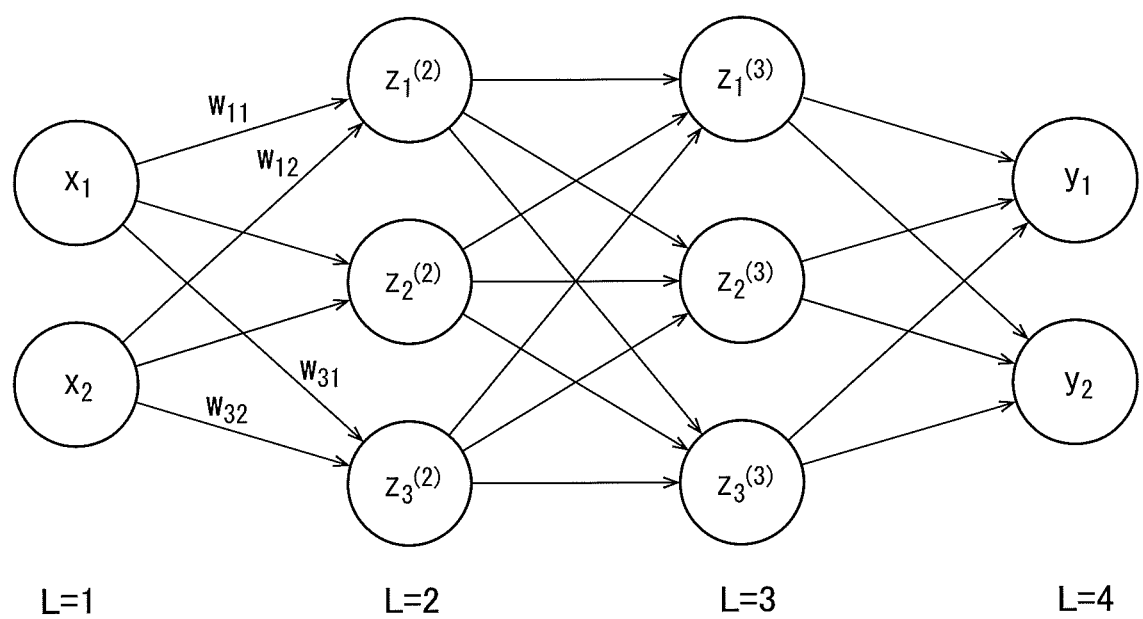
FIG. 6 is a view showing one example of a neural network.
Figure 12:
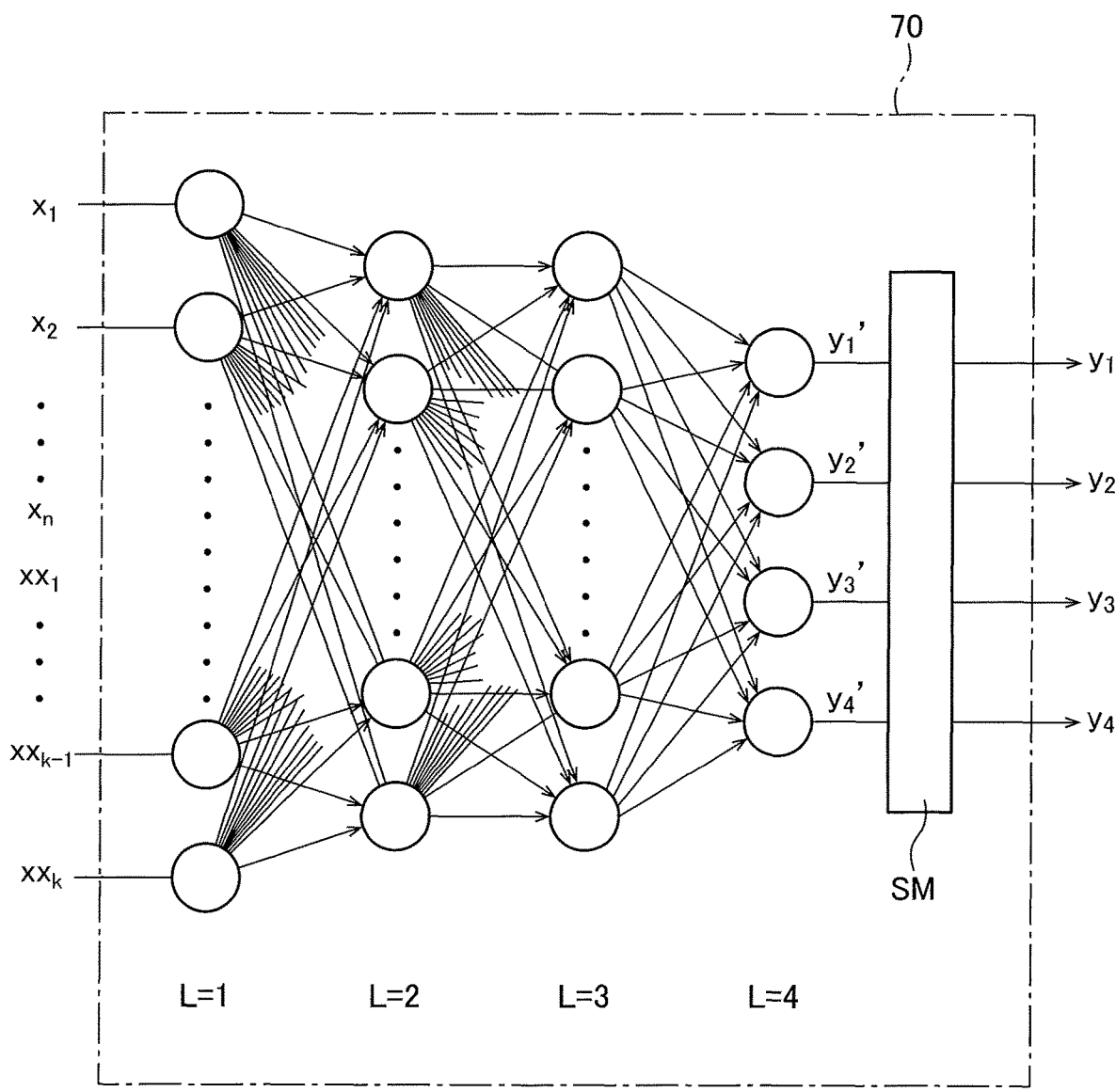
FIG. 12 is a view showing a neural network used in an example of the present invention.

As explained above, in the embodiment according to the present invention, a neural network is used to judge if an abnormality occurs in the fuel vapor escape prevention system. Therefore, first, a neural network will be briefly explained. FIG. 6 shows a simple neural network. The circle marks in FIG. 6 show artificial neurons. In the neural network, these artificial neurons are usually called "nodes" or "units" (in the present application, they are called "nodes"). In FIG. 12, L=1 shows an input layer, L=2 and L=3 show hidden layers, and L=4 shows an output layer. Further, in FIG. 6, $x_1$ and $x_2$ show output values from nodes of the input layer (L=1), $y_1$ and $y_2$ show output values from the nodes of the output layer (L=4), $z^{(2)}_1$, $z^{(2)}_2$, and $z^{(2)}_3$ show output values from the nodes of one hidden layer (L=2), and $z^{(3)}_1$, $z^{(3)}_2$, and $z^{(3)}_3$ show output values from the nodes of another hidden layer (L=3). Note that, the numbers of hidden layers may be made one or any other numbers, while the number of nodes of the input layer and the numbers of nodes of the hidden layers may also be made any numbers. Further, the number of nodes of the output layer may be made a single node, but may also be made a plurality of nodes.

At the nodes of the input layer, the inputs are output as they are. On the other hand, the output values $x_1$ and $x_2$ of the nodes of the input layer are input at the nodes of the hidden layer (L=2), while the respectively corresponding weights "w" and biases "b" are used to calculate sum input values "u" at the nodes of the hidden layer (L=2). For example, a sum input value $u_k$ calculated at a node shown by $z^{(2)}_k$ (k=1, 2, 3) of the hidden layer (L=2) in FIG. 6 becomes as shown in the following equation:

[Equation 1]

$$U_k = \sum_{m=1}^{n} (x_m \cdot w_{km}) + b_k$$

Next, this sum input value $u_k$ is converted by an activation function "f" and is output from a node shown by $z^{(2)}_k$ of the hidden layer (L=2) as an output value $z^{(2)}_k$ (=f($u_k$)). On the other hand, the nodes of the hidden layer (L=3) receive as input the output values $z^{(2)}_1$, $z^{(2)}_2$, and $z^{(2)}_3$ of the nodes of the hidden layer (L=2). At the nodes of the hidden layer (L=3), the respectively corresponding weights "w" and biases "b" are used to calculate the sum input values "u" (Σz·w+b). The sum input values "u" are similarly converted by an activation function and output from the nodes of the hidden layer (L=3) as the output values $z^{(3)}_1$, $z^{(3)}_2$, and $z^{(3)}_3$. As this activation function, for example, a Sigmoid function σ is used.

On the other hand, at the nodes of the output layer (L=4), the output values $z^{(3)}_1$, $z^{(3)}_2$, and $z^{(3)}_3$ of the nodes of the hidden layer (L=3) are input. At the nodes of the output layer, the respectively corresponding weights "w" and biases "b" are used to calculate the sum input values "u" (Σz·w+b) or just the respectively corresponding weights "w" are used to calculate the sum input values "u" (Σz·w). For example, at the regression problem, at the nodes of the output layer, an identity function is used, therefore, from the nodes of the output layer, the sum input values "u" calculated at the nodes of the output layer are output as they are as the output values "y".

Learning in Neural Network

Now then, if designating the teacher data showing the truth values of the output values "y" of the neural network, that is, the truth data, as $y_t$, the weights "w" and biases "b" in the neural network are learned using the error backpropagation algorithm so that the difference between the output values "y" and the teacher data, that is, the truth data $y_t$, becomes smaller. This error backpropagation algorithm is known. Therefore, the error backpropagation algorithm will be explained simply below in its outlines. Note that, a bias "b" is one kind of weight "w", so below, a bias "b" will be also be included in what is referred to as a weight "w". Now then, in the neural network such as shown in FIG. 6, if the weights at the input values $u^{(L)}$ to the nodes of the layers of L=2, L=3, or L=4 are expressed by $w^{(L)}$, the differential due to the weights $w^{(L)}$ of the error function E, that is, the slope $\partial E/\partial w^{(L)}$, can be rewritten as shown in the following equation:

[Equation 2]

$$\partial E/\partial w^{(L)} = (\partial E/\partial u^{(L)})(\partial u^{(L)}/\partial w^{(L)}) \quad (1)$$

where, $z^{(L-1)} \cdot \partial w^{(L)} = \partial u^{(L)}$ so if $(\partial E/\partial u^{(L)}) = \delta^{(L)}$, the above equation (1) can be shown by the following equation:

[Equation 3]

$$\partial E/\partial w^{(L)} = \delta^{(L)} \cdot z^{(L-1)} \quad (2)$$

where, if $u^{(L)}$ fluctuates, fluctuation of the error function E is caused through the change in the sum input value $u^{(L+1)}$ of the following layer, so $\delta^{(L)}$ can be expressed by the following equation:

[Equation 4]

$$\delta^{(L)} = (\partial E/\partial u^{(L)}) = \sum_{k=1}^{k} (\partial E/\partial u_k^{(L+1)})(\partial u_k^{(L+1)}/\partial u^{(L)}) (k=1, 2 \ldots) \quad (3)$$

where, if expressing $z^{(L)} = f(u^{(L)})$, the input value $u_k^{(L+1)}$ appearing at the right side of the above equation (3) can be expressed by the following formula:

[Equation 5]

$$\text{Input values } u_k^{(L+1)} = \sum_{k=1}^{k} w_k^{(L+1)} \cdot z^{(L)} = \sum_{k=1}^{k} w_k^{(L+1)} \cdot f(u^{(L)}) \quad (4)$$

where, the first term $(\partial E/\partial u^{(L+1)})$ at the right side of the above equation (3) is $\delta^{(L+1)}$, and the second term $(\partial u_k^{(L+1)}/\partial u^{(L)})$ at the right side of the above equation (3) can be expressed by the following equation:

[Equation 6]

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (5)$$

Therefore, $\delta^{(L)}$ is shown by the following formula.

[Equation 7]

$$\delta^{(L)} = \sum_{k=1}^{k} w_k^{(L+1)} \cdot \delta^{(L+1)} \cdot f'(u^{(L)}) \quad (6)$$

That is $\delta^{(L-1)} = \sum_{k=1}^{k} w_k^{(L)} \cdot \delta^{(L)} \cdot f'(u^{(L-1)})$.

That is, if $\delta^{(L+1)}$ is found, $\delta^{(L)}$ can be found.

Now then, if there is a single node of the output layer (L=4), teacher data, that is, truth data $y_t$, is found for a certain input value, and the output values from the output layer corresponding to this input value are "y", if the square error is used as the error function, the square error E is found by $E=1/2(y-y_t)^2$. In this case, at the node of the output layer (L=4), the output values "y" become $f(u^{(L)})$, therefore, in this case, the value of $\delta^{(L)}$ at the node of the output layer (L=4) becomes like in the following equation:

[Equation 8]

$$\delta^{(L)} = \partial E/\partial u^{(L)} = (\partial E/\partial y)(\partial y/\partial u^{(L)}) = (y-y_t) \cdot f'(u^{(L)}) \quad (7)$$

In this case, in the regression problem, as explained above, $f(u^{(L)})$ is an identity function and $f'(u^{(L)})=1$. Therefore, this leads to $\delta^{(L)} = y - y_t$ and $\delta^{(L)}$ is found.

If $\delta^{(L)}$ is found, the above equation (6) is used to find the $\delta^{(L-1)}$ of the previous layer. The $\delta$'s of the previous layer are successively found in this way. Using these values of $\delta$'s, from the above equation (2), the differential of the error function E, that is, the slope $\partial E/\partial w^{(L)}$, is found for the weights "w". If the slope $\partial E/\partial w^{(L)}$ is found, this slope $\partial E/\partial w^{(L)}$ is used to update the weights "w" so that the value of the error function E decreases. That is, the weights "w" arc learned.

On the other hand, in the classification problem, at the time of learning, the output values $y_1, y_2 \ldots$ from the output layer (L=4) are input to a softmax layer. If defining the output values from the softmax layer as $y_1', y_2' \ldots$ and the corresponding truth labels as $y_{t1}, y_{t2} \ldots$ as the error function E, the following cross entropy error E is used.

[Equation 9]

Cross entropy error $\quad (8)$ $$E = -\sum_{k=1}^{n} y_{tk} \log y_k' \quad (\text{"}n\text{" is number of nodes of output layer})$$

In this case as well, the values of $\delta^{(L)}$ at the nodes of the output layer (L=4) become $\delta^{(L)} = y_k - y_{tk}$ (k=1, 2 ... n). From the values of these $\delta^{(L)}$, the $\delta^{(L-1)}$ of the previous layers are found using the above equation (6).

Embodiments of Present Invention

Figure 7:
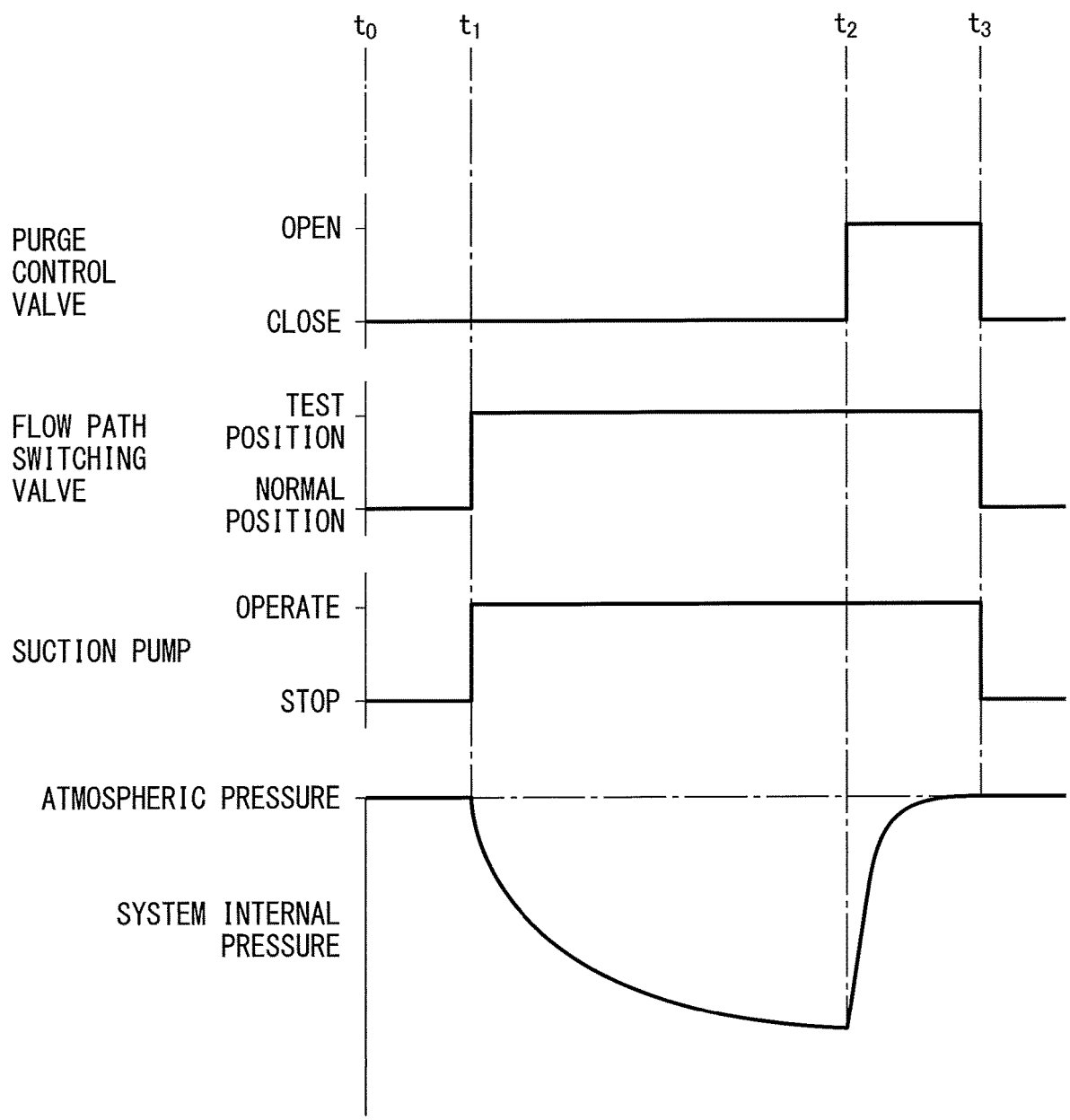
FIG. 7 is a view showing processing for detection of an abnormality and a change in the system internal pressure.

First, referring to FIG. 7, the processing for detection of an abnormality performed at the time of stopping operation of the vehicle for judging if an abnormality occurs in the fuel vapor escape prevention system will be explained. FIG. 7 shows a valve closing instruction for making the purge control valve 14 close, a valve opening instruction for making the purge control valve 14 open, a switching instruction switching the flow path switching valve 42 to the normal position, a switching instruction for switching the flow path switching valve 42 to the test position, an instruction for operating the suction pump 40 and an instruction for stopping the suction pump 40, and a change in the system internal pressure detected by the pressure sensor 47. Note that, in this example, the system internal pressure shows the pressure at the inside of the fuel tank 5 and the inside of the canister 6.

In FIG. 7, t0 shows the time of stopping operation of the vehicle. At this time, the valve closing instruction making the purge control valve 14 close, the switching instruction switching the flow path switching valve 42 to the normal position, and the instruction for stopping the suction pump 40 are issued. FIG. 7 shows the times when the purge control valve 14, flow path switching valve 42, and suction pump 40 are operating normally based on these instructions. Therefore, at the time of stopping operation of the vehicle, the purge control valve 14 is made to close, the flow path switching valve 42 is switched to the normal position, and the suction pump 40 is made to stop. This state is continued for a fixed time period from the time of stopping operation of the vehicle to the time $t_1$. During this fixed time period, the suction pump 40 continues stopped, so the suction action by the suction pump 40 is not performed. Therefore, the system internal pressure detected by the pressure sensor 47 becomes atmospheric pressure.

Next, if reaching the time $t_1$, the switching instruction switching the flow path switching valve 42 to the test position and the instruction for operating the suction pump 40 are issued. On the other hand, the valve closing instruction continues to be issued to the purge control valve 14. At this time, the inside of the fuel tank 5, the inside of the canister 6, the inside of the fuel vapor flow pipe 12, and the inside of the fuel vapor flow pipe 13 between the canister 6 and the purge control valve 14 form a sealed space isolated from the atmosphere. If the suction pump 40 is made to operate in such a state, the air inside this sealed space is gradually sucked in by the suction pump 40. As a result, the pressure at the inside of the fuel tank 5 and the inside of the canister 6, that is, the system internal pressure detected by the pressure sensor 47, gradually falls. Next, around when reaching the time t2, no pressure drop occurs any longer and the system internal pressure hovers at the dropped state.

If reaching the time t2, the valve opening instruction making the purge control valve 14 open is issued. On the other hand, at this time, the flow path switching valve 42 is maintained at the test position and the suction pump 40 continues to be operated. Therefore, at this time, the suction action by the suction pump 40 is continued, but the purge control valve 14 is made to open, so the system internal pressure rapidly rises and becomes atmospheric pressure. Next, if reaching the time $t_3$, the purge control valve 14, flow path switching valve 42, and suction pump 40 are returned to the states at the time of stopping operation of the vehicle. That is, if reaching the time $t_3$, the valve closing instruction making the purge control valve 14 close, the switching instruction switching the flow path switching valve 42 to the normal position, and the instruction for stopping the suction pump 40 are issued.

On the other hand, if an abnormality occurs in the fuel vapor escape prevention system, the pattern of change in the system internal pressure detected by the pressure sensor 47 becomes a pattern of change different from the pattern of change in the system internal pressure at the normal time shown in FIG. 7. Next, this will be explained while referring to FIG. 8 to FIG. 10. Note that, FIG. 8 to FIG. 10, in the same way as FIG. 7, show a valve closing instruction making the purge control valve 14 close and a valve opening instruction making the purge control valve 14 open, a switching instruction switching the flow path switching valve 42 to the normal position and a switching instruction switching the flow path switching valve 42 to the test position, an instruction for operating the suction pump 40 and an instruction for stopping the suction pump 40, and a change in the system internal pressure detected by the pressure sensor 47. Further, in FIG. 8 to FIG. 10, the broken lines show the patterns of change in the system internal pressure at the normal time shown in FIG. 7.

Figure 8:
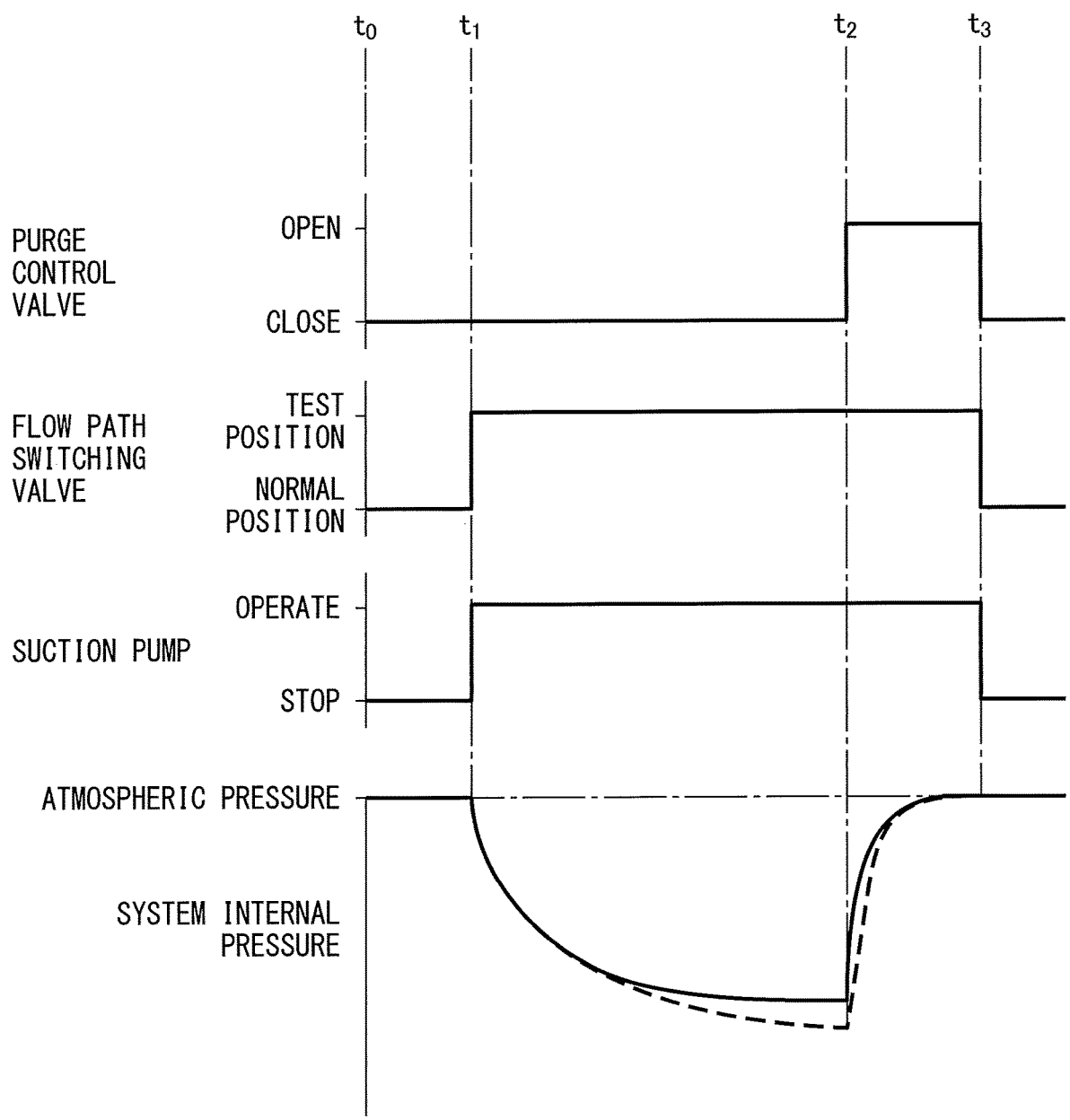
FIG. 8 is a view showing processing for detection of an abnormality and a change in the system internal pressure.

The solid line in FIG. 8 show the pattern of change in the system internal pressure in the case, for example, where the walls of the fuel vapor flow pipe 12 or 13 are perforated by a small hole. In this case, outside air continues to flow into the system through the small hole, so the system internal pressure does not fall to the system internal pressure at the normal time. Therefore, the pattern of change in the system internal pressure in this case becomes a pattern of change different from the pattern of change in the system internal pressure at the normal time.

Figure 9:
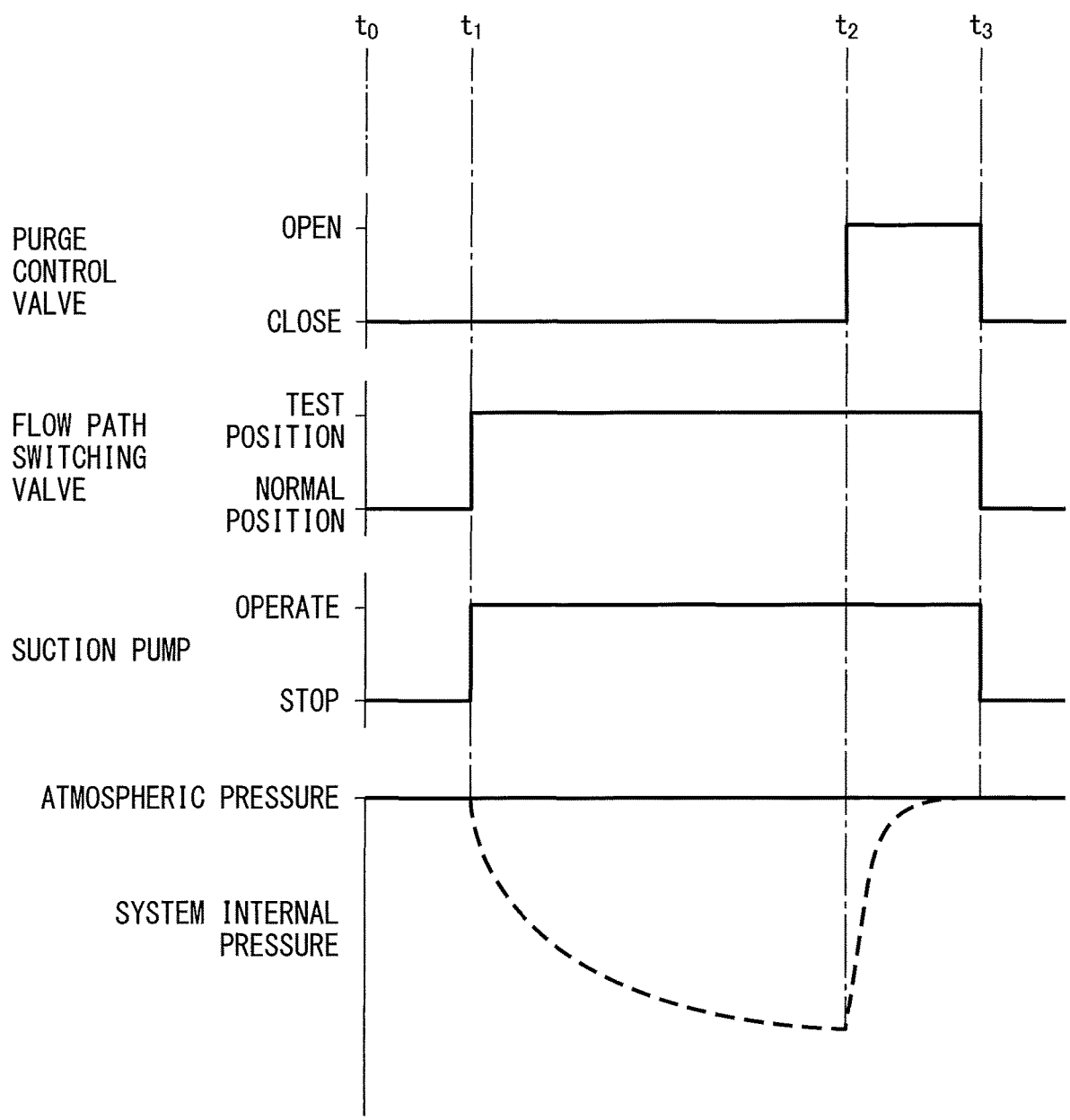
FIG. 9 is a view showing processing for detection of an abnormality and a change in the system internal pressure.
Figure 10:
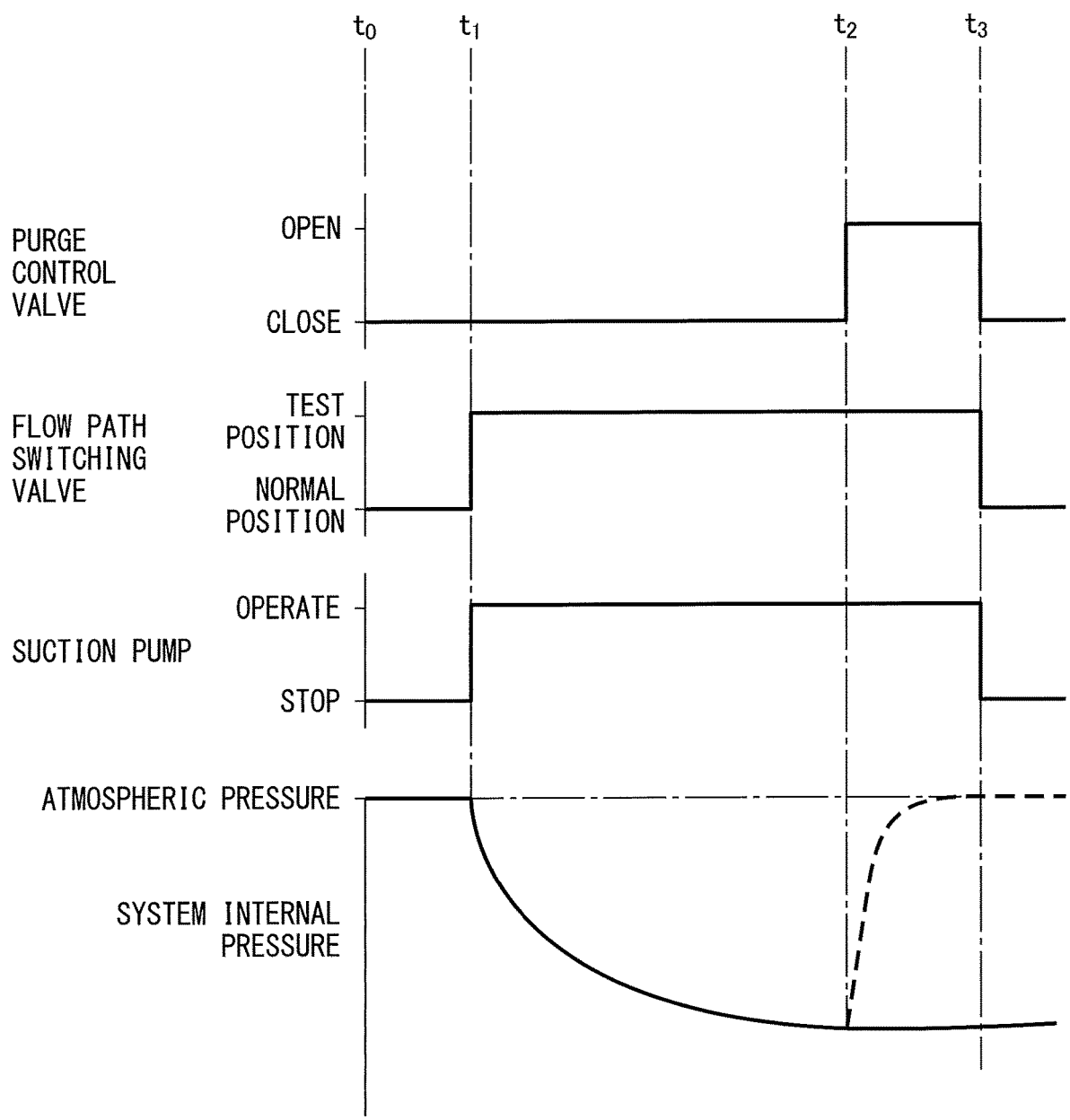
FIG. 10 is a view showing processing for detection of an abnormality and a change in the system internal pressure.

On the other hand, the solid line of FIG. 9 shows when a valve opening abnormality occurs in which the purge control valve 14 continues opened even if the valve closing instruction making the purge control valve 14 close is issued. At this time, the inside the system continues to be communicated with the outside air through the purge control valve 14, so as shown by the solid line of FIG. 9, the system internal pressure is maintained at the atmospheric pressure. Further, the solid line of FIG. 10 shows when a valve closing abnormality occurs in which the purge control valve 14 continues closed even if the valve opening instruction making the purge control valve 14 open is issued. At this time, as shown by the solid line of FIG. 9, even if the time t2 is passed, the system internal pressure is maintained as is at negative pressure.

In this way, if an abnormality occurs, the pattern of change in the system internal pressure becomes a pattern of change different from the pattern of change in the system internal pressure at the normal time. Therefore, in the embodiment according to the present invention, to learn the differences in the pattern of change in the system internal pressure, the system internal pressure is detected at every fixed time. Next, this will be explained while referring to FIG. 11. Note that, FIG. 11, like FIG. 7, shows a valve closing instruction making the purge control valve 14 close and a valve opening instruction making the purge control valve 14 open, a switching instruction switching the flow path switching valve 42 to the normal position and a switching instruction switching the flow path switching valve 42 to the test position, an instruction for operating the suction pump 40 and an instruction for stopping the suction pump 40, and changes in the system internal pressure detected by the pressure sensor 47. Further, the solid line in FIG. 11 shows the pattern of change in the system internal pressure at the normal time shown in FIG. 7.

Figure 11:
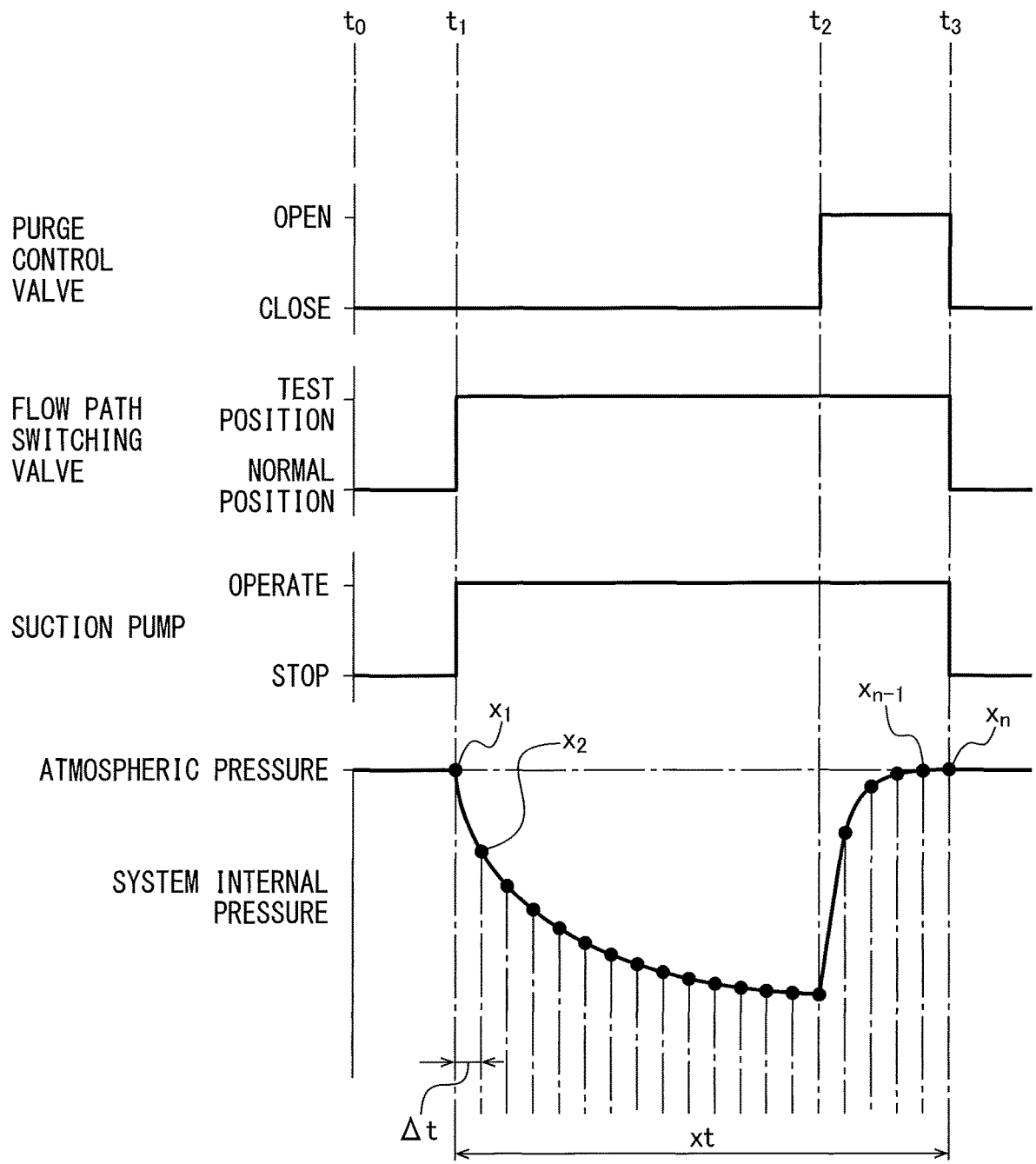
FIG. 11 is a view showing processing for detection of an abnormality and a change in the system internal pressure.

Referring to FIG. 11, in the time period xt from the time $t_1$ to the time $t_3$, the system internal pressure is detected at every fixed time $\Delta t$ by the pressure sensor 47. In FIG. 11, $x_1$, $x_2$ ... $x_{n-1}$, and $x_n$ show the system internal pressures detected by the pressure sensor 47 at every fixed time $\Delta t$. The system internal pressures $x_1$, $x_2$ ... $x_{n-1}$, and $x_n$ at every fixed time $\Delta t$ detected by the pressure sensor 47 are stored once in the storage device. In the embodiment according to the present invention, an abnormality judgment estimation model able to estimate if an abnormality occurs in the fuel vapor escape prevention system based on the system internal pressures $x_1$, $x_2$ ... $x_{n-1}$, and $x_n$ at every constant time $\Delta t$ stored once in the storage device by using a neural network is prepared. Note that, in the embodiment, what is detected by the pressure sensor 47 is the pressure of the inside of the fuel tank 5 and the inside of the canister 6. Therefore, in this embodiment, the pressure sensor 47 does not necessarily have to be placed inside the suction passage 46. It can be arranged at any location at which the pressure at the inside of the fuel tank 5 and the inside of the canister 6 can be detected.

Next, the neural network used for preparing the abnormality judgment estimation model will be explained while referring to FIG. 12. Referring to FIG. 12, in this neural network 70 as well, in the same way as the neural network shown in FIG. 6, L=1 shows an input layer, L=2 and L=3 show hidden layers, and L=4 shows an output layer. As shown in FIG. 12, the input layer (L=1) is comprised of n+k number of nodes. "n" number of input values $x_1, x_2 \ldots x_{n-1}$, and $x_n$ and "k" number of input values $xx_1, xx_2 \ldots xx_{k-1}$, and $xx_k$ are input to the nodes of the input layer (L=1). In this case, the "n" number of input values $x_1, x_2 \ldots x_{n-1}$, and $x_n$ are the system internal pressures $x_1, x_2 \ldots x_{n-1}$, and $x_n$ at every fixed time Δt shown in FIG. 11.

On the other hand, FIG. 12 illustrates the hidden layer (L=2) and hidden layer (L=3), but the numbers of these hidden layers may also be made a single layer or any other number of layers. Further, the number of nodes of the hidden layers may also be made any number of nodes. Further, in this embodiment, the number of nodes of the output layer (L=4) is made four nodes and the output values from the nodes of the output layer (L=4) are shown by $y_1'$, $y_2'$, $y_3'$, and $y_4'$. These output value $y_1'$, $y_2'$, $y_3'$, and $y_4'$ are sent to the softmax layer SM where they are converted to the respectively corresponding output values $y_1, y_2, y_3$, and $y_4$. The total of these output values $y_1, y_2, y_3$, and $y_4$ is 1. The output values $y_1, y_2, y_3$, and $y_4$ express the ratios to 1.

Next, the input values $xx_1, xx_2 \ldots xx_{k-1}$, and $xx_k$ in FIG. 12 will be explained while referring to the list shown in FIG. 13. Now then, as explained above, in the embodiment according to the present invention, a neural network is used to estimate whether an abnormality occurs in the fuel vapor escape prevention system based on the system internal pressures $x_1, x_2 \ldots x_{n-1}$, and $x_n$ at every fixed time Δt. In this regard, however, the system internal pressure changes due to, for example, the atmospheric pressure and other external factors and the remaining amount of fuel in the fuel tank 5 and other internal factors. Therefore, when estimating if an abnormality occurs in the fuel vapor escape prevention system, it is necessary to consider the effects of these factors.

Figures 13, 14:
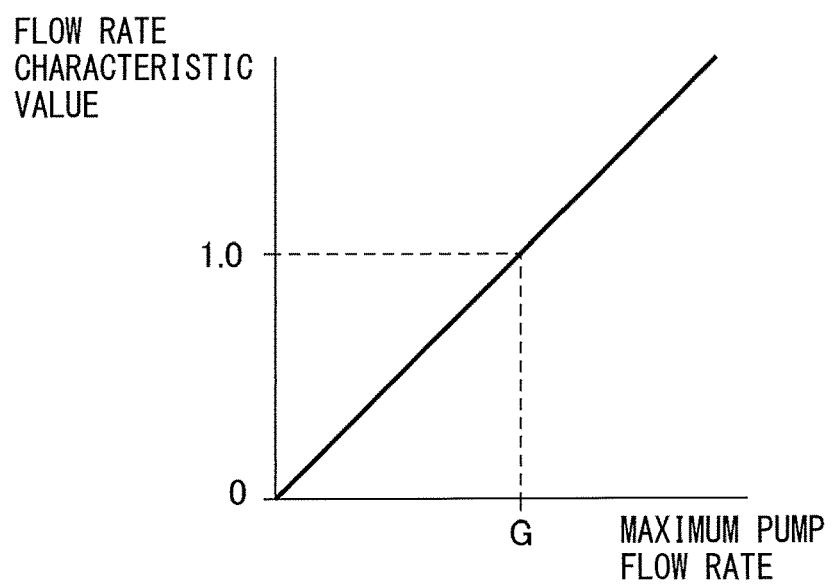
FIG. 13 is a view showing a list of input parameters.
FIG. 14 is a view showing indicators of performance of the suction pump.

FIG. 13 lists the input parameters to the neural network 70 acting as such factors. Note that, FIG. 13 lists input parameters having a strong influence on changes in the system internal pressure as essential input parameters, lists input parameters which have a strong influence on changes in the system internal pressure, though not to the extent of the essential input parameters, as large influence input parameters, and lists input parameters which have an influence on changes in the system internal pressure, though not to the extent of the large influence input parameters, as auxiliary input parameters.

As shown in FIG. 13, the system internal pressure $x_1$, $x_2 \ldots x_{n-1}$, and $x_n$ and atmospheric pressure $xx_1$ are made essential input parameters. In this case, the system internal pressures $x_1, x_2 \ldots x_{n-1}$, and $x_n$ are naturally essential input parameters. On the other hand, if the atmospheric pressure changes, the system internal pressure also changes accordingly. Therefore, the atmospheric pressure $xx_1$ is made an essential input parameter.

On the other hand, when the system internal pressure becomes a negative pressure due to the suction action by the suction pump 40, if the fuel in the fuel tank 5 evaporates, the system internal pressure rises. In this case, the greater the amount of evaporation of the fuel per unit time, the greater the amount of change in the system internal pressure. On the other hand, the amount of evaporation of the fuel per unit time is proportional to the remaining amount of fuel in the fuel tank 5. Therefore, the greater the remaining amount of fuel in the fuel tank 5, the greater the influence given to the system internal pressure. Therefore, as shown in FIG. 13, the remaining amount $xx_2$ of fuel in the fuel tank 5 is made a large influence input parameter.

Further, if the temperature of the fuel in the fuel tank 5 rises, the amount of evaporation of the fuel per unit time increases, so the temperature of the fuel in the fuel tank 5 also has an influence on the system internal pressure. However, this influence on the system internal pressure is smaller than the remaining amount of fuel in the fuel tank 5, so as shown in FIG. 13, the temperature of the fuel $xx_3$ in fuel tank 5 is made an auxiliary input parameter. Further, the performance of the suction pump 40 also has quite a bit of an influence on the system internal pressure, therefore, as shown in FIG. 13, the characteristic value of flow rate $xx_4$ of the suction pump 40 is made an auxiliary input parameter.

FIG. 14 shows the relationship between this characteristic value of flow rate of the suction pump 40 and the maximum pump flow rate of the suction pump 40. As shown in FIG. 14, the characteristic value of flow rate of the suction pump 40 is made 1.0 when the maximum pump flow rate of the suction pump 40 used as a reference is G, and the characteristic value of flow rate of each suction pump 40 is determined in accordance with the maximum pump flow rate of each suction pump 40. The characteristic value of flow rate of the suction pump 40 is a parameter showing the capacity of the suction pump 40. If the capacity of the suction pump 40 is high, the characteristic value of flow rate of the suction pump 40 becomes high, while if the capacity of the suction pump 40 is low, the characteristic value of flow rate of the suction pump 40 becomes low.

FIG. 15 shows a list of what kinds of states the output values $y_1', y_2', y_3'$, and $y_4'$ and output values $y_1, y_2, y_3$, and $y_4$ shown in FIG. 12 show. As will be understood from FIG. 15, the output value $y_1'$ and output value $y_1$ show a perforation abnormality in which the walls of the fuel vapor circulation pipe 12 or 13 are perforated by a small hole, the output value $y_2'$ and output value $y_2$ show a valve opening abnormality in which the purge control valve 14 continues opened, the output value $y_3'$ and output value $y_3$ show a valve closing abnormality in which the purge control valve 14 continues closed, and the output value $y_4'$ and output value $y_4$ show the normal time.

Now then, as the input values $x_1, x_2 \ldots x_{n-1}$, and $x_n$ and the input values $xx_1, xx_2 \ldots xx_{k-1}$, and $xx_k$ of the neural network 70 shown in FIG. 12, the values of only the essential input parameters shown in FIG. 13, that is, only the system internal pressures $x_1, x_2 \ldots x_{n-1}$, and $x_n$ and atmospheric pressure $xx_1$, can be used. Of course, in addition to the values of the essential input parameters, it is possible to make the values of the large influence input parameters the input values $xx_1, xx_2 \ldots xx_{k-1}$, and $xx_k$ and possible to make the values of the large influence input parameters and the values of the auxiliary input parameters in addition to the values of the essential input parameters the input values $xx_1, xx_2 \ldots xx_{k-1}$, and $xx_k$. Note that, below, the embodiment will be explained using as an example the case of making the values of the large influence input parameters and the values of the auxiliary input parameters in addition to the values of the essential input parameters the input values $xx_1$, $xx_2$ ... $xx_{k-1}$, and $xx_k$ (in this example, k=4).

FIG. 16 shows a training data set prepared using the input values $x_1$, $x_2$ ... $x_{n-1}$, and $x_n$, the input values $xx_1$, $xx_2$ ... $xx_{k-1}$, and $xx_k$, and training data, that is, the truth labels $y_t$. In this FIG. 16, the input values $x_1$, $x_2$ ... $x_{n-1}$, and $x_n$ show the system internal pressure for each fixed time $\Delta t$. This system internal pressure is detected by the pressure sensor 47. Further, in FIG. 16, the input values $xx_1$, $xx_2$ ... $xx_{k-1}$, and $xx_k$, that is, the input values $xx_1$, $xx_2$, $xx_3$, and $xx_4$, respectively show the atmospheric pressure, the remaining amount of fuel in the fuel tank 5, the temperature of the fuel in the fuel tank 5, and the characteristic value of flow rate of the suction pump 40, that is, the capacity of the suction pump 40. In this case, the atmospheric pressure is detected by the atmospheric pressure sensor 30, the remaining amount of fuel in the fuel tank 5 is detected by the fuel level gauge 7 and the gravity sensor 60, the temperature of the fuel in the fuel tank 5 is detected by the temperature sensor 8, and the characteristic value of flow rate of the suction pump 40 is calculated based on the relationship shown in FIG. 14.

On the other hand, in FIG. 16, $yt_1$ ... $yt_s$ (in this example, s=4) show the training data, that is, the truth labels, for the output values $y_1'$, $y_2'$, $y_3'$, and $y_4'$ and output values $y_1$, $y_2$, $y_3$, and $y_4$ shown in FIG. 15. That is, in FIG. 16, $yt_1$ shows the truth label when a perforation abnormality occurs in which the walls of the fuel vapor flow pipe 12 or 13 are perforated by a small hole, $yt_2$ shows the truth label where a valve opening abnormality occurs in which the purge control valve 14 continues opened, $yt_3$ shows the truth label where a valve closing abnormality occurs in which the purge control valve 14 continues closed, and $yt_4$ shows the truth label at the normal time.

In this case, for example, when a perforation abnormality occurs in which the walls of the vapor circulation pipe 12 or 13 are perforated by a small hole, only the truth label $yt_1$ is made 1, while the remaining truth labels $yt_2$, $yt_3$, and $yt_4$ are all made zero. Similarly, when a valve opening abnormality occurs in which the purge control valve 14 continues opened, only the truth label $yt_2$ is made 1, while the remaining truth labels $yt_1$, $yt_3$, and $yt_4$ are all made zero. When a valve closing abnormality occurs in which the purge control valve 14 continues closed, only the truth label $yt_3$ is made 1, while the remaining truth labels $yt_1$, $yt_2$, and $yt_4$ are all made zero, and when normal, only the truth label $yt_4$ is made 1 and the remaining truth labels $yt_1$, $yt_2$, and $yt_3$ are all made zero.

On the other hand, as shown in FIG. 16, in this training data set, "m" number of data showing the relationship between the input values $x_1$, $x_2$ ... $x_{n-1}$, $x_n$ and the input values $xx_1$, $xx_2$ ... $xx_{k-1}$, $xx_k$ and truth labels yt are acquired. For example, at the No. 2 data, the acquired input values $x_{12}$, $x_{22}$ ... $x_{n-12}$, and $x_{n2}$, input values $xx_{12}$, $xx_{22}$ ... $xx_{k-12}$, and $xx_{k2}$, and truth labels $yt_{12}$ ... $yt_{s2}$ are listed, while at the No. m−1 data, the input values $x_{1m-1}$, $x_{2m-1}$ ... $x_{nm-1}$, and $x_{nm-1}$, the input values $xx_{1m-1}$, $xx_{2m-1}$ ... $xx_{k-1m-1}$, and $xx_{km-1}$, and the truth labels $yt_{sm-1}$ of the acquired input parameters are listed.

Figure 17:
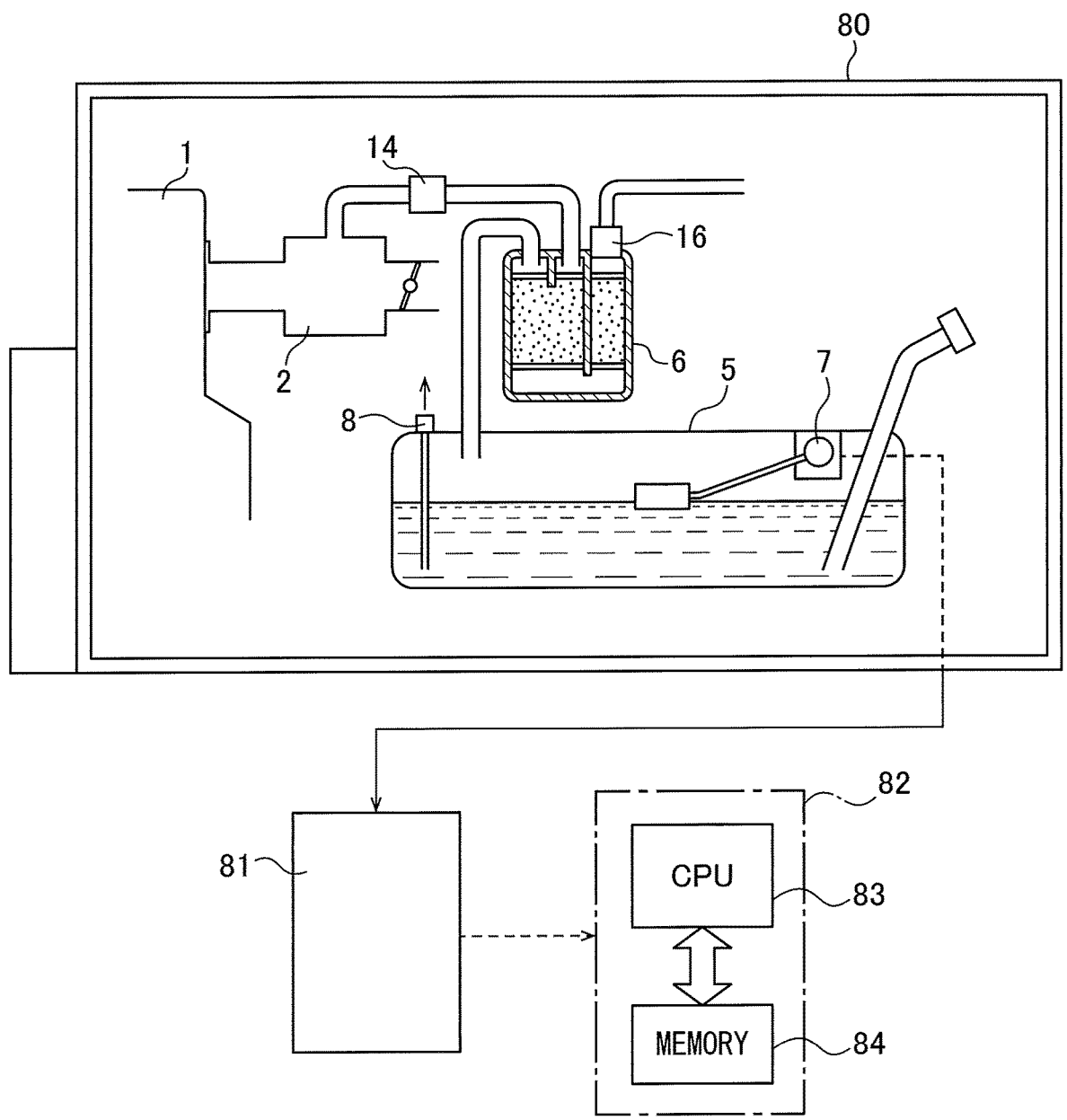
FIG. 17 is a view for explaining a learning method.

Next, the method of preparation of the training data set shown in FIG. 16 will be explained. FIG. 17 shows one example of the method of preparation of the training data set. Referring to FIG. 17, the engine body 1, fuel tank 5, canister 6, etc. shown in FIG. 1 are placed inside a sealed test chamber 80 able to be adjusted in internal pressure. In order to estimate if an abnormality occurs in the fuel vapor escape prevention system by using a test control device 81, processing for detection of an abnormality is performed operating the purge control valve 14, flow path switching valve 42, and suction pump 40 in a predetermined order of operation. At this time, the state of the fuel vapor escape prevention system is successively changed to a state where a perforation abnormality occurs in which the walls of the fuel vapor flow pipe 12 or 13 are perforated by a small hole, a state where a valve opening abnormality occurs in which the purge control valve 14 continues opened, a state where a valve closing abnormality occurs in which the purge control valve 14 continues closed, and a normal state. In the changed states, the combination of atmospheric pressure, the remaining amount of fuel in the fuel tank 5, the temperature of the fuel in the fuel tank 5, and the characteristic value of flow rate of the suction pump 40 is successively changed while processing for detection of an abnormality is repeatedly performed.

Figure 18:
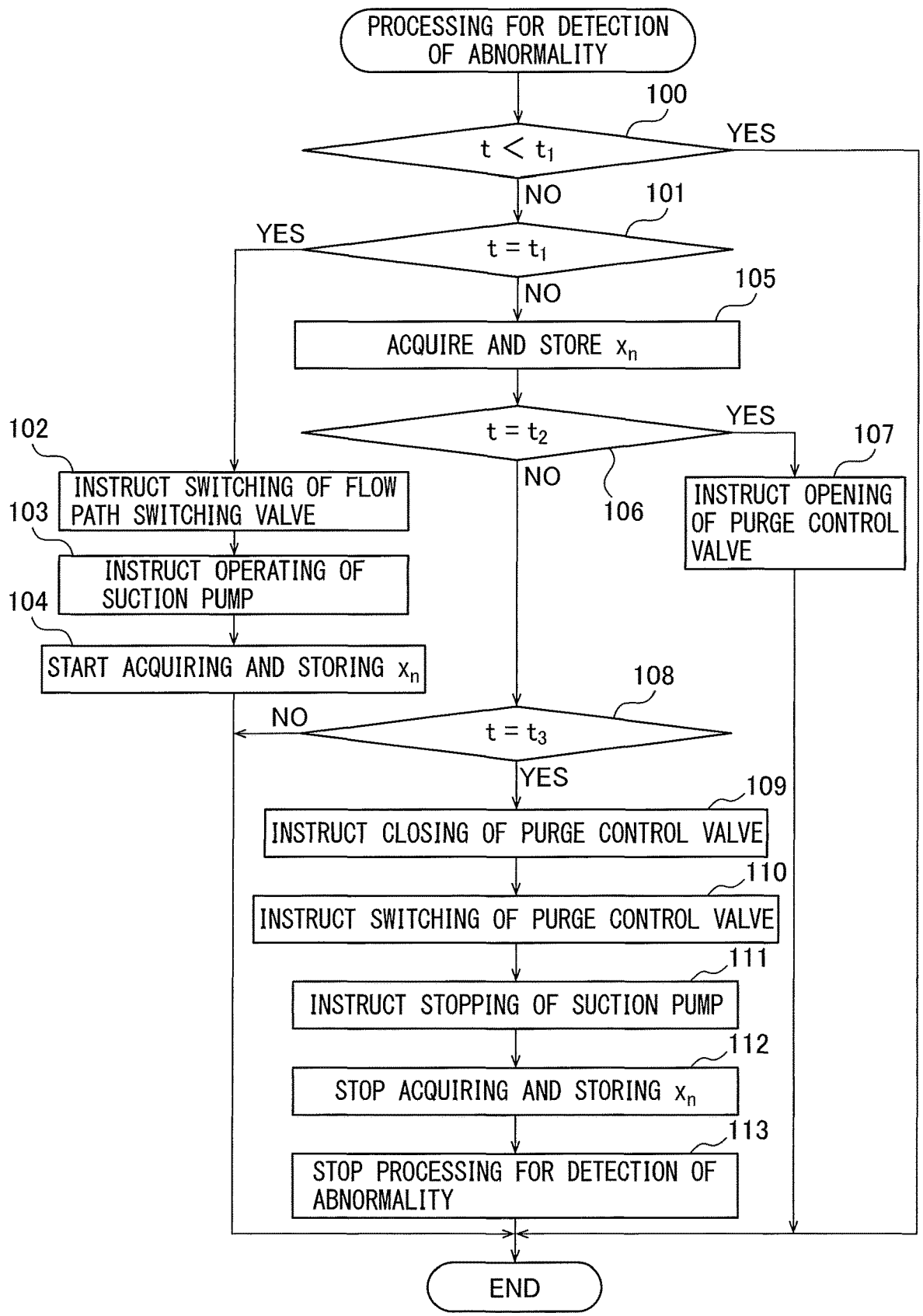
FIG. 18 is a flow chart for performing processing for detection of an abnormality.

While this processing for detection of an abnormality is being performed, the data required for preparing the training data set is acquired. FIG. 18 shows the routine for processing for detection of an abnormality performed in the test control device 81 for performing this processing for detection of an abnormality. This routine for processing for detection of an abnormality is performed by interruption at every fixed time $\Delta t$ shown in FIG. 11. Note that, in the routine shown in FIG. 18, "t" shows the point of time found when defining the time $t_0$ when the engine stops operating at FIG. 17 as zero and using this time $t_0$ as the starting point.

Referring to FIG. 18, first, at step 100, it is judged if the time "t" is the time $t_1$ shown in FIG. 11. When the time "t" is before the time $t_1$ shown in FIG. 11, the processing cycle is ended. As opposed to this, when it is judged that the time "t" is not before the time $t_1$ shown in FIG. 11, the routine proceeds to step 101 where it is judged if the time "t" reaches the time $t_1$ shown in FIG. 11. When the time "t" reaches the time $t_1$ shown in FIG. 11, the routine proceeds to step 102 where a switching instruction switching the flow path switching valve 42 to the test position is issued, then the routine proceeds to step 103 where an instruction for operating the suction pump 40 is issued. Next, at step 104, the acquisition and storage of the system internal pressure $x_n$ detected by the pressure sensor 47 are started. At this time, the system internal pressure $x_n$ is stored inside the test control device 81.

On the other hand, when at step 101 it is judged that the time "t" is not the time $t_1$ shown in FIG. 11, the routine proceeds to step 105 where the system internal pressure $x_n$ is acquired and stored in the test control device 81. That is, as shown in FIG. 11, the system internal pressure $x_n$ is acquired at every fixed time $\Delta t$ while the system internal pressure $x_n$ acquired at every fixed time $\Delta t$ is stored inside the test control device 81. Next, at step 106, it is judged if the time "t" becomes the time $t_2$ shown in FIG. 11. When the time "t" becomes the time $t_2$ shown in FIG. 11, the routine proceeds to step 107 where a valve opening instruction making the purge control valve 14 open is issued.

On the other hand, when at step 106 it is judged that the time "t" is not the time t2 shown in FIG. 11, the routine proceeds to step 108 where it is judged if the time "t" becomes the time $t_3$ shown in FIG. 11. When the time "t" is not the time $t_3$ shown in FIG. 11, the processing cycle is ended. As opposed to this, when it is judged that the time "t" becomes the time $t_3$ shown in FIG. 11, the routine proceeds to step 109 where a valve closing instruction making the purge control valve 14 close is issued. Next, at step 110, a switching instruction switching the flow path switching valve 42 to the normal position is issued. Next, at step 111, an instruction for stopping the suction pump 40 is issued. Next, at step 112, the action of acquiring and storing the system internal pressure $x_n$ detected by the pressure sensor 47 is stopped. Next, at step 113, the processing for detection of an abnormality is ended. In the test control device 81 shown in FIG. 17, if the processing for detection of an abnormality ends, the next processing for detection of an abnormality is started.

In this way, the system internal pressure $x_n$ for each fixed time Δt when the combination of the atmospheric pressure, the remaining amount of fuel in the fuel tank 5, the temperature of the fuel in the fuel tank 5, and the characteristic value of flow rate of the suction pump 40 is changed in each state of a state where a perforation abnormality occurs in which the walls of the fuel vapor flow pipe 12 or 13 are perforated by a small hole, a state where a valve opening abnormality occurs in which the purge control valve 14 continues opened, a state where a valve closing abnormality occurs in which the purge control valve 14 continues closed, and a normal state are stored in the test control device 81. That is, the No. 1 to No. "m" input values $x_{1m}, x_{2m} \ldots x_{nm-1}$, and $x_{nm}$, the input values $xx_{1m}, xx_{2m} \ldots xx_{km-1}$, and $xx_{km}$, and the truth labels $yt_{sm}$ (m=1, 2, 3 ... m) of the training data set shown in FIG. 16 are stored inside the test control device 81.

If a training data set such as shown in FIG. 16 is prepared in this way, electronic data of the prepared training data set is used to learn the weights of the neural network 70 shown in FIG. 12. In the example shown in FIG. 17, a learning apparatus 82 for learning the weights of the neural network is provided. As this learning apparatus 82, a personal computer can also be used. As shown in FIG. 17, this learning apparatus 82 is provided with a CPU (microprocessor) 83 and a storage device, that is, the memory 84. In the example shown in FIG. 17, the numbers of nodes of the neural network shown in FIG. 12 and the electronic data of the prepared training data set are stored in the memory 84 of the learning apparatus 82 and the weights of the neural network are learned at the CPU 83.

Figure 19:
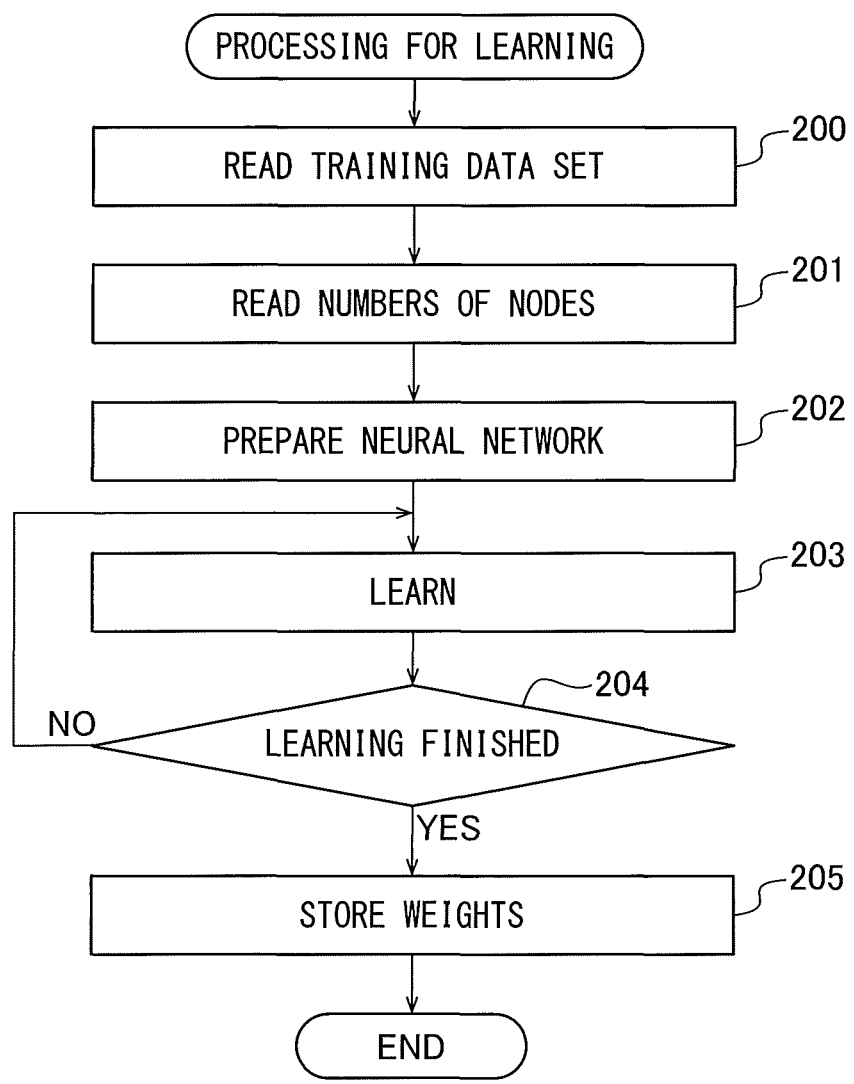
FIG. 19 is a flow chart for performing processing for learning.

FIG. 19 shows the routine for processing for learning the weights of a neural network performed at the learning apparatus 82. Referring to FIG. 19, first, at step 200, the data of the training data set for the neural network 70 stored in the memory 84 of the learning apparatus 82 is read in. Next, at step 201, the number of nodes of the input layer (L=1), the numbers of nodes of the hidden layer (L=2) and hidden layer (L=3), and the number of nodes of the output layer (L=4) of the neural network 70 are read in. Next, at step 202, the neural network 70 such as shown in FIG. 12 is prepared based on these numbers of nodes.

Next, at step 203, the weights of the neural network 70 are learned. At this step 203, first, the No. 1 input values $x_1$, $x_2 \ldots x_{n-1}$, and $x_n$ and input values $xx_1, xx_2 \ldots xx_{k-1}$, and $xx_k$ of FIG. 16 are input to the nodes of the input layer of the neural network 70 (L=1). At this time, the output values $y_1'$, $y_2'$, $y_3'$, and $y_4'$ are output from the nodes of the output layer of the neural network 70. These output value $y_1', y_2', y_3'$, and $y_4'$ are sent to the softmax layer SM and converted to respectively corresponding output values $y_1, y_2, y_3$, and $y_4$. Next, using these output value $y_1, y_2, y_3$, and $y_4$ and truth labels $yt_1 \ldots yt_S$, the above-mentioned cross entropy error E is calculated. The weights of the neural network 70 are learned using the error backpropagation algorithm so that the cross entropy error E becomes smaller.

If the weights of the neural network 70 finish being learned based on the No. 1 data of FIG. 16, next the weights of the neural network 70 are learned based on the No. 2 data of FIG. 16 using the error backpropagation algorithm. Similarly, the weights of the neural network 70 are successively learned until the No. "m" data of FIG. 16. When the weights of the neural network 70 have finished being learned for all of the No. 1 to No. "m" data of FIG. 16, the routine proceeds to step 204.

At step 204, it is judged if the cross entropy error E becomes a preset error setting or less. When it is judged that the cross entropy error E does not become the preset error setting or less, the routine returns to step 203 where, again, learning of the weights of the neural network 70 is performed based on the training data set shown in FIG. 16. Next, learning of the weights of the neural network 70 is continued until the cross entropy error E becomes the preset error setting or less. When at step 204 it is judged that the cross entropy error E becomes the preset error setting or less, the routine proceeds to step 205 where the learned weights of the neural network 70 are stored in the memory 84 of the learning apparatus 82. In this way, an abnormality judgment estimation model able to estimate if an abnormality occurs in the fuel vapor escape prevention system is prepared.

Figure 20:
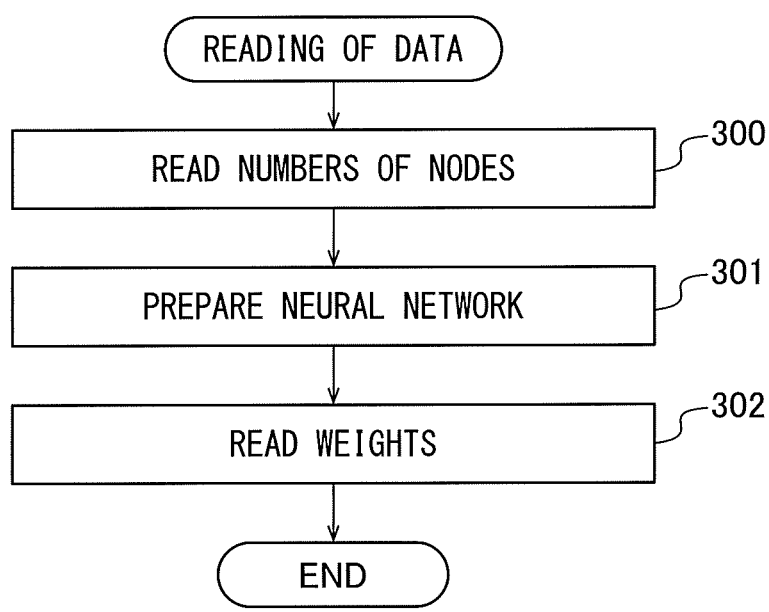
FIG. 20 is a flow chart for reading data into an electronic control unit.

In the embodiment according to the present invention, the thus prepared abnormality judgment estimation model of the fuel vapor escape prevention system is used to diagnose a fault in the fuel vapor escape prevention system of a commercially available vehicle. To this end, the abnormality judgment estimation model of the fuel vapor escape prevention system is stored in the electronic control unit 20 of the commercially available vehicle. FIG. 20 shows a routine for reading data into the electronic control unit performed at the electronic control unit 20 of a commercially available vehicle so as to store the abnormality judgment estimation model of the fuel vapor escape prevention system in the electronic control unit 20.

Figure 21:
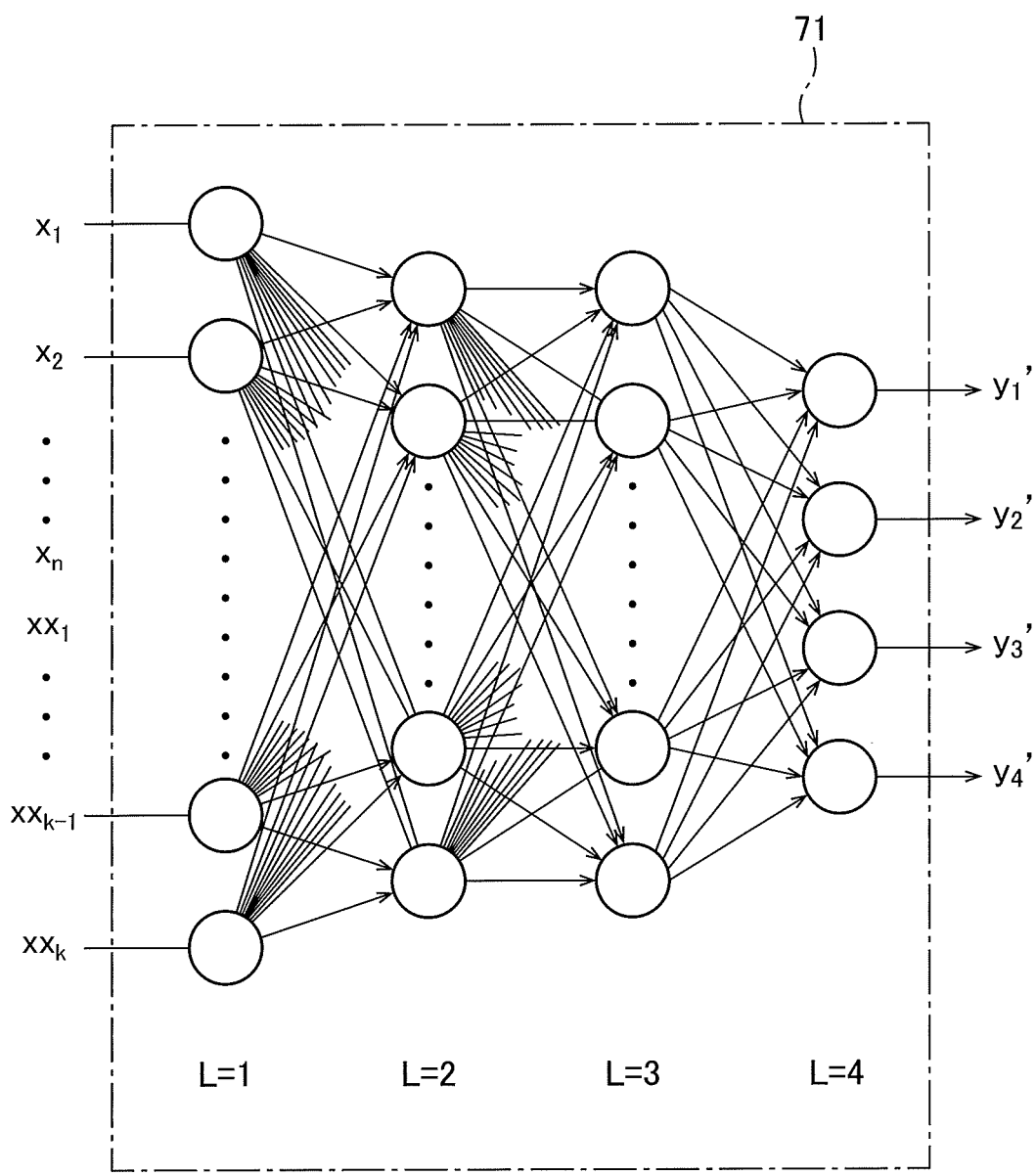
FIG. 21 is a view showing an example of a neural network.

If referring to FIG. 20, first, at step 300, the number of nodes of the input layer (L=1) of the neural network 7, the numbers of nodes of the hidden layer (L=2) and hidden layer (L=3), and the number of nodes of the output layer (L=4) shown in FIG. 12 are read into the memory 22 of the electronic control unit 20. Next, at step 301 a neural network 71 such as shown in FIG. 21 is prepared based on these numbers of nodes. As will be understood from FIG. 21, in this neural network 71, the softmax layer is removed. Note that, in this case, the neural network 71 may also be provided with the softmax layer 71 such as shown in FIG. 12. Next, at step 302, the learned weights of the neural network 70 are read into the memory 22 of the electronic control unit 20. Due to this, the abnormality judgment estimation model of the fuel vapor escape prevention system is stored in the electronic control unit 20 of the commercially available vehicle.

Figure 22:
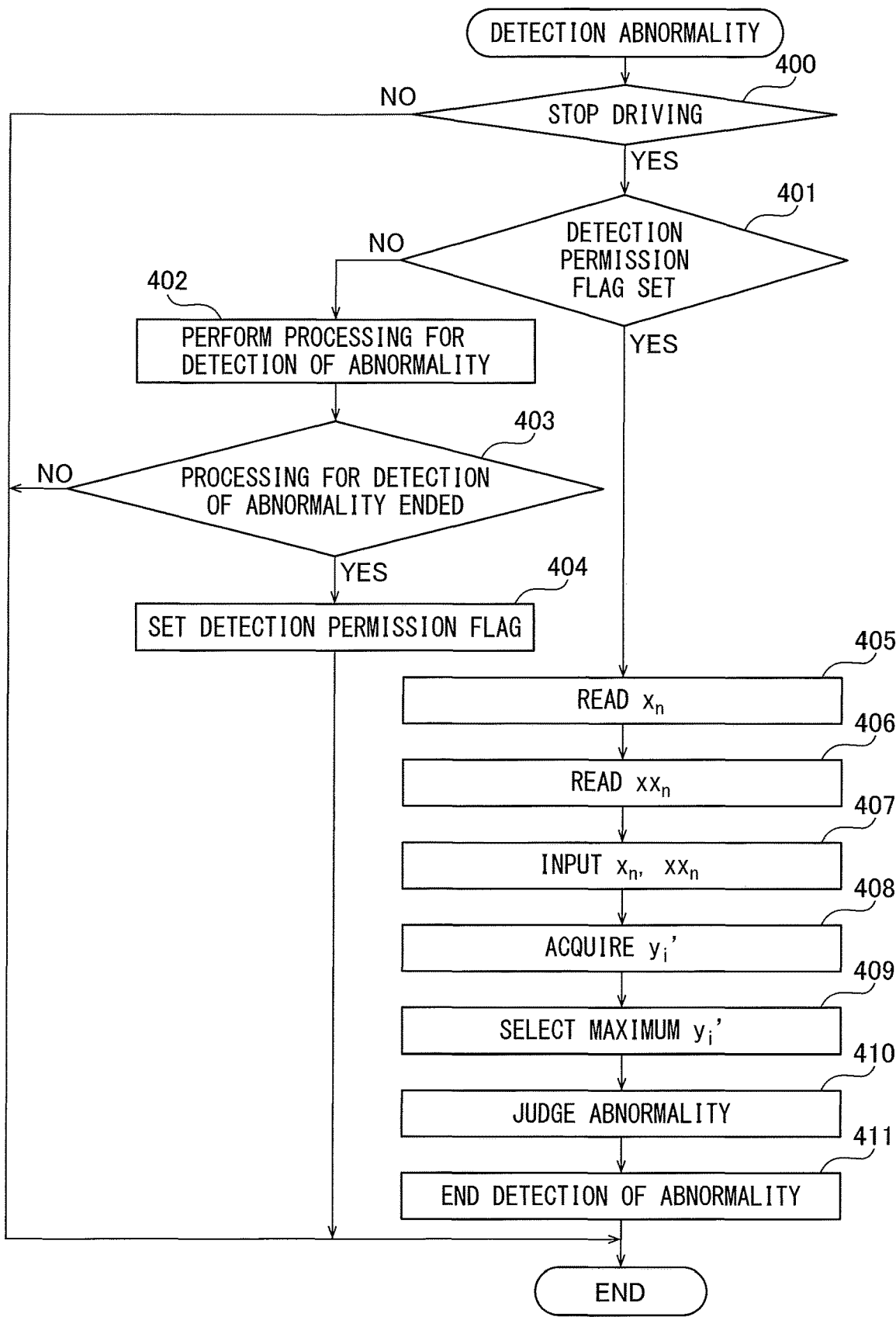
FIG. 22 is a flow chart for the detection of an abnormality.

Next, referring to FIG. 22, the routine for detection of an abnormality of the fuel vapor escape prevention system performed in a commercially available vehicle will be explained. This routine is also performed by interruption at every fixed time. Referring to FIG. 22, first, at step 400, it is judged if the vehicle has stopped being driven based on the output signal of the driving start/stop switch 31. When the vehicle has not stopped being driven, the processing cycle is ended. As opposed to this, when it is judged that the vehicle has stopped being driven, the routine proceeds to step 401 where it is judged if a detection permission flag permitting detection of an abnormality of the fuel vapor escape prevention system is set. When the routine first proceeds to step 401 after the vehicle stops being driven, the detection permission flag is not set, so the routine proceeds to step 402. At step 402, the processing for detection of an abnormality shown in FIG. 18 is performed.

If this processing for detection of an abnormality is performed, the system internal pressure $x_n$ is acquired for at every fixed time $\Delta t$ and the system internal pressure $x_n$ acquired at every fixed time $\Delta t$ is stored in the memory 22 of the electronic control unit 20. Next, at step 403, it is judged if the processing for detection of an abnormality has ended. When the processing for detection of an abnormality has not ended, the processing cycle is ended. As opposed to this, when it is judged that the processing for detection of an abnormality has ended, the routine proceeds to step 404 where the detection permission flag is set. If the detection permission flag is set, at the next processing cycle, the routine proceeds from step 401 to step 405.

At step 405, the system internal pressures $x_1, x_2 \ldots x_{n-1}$, and $x_n$ for each fixed time $\Delta t$ stored in the memory 22 of the electronic control unit 20 are read in. Next, at step 406, the input values $xx_1, xx_2 \ldots xx_{k-1}$, and $xx_k$ stored in the memory 22 of the electronic control unit 20 are read in. Next, at step 407, the system internal pressures $x_n x_1, x_2 \ldots x_{n-1}$, and $x_n$ for each fixed time $\Delta t$ and the input values $xx_1, xx_2 \ldots xx_{k-1}$, and $xx_k$ are input to the nodes of the input layer (L=1) of the neural network 71 shown in FIG. 21. At this time, output value $y_1', y_2', y_3'$, and $y_4'$ are output from the nodes of the output layer of the neural network 70. Due to this, at step 408, the output values $y_1', y_2', y_3'$, and $y_4'$ are acquired.

Next, at step 409, the largest output value $y_1'$ is selected from the acquired output values $y_1', y_2', y_3'$, and $y_4'$. At this time, it is estimated that the abnormal state shown in FIG. 15 corresponding to this largest output value $y_1'$ occurs. Therefore, at step 410, it is judged that the abnormal state shown in FIG. 15 corresponding to this largest output value $y_1'$ occurs and, for example, a warning light showing that the abnormal state shown in FIG. 15 corresponding to this largest output value $y_1'$ occurs is turned on. Next, at step 411, the detection of an abnormality is ended.

In this way, in the abnormality detection device of a fuel vapor escape prevention system according to the present invention, the fuel vapor escape prevention system is provided with the canister 6 at which the fuel vapor chamber 10 and atmospheric pressure chamber 11 are formed at the two sides of the activated carbon layer 9. The fuel vapor chamber 10 is on the one hand communicated with the inside space above the fuel level of the fuel tank 5 and is on the other hand communicated with the inside of the intake passage of the engine through the purge control valve 14. Furthermore, the fuel vapor escape prevention system is provided with the flow path switching valve 42 able to selectively connect the atmospheric pressure chamber 11 to the atmosphere and the suction pump 40 and the pressure sensor 47 detecting the pressure at the inside of the fuel tank 5 and the inside of the canister 6. At the time of stopping operation of the vehicle, processing for detection of an abnormality generating a valve closing instruction making the purge control valve 14 close, a switching instruction switching the switched position of the flow path switching valve 42 to the switched position where the atmospheric pressure chamber 11 is connected to the suction pump 40, and a pump operation instruction making the suction pump 40 operate so as to make the inside of the fuel tank and the inside of the canister 6 a negative pressure is performed. When this processing for detection of an abnormality is performed, the pressure at the inside of the fuel tank 5 and the inside of the canister 6 detected at every fixed time by the pressure sensor 40 is stored in the storage device. The learned neural network learned in weights using the pressure at the inside of the fuel tank 5 and inside of the canister 6 at every fixed time stored in the storage device and at least the atmospheric pressure when the processing for detection of an abnormality is performed as input parameters of the neural network and using a case where perforation occurs in the system causing leakage of fuel vapor as a truth label is stored, and, at the time of stopping operation of the vehicle, a perforation abnormality causing fuel vapor to leak is detected from the input parameters by using the learned neural network.

In this case, in the embodiment according to the present invention, the above-mentioned processing for detection of an abnormality includes processing for generating a valve opening instruction making the purge control valve 14 open after generating the valve closing instruction of the purge control valve 14, a learned neural network learned in weights using the pressure at the inside of the fuel tank 5 and inside of the canister 6 at every fixed time stored in the storage device and at least the atmospheric pressure when the processing for detection of an abnormality is performed as input parameters of the neural network and using a case where perforation occurs in the above-mentioned system causing leakage of fuel vapor, a case where a valve opening abnormality occurs in which the purge control valve 14 continues opened, and a case where a valve closing abnormality occurs in which the purge control valve 14 continues closed as truth labels is stored, and, at the time of stopping operation of the vehicle, a perforation abnormality causing fuel vapor to leak, a valve opening abnormality of the purge control valve 14, and a valve closing abnormality of the purge control valve 14 are detected from the input parameters by using the learned neural network.

Further, in this embodiment according to the present invention, the above-mentioned input parameters are comprised of the pressures at the inside of the fuel tank 5 and the inside of the canister 6 at every fixed time stored in the storage device and the atmospheric pressure when processing for detection of an abnormality is performed and the remaining amount of fuel in the fuel tank 5 when processing for detection of an abnormality is performed. Alternatively, in the embodiment according to the present invention, the above-mentioned input parameters are comprised of the pressures at the inside of the fuel tank 5 and the inside of the canister 6 at every fixed time stored in the storage device and the atmospheric pressure when processing for detection of an abnormality is performed, the remaining amount of fuel in the fuel tank 5 when processing for detection of an abnormality is performed, the temperature of the fuel of the fuel tank 5, and a parameter showing the capacity of the suction pump 40.

Figure 23A:
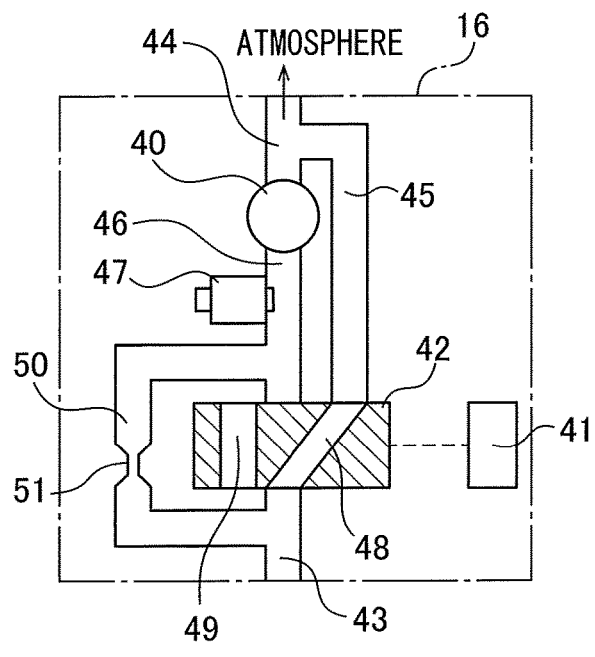
FIG. 23A and FIG. 23B are enlarged views schematically showing modifications of the pump module shown in FIG. 1.
Figure 23B:
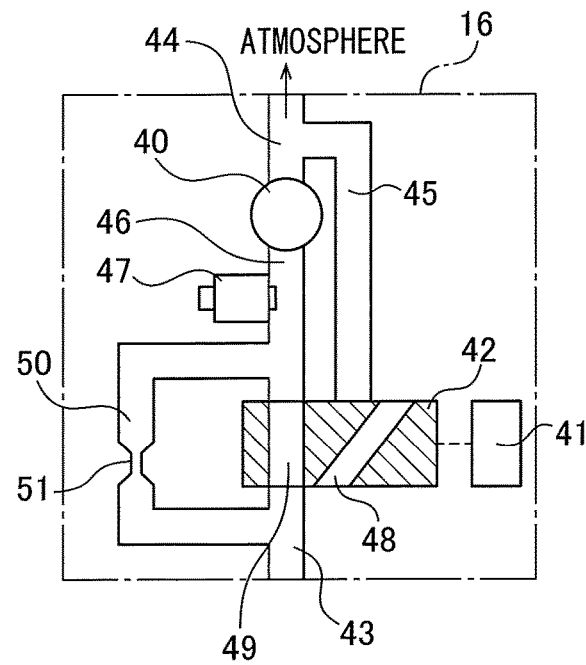

FIG. 23A to FIG. 36 show another embodiment configured so as to detect further more abnormal states. In this another embodiment, as the suction pump module 16 shown in FIG. 1, a suction pump module 16 schematically shown in FIG. 23A and FIG. 23B is used. Referring to FIG. 23A and FIG. 23B, in the suction pump module 16 shown in FIG. 23A and FIG. 23B, a reference pressure detection passage 50 connecting the atmospheric pressure chamber connection path 43 and the suction passage 46 is added to the suction pump module 16 shown in FIG. 2A and FIG. 2B. Inside this reference pressure detection passage 50, a restricted opening 51 is provided.

Figure 24:
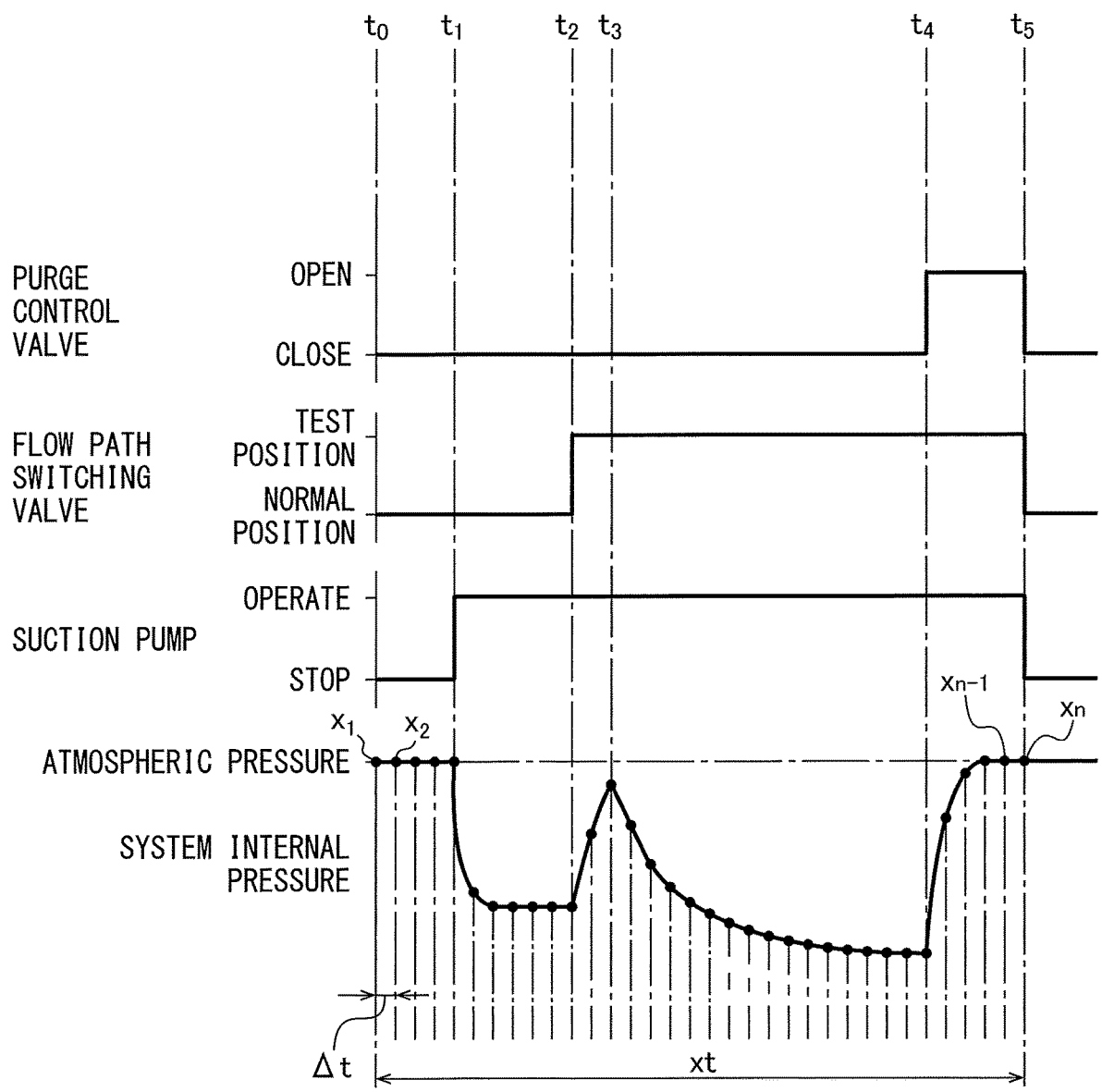
FIG. 24 is a view showing processing for detection of an abnormality and a change in the system internal pressure.

Next, processing for detection of an abnormality performed using the suction pump module 16 shown in FIG. 23A and FIG. 23B at the time of stopping operation of the vehicle will be explained. FIG. 24 shows, similar to FIG. 7, a valve closing instruction making the purge control valve 14 close and a valve opening instruction making the purge control valve 14 open, a switching instruction switching the flow path switching valve 42 to the normal position and a switching instruction switching the flow path switching valve 42 to the test position, an instruction for operating the suction pump 40 and an instruction for stopping the suction pump 40, and a change in the system internal pressure detected by the pressure sensor 47.

In FIG. 24, to shows the time of stopping operation of the vehicle. At this time, a valve closing instruction making the purge control valve 14 close, a switching instruction switching the flow path switching valve 42 to the normal position, and an instruction for stopping the suction pump 40 are issued. FIG. 24 shows when the purge control valve 14, flow path switching valve 42, and suction pump 40 are operating normally based on these instructions. Therefore, at the time of stopping operation of the vehicle, the purge control valve 14 is made to close, the flow path switching valve 42 is switched to the normal position, and the suction pump 40 is made to stop. This state is maintained for a constant time from the time of stopping operation of the vehicle to the time $t_1$. During this constant period, the suction pump 40 continues stopped, so no action of suction by the suction pump 40 is performed. Therefore, the system internal pressure detected by the pressure sensor 47 becomes atmospheric pressure.

Next, if reaching the time t2, an instruction for operating the suction pump 40 is issued. At this time, the flow path switching valve 42 has been switched to the normal position shown in FIG. 23A. Therefore, if the suction pump 40 is operated, outside air is sucked in from the atmosphere communication pipe 17 through the atmosphere communication pipe connection path 44, atmosphere communication path 45, first passage 48, atmosphere communication chamber connection path 43, reference pressure detection passage 50 having the restricted opening 51, and suction passage 46. At this time, since the restricted opening 51 is provided, the inside of the suction passage 46 becomes a negative pressure. Therefore, the system internal pressure detected by the pressure sensor 47 falls as shown in FIG. 24.

In this case, the changes in the system internal pressure detected by the pressure sensor 47 show the changes in the system internal pressure when perforated by a hole of the same diameter as the diameter of the restricted opening 51. Therefore, the changes in the system internal pressure at this time become the reference for judging whether the fuel vapor escape prevention system is perforated by a hole. Therefore, the passage 50 will be referred to as the "reference pressure detection passage". Next, if reaching the time $t_2$, a switching instruction switching the flow path switching valve 42 to the test position shown in FIG. 23B is issued. If the flow path switching valve 42 is switched to the test position, since, at this time, the pressure at the inside of the fuel tank 5 and the inside of the canister 6 is atmospheric pressure, the pressure at the inside of the suction passage 46 rises. Therefore, if reaching the time $t_2$, the system internal pressure detected by the pressure sensor 47 rises as shown in FIG. 24. Next, if reaching the time $t_3$, it starts to fall due to the action of suction of air by the suction pump 40 from the inside of the fuel tank 5 and the inside of the canister 6. Next, around when reaching the time t4, the pressure no longer falls and the system internal pressure remains in the fallen state.

If reaching the time $t_4$, a valve opening instruction making the purge control valve 14 open is issued. On the other hand, at this time, the flow path switching valve 42 is maintained at the test position and the suction pump 40 continues to be operated. Therefore, at this time, the suction action due to the suction pump 40 is continued, but the purge control valve 14 is made to open, so the system internal pressure rapidly rises and becomes atmospheric pressure. Next, if reaching the time $t_5$, the purge control valve 14, flow path switching valve 42, and suction pump 40 are returned to the states at the time of stopping operation of the vehicle. That is, if reaching the time $t_5$, a valve closing instruction making the purge control valve 14 close, a switching instruction switching the flow path switching valve 42 to the normal position, and an instruction for stopping the suction pump 40 are issued.

On the other hand, in this embodiment, as shown in FIG. 24, from the time of stopping operation of the vehicle, that is, at the time period xt from the time $t_0$ to the time $t_5$, the system internal pressure is detected at every fixed time $\Delta t$ by the pressure sensor 47. In FIG. 24, $x_1, x_2 \ldots x_{n-1}$, and $x_n$ show the system internal pressures detected by the pressure sensor 47 at every fixed time $\Delta t$. The system internal pressures $x_1, x_2 \ldots x_{n-1}$, and $x_n$ at every fixed time $\Delta t$ detected by the pressure sensor 47 are stored once in the storage device. In this embodiment as well, an abnormality judgment estimation model able to estimate whether an abnormality occurs in the fuel vapor escape prevention system based on the system internal pressures $x_1, x_2 \ldots x_{n-1}$, and $x_n$ at every fixed time $\Delta t$ stored by the storage device by using a neural network is prepared.

In this embodiment as well, if an abnormality occurs in the fuel vapor escape prevention system, the pattern of change in the system internal pressure detected by the pressure sensor 47 becomes a pattern of change different from the pattern of change in the system internal pressure at the normal time shown in FIG. 24. Next, this will be explained with reference to FIG. 25 to FIG. 32. Note that, FIG. 25 to FIG. 32, in the same way as FIG. 24, shows a valve closing instruction making the purge control valve 14 close and valve opening instruction making the purge control valve 14 open, a switching instruction switching the flow path switching valve 42 to the normal position and a switching instruction switching the flow path switching valve 42 to the test position, an instruction for operating the suction pump 40 and an instruction for stopping the suction pump 40, and a change in the system internal pressure detected by the pressure sensor 47. Further, in FIG. 25 to FIG. 32, the broken lines show the patterns of change in the system internal pressure at the normal time shown in FIG. 24.

Figure 25:
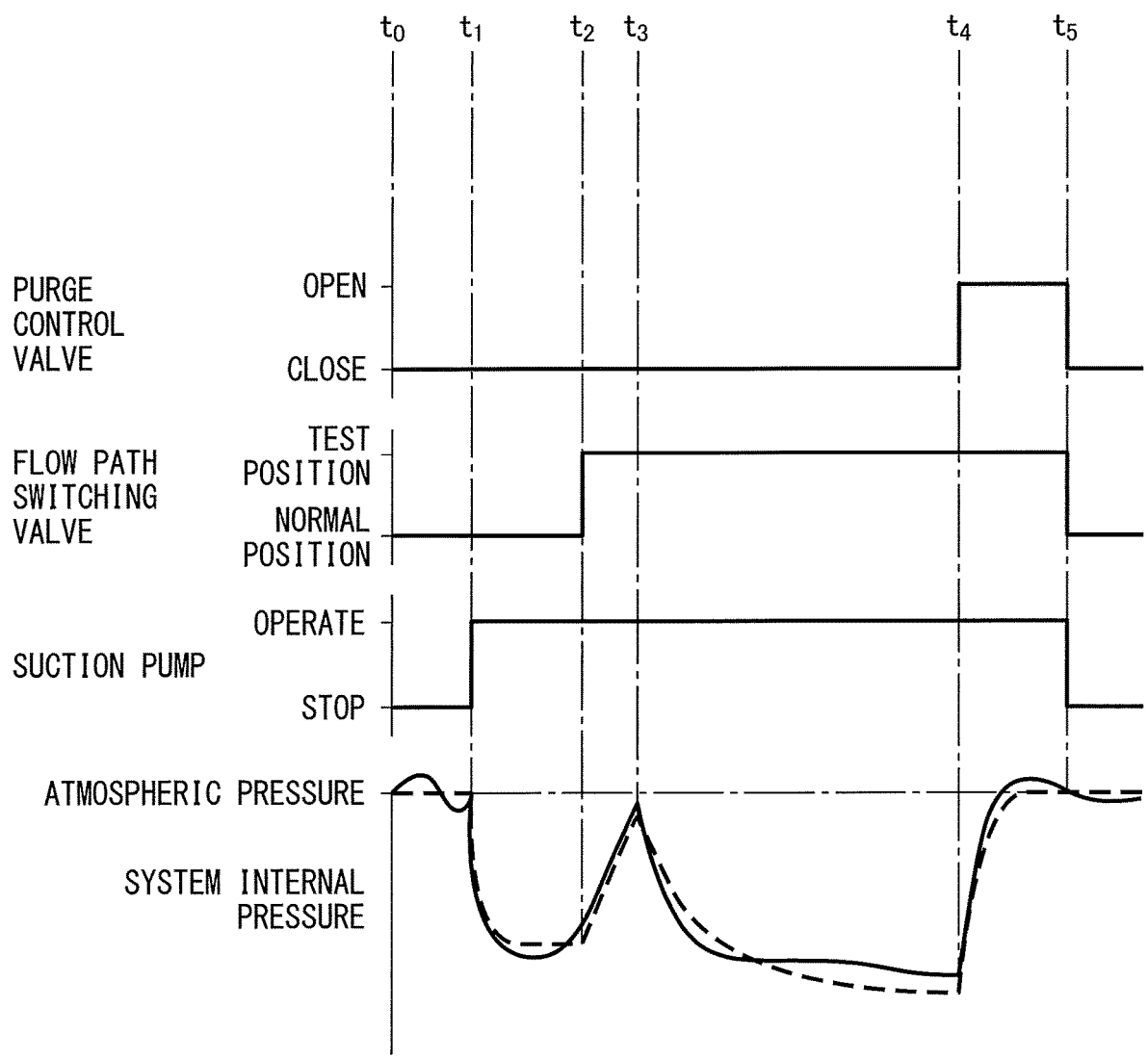
FIG. 25 is a view showing processing for detection of an abnormality and a change in the system internal pressure.

The solid line of FIG. 25 shows the pattern of change in the system internal pressure detected by the pressure sensor 47 in the case where an abnormality occurs in the pressure sensor 47. If an abnormality occurs in the pressure sensor 47 and the output of the pressure sensor 47 becomes no longer stable, as shown between the time $t_0$ and the time $t_1$, the system internal pressure detected by the pressure sensor 47 is not maintained at the atmospheric pressure but repeatedly fluctuates. Therefore, the pattern of change in the system internal pressure in this case as well becomes a pattern of change different from the pattern of change in the system internal pressure at the normal time.

Figure 26:
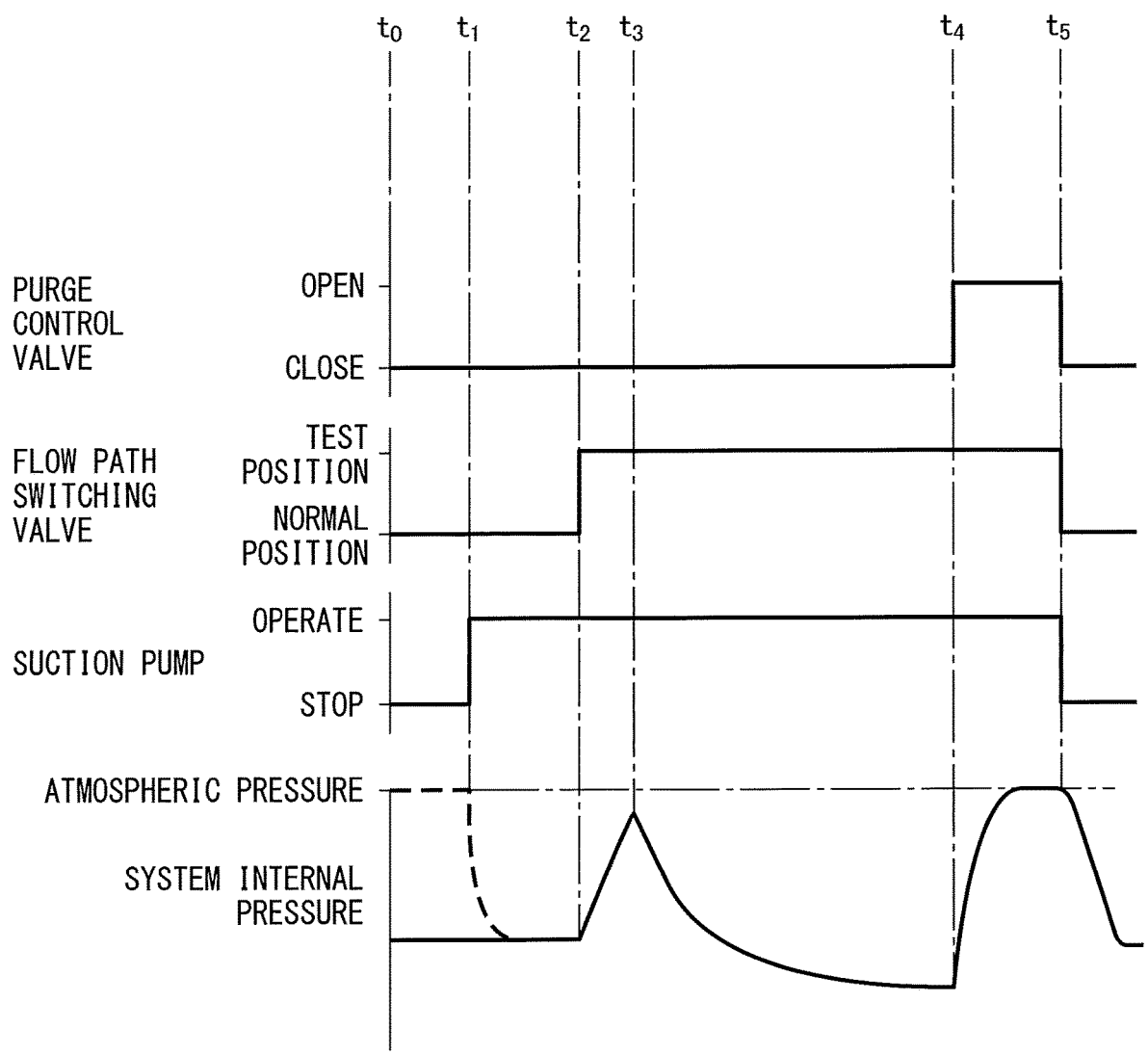
FIG. 26 is a view showing processing for detection of an abnormality and a change in the system internal pressure.

The solid line of FIG. 26 shows the pattern of change in the system internal pressure detected by the pressure sensor 47 in the case where an abnormality where the suction pump 40 continues operating occurs in which the suction pump 40 continues operating even if an instruction to stop the suction pump 40 is issued. As will be understood from FIG. 26, between the time $t_0$ and the time $t_2$, the flow path switching valve 42 is switched to the normal position shown in FIG. 23A. Therefore, if the suction pump 40 is made to operate at this time, the outside air is sucked in from the atmosphere communication pipe 17 through the atmosphere communication pipe connection path 44, atmosphere communication path 45, first passage 48, atmosphere communication chamber connection path 43, reference pressure detection passage 50 having the restricted opening 51, and suction passage 46. At this time, the inside of the suction passage 46 becomes a negative pressure. Therefore, at this time, the system internal pressure detected by the pressure sensor 47 is a low value such as shown in FIG. 26. Therefore, the pattern of change in the system internal pressure in this case as well becomes a pattern of change different from the pattern of change in the system internal pressure at the normal time.

Figure 27:
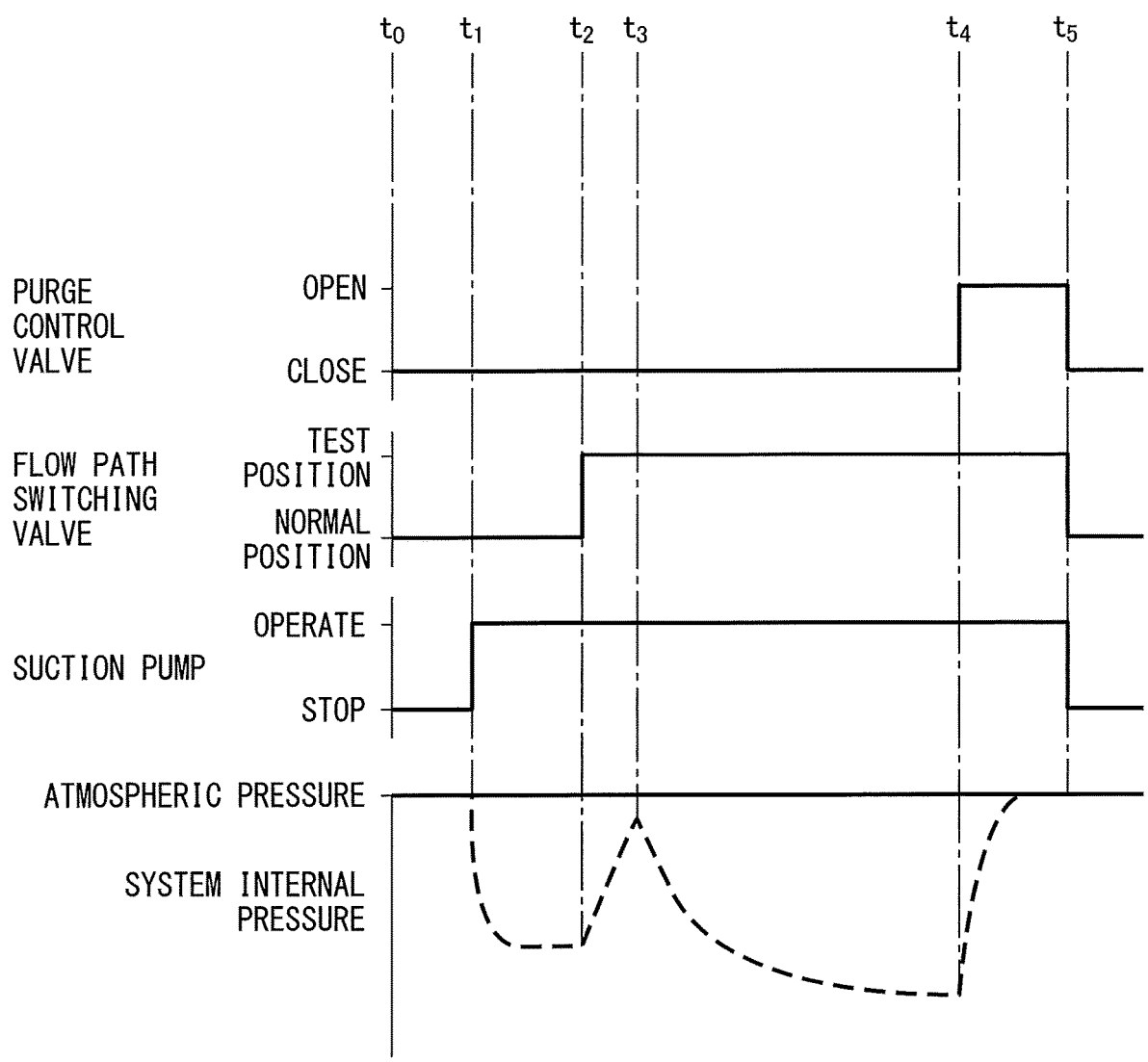
FIG. 27 is a view showing processing for detection of an abnormality and a change in the system internal pressure.

The solid line of FIG. 27 shows the pattern of change in the system internal pressure detected by the pressure sensor 47 in the case where an abnormality where the suction pump 40 stops operating occurs in which the suction pump 40 continues stopped even if an instruction for operating the suction pump 40 is issued. At this time, the entirety of the inside of the fuel vapor escape prevention system becomes the atmospheric pressure, so as shown in FIG. 27, the system internal pressure detected by the pressure sensor 47 is maintained at atmospheric pressure. Therefore, the pattern of change in the system internal pressure in this case as well becomes a pattern of change different from the pattern of change in the system internal pressure at the normal time.

Figure 28:
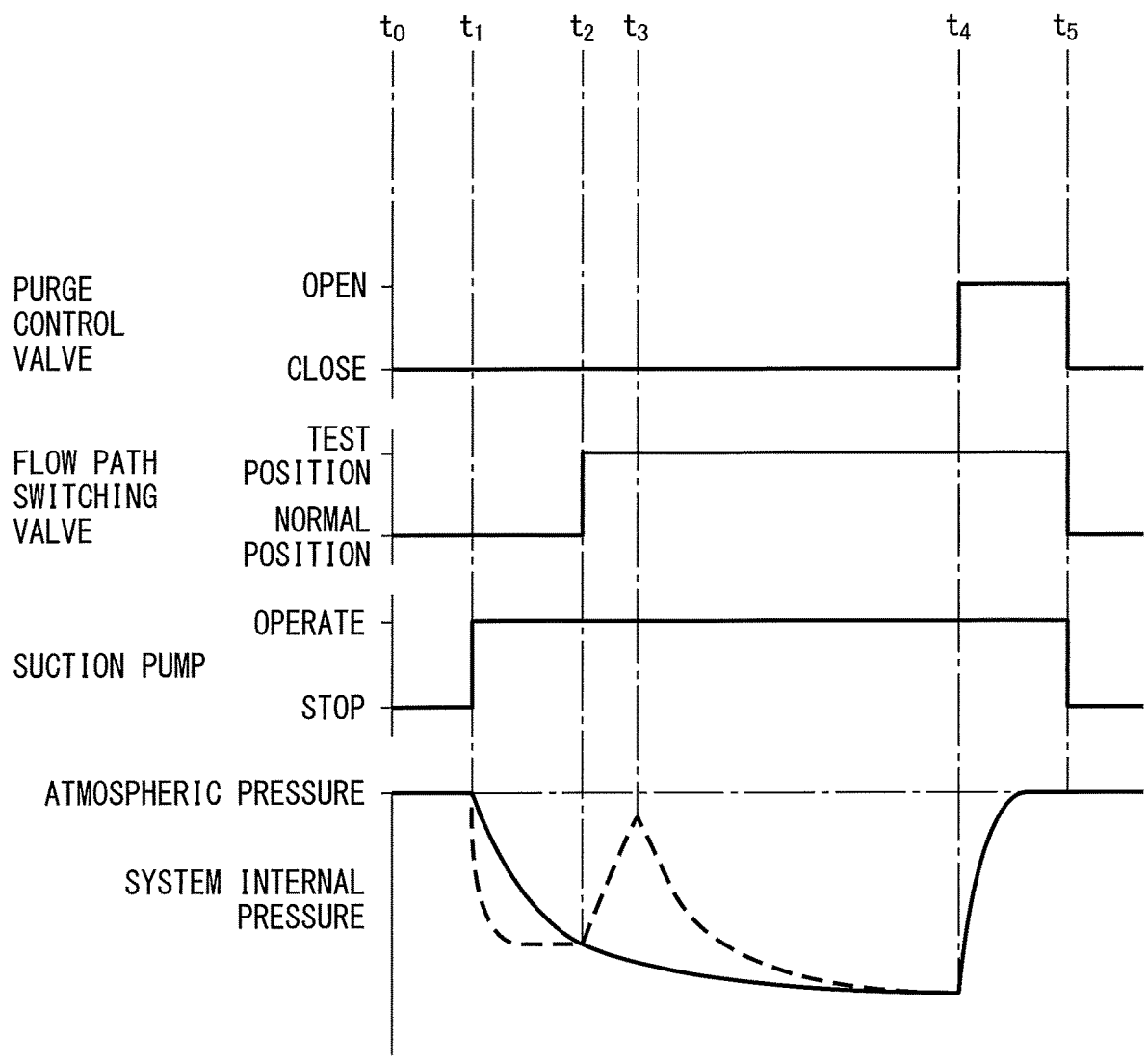
FIG. 28 is a view showing processing for detection of an abnormality and a change in the system internal pressure.

The solid line of FIG. 28 shows the pattern of change in the system internal pressure detected by the pressure sensor 47 in the case where an abnormality where the flow path switching valve 42 sticks at the test position occurs in which the flow path switching valve 42 continues to stick at the test position shown in FIG. 23B. In this case, if the suction pump 40 is made to operate at the time $t_1$, outside air is sucked in from the atmosphere communication pipe 17 through the atmosphere communication pipe connection path 44, atmosphere communication path 45, first passage 48, atmosphere communication chamber connection path 43, reference pressure detection passage 50 having the restricted opening 51, and suction passage 46. Accordingly, the system internal pressure detected by the pressure sensor 47 rapidly falls as shown in FIG. 28 and is maintained at the fallen state. Therefore, the pattern of change in the system internal pressure in this case as well becomes a pattern of change different from the pattern of change in the system internal pressure at the normal time.

Figure 29:
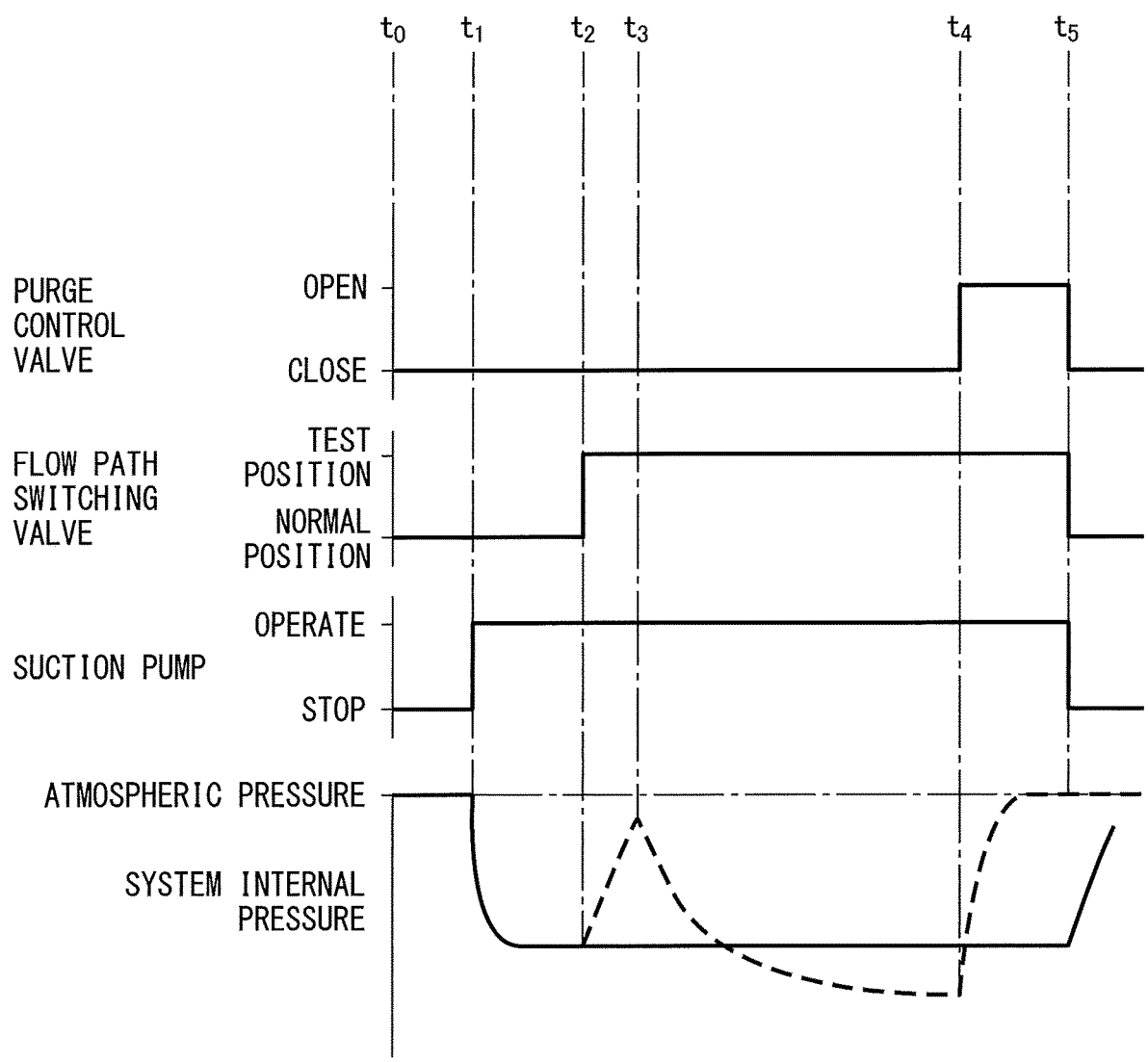
FIG. 29 is a view showing processing for detection of an abnormality and a change in the system internal pressure.

The solid line of FIG. 29 shows the pattern of change in the system internal pressure detected by the pressure sensor 47 if the abnormality where the flow path switching valve 42 sticks at the normal position occurs in which the flow path switching valve 42 continues to stick to the normal position shown in FIG. 23A. In this case, if, at the time $t_1$, the suction pump 40 is made to operate, the suction action of the air at the inside of the fuel tank 5 and the inside of the canister 6 is started. Therefore, the system internal pressure detected by the pressure sensor 47 gradually falls such as shown in FIG. 29. Therefore, the pattern of change in the system internal pressure in this case as well becomes a pattern of change different from the pattern of change in the system internal pressure at the normal time.

Figure 30:
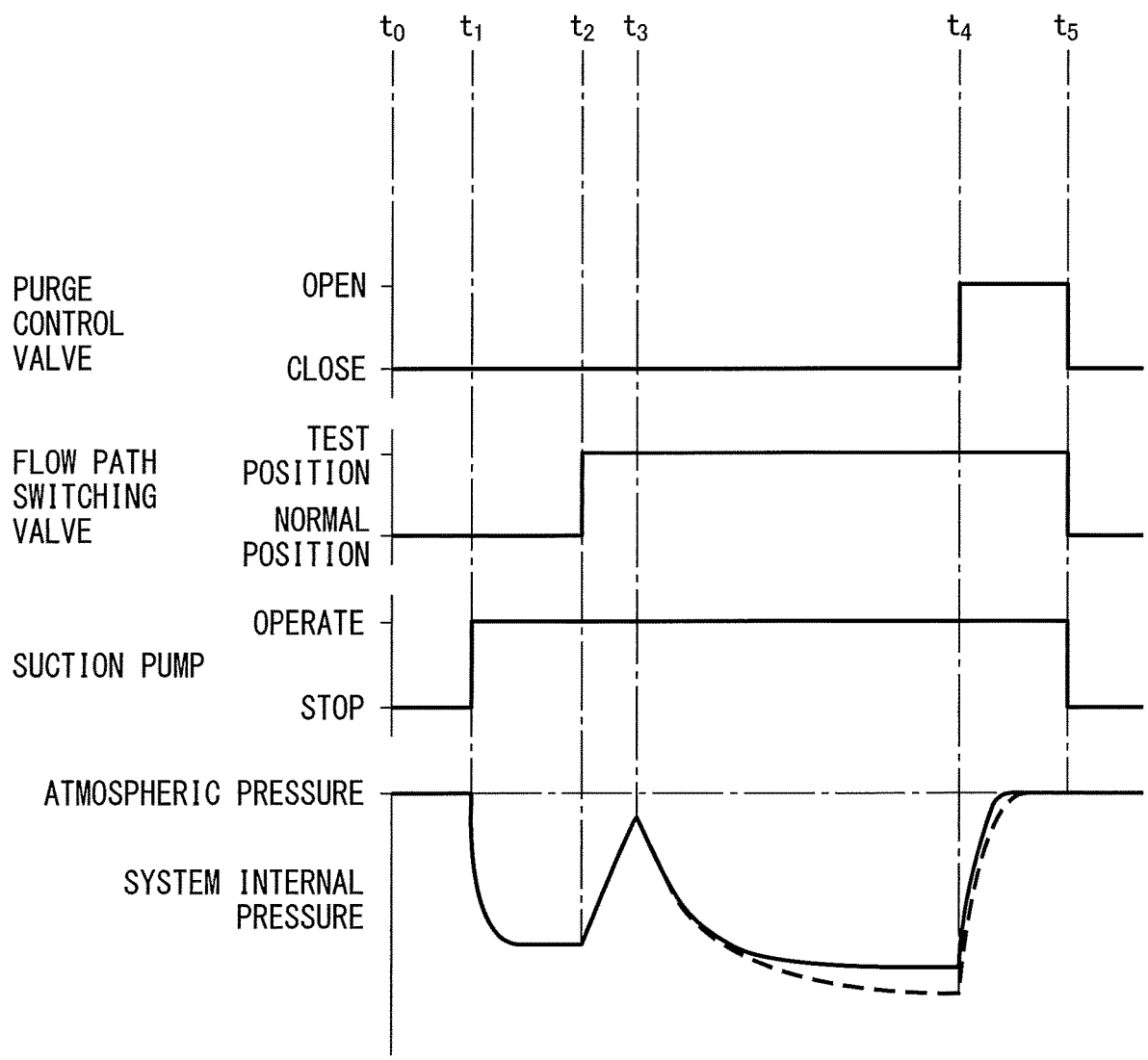
FIG. 30 is a view showing processing for detection of an abnormality and a change in the system internal pressure.

The solid line of FIG. 30, for example, shows the pattern of changes in the system internal pressure if the walls of the fuel vapor flow pipe 12 or 13 are perforated by a small hole. In this case, the outside air continues to flow inside the system through the small hole, so the system internal pressure does not fall down to the system internal pressure at the normal time and therefore the pattern of change in the system internal pressure in this case as well becomes a pattern of change different from the pattern of change in the system internal pressure at the normal time.

Figure 31:
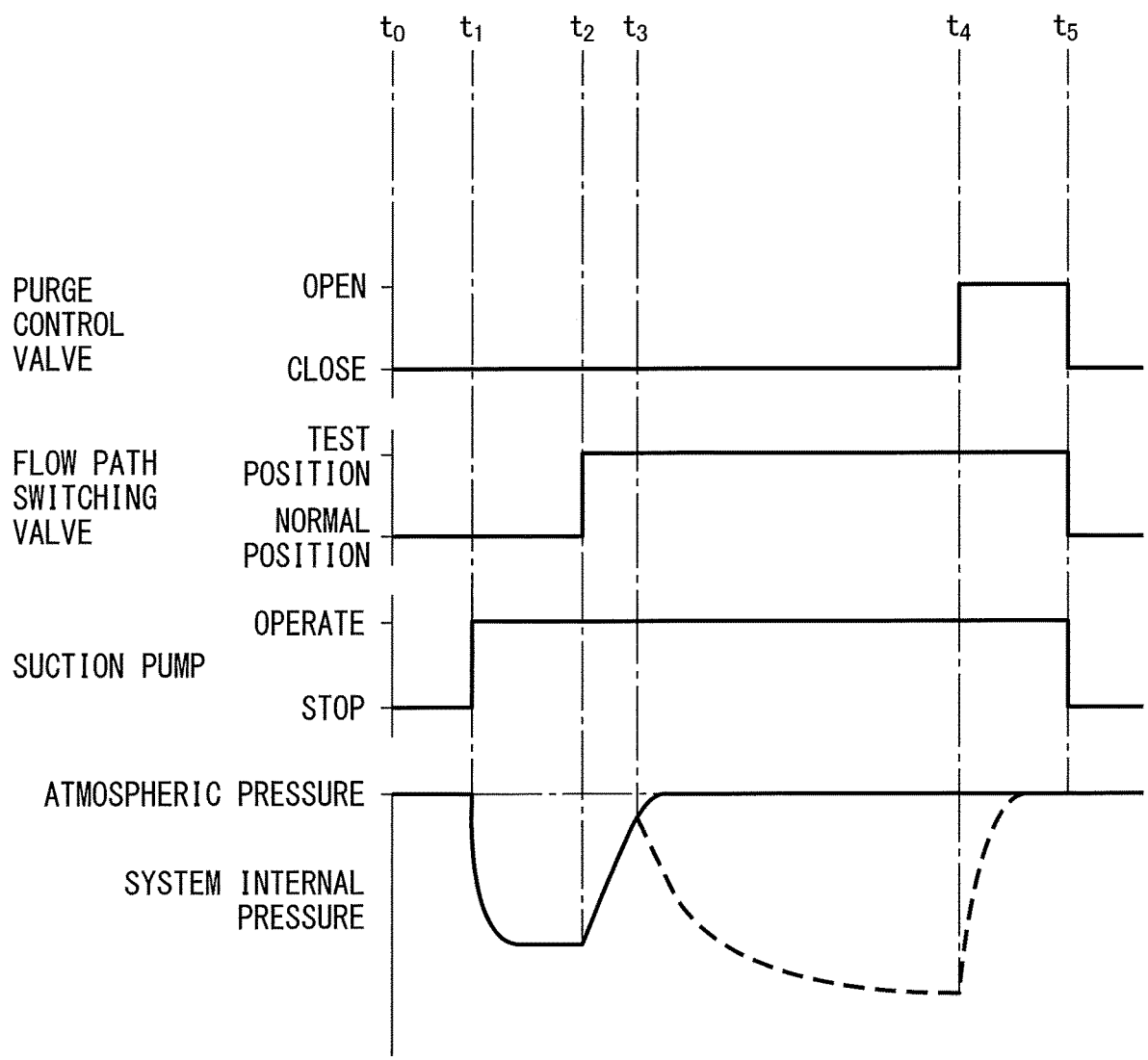
FIG. 31 is a view showing processing for detection of an abnormality and a change in the system internal pressure.

The solid line of FIG. 31 shows when a valve opening abnormality occurs in which the purge control valve 14 continues opened even if a valve closing instruction making the purge control valve 14 close is issued. At this time, the pressure at the inside of the fuel tank 5 and the inside of the canister 6 is atmospheric pressure. Therefore, at the time $t_2$, even if the flow path switching valve 42 is switched from the normal position shown in FIG. 23A to the test position shown in FIG. 23B and the suction pump 40 is made to operate, the system internal pressure detected by the pressure sensor 47, as shown in FIG. 31, rises to atmospheric pressure and is maintained at atmospheric pressure. Therefore, the pattern of change in the system internal pressure in this case as well becomes a pattern of change different from the pattern of change in the system internal pressure at the normal time.

Figure 32:
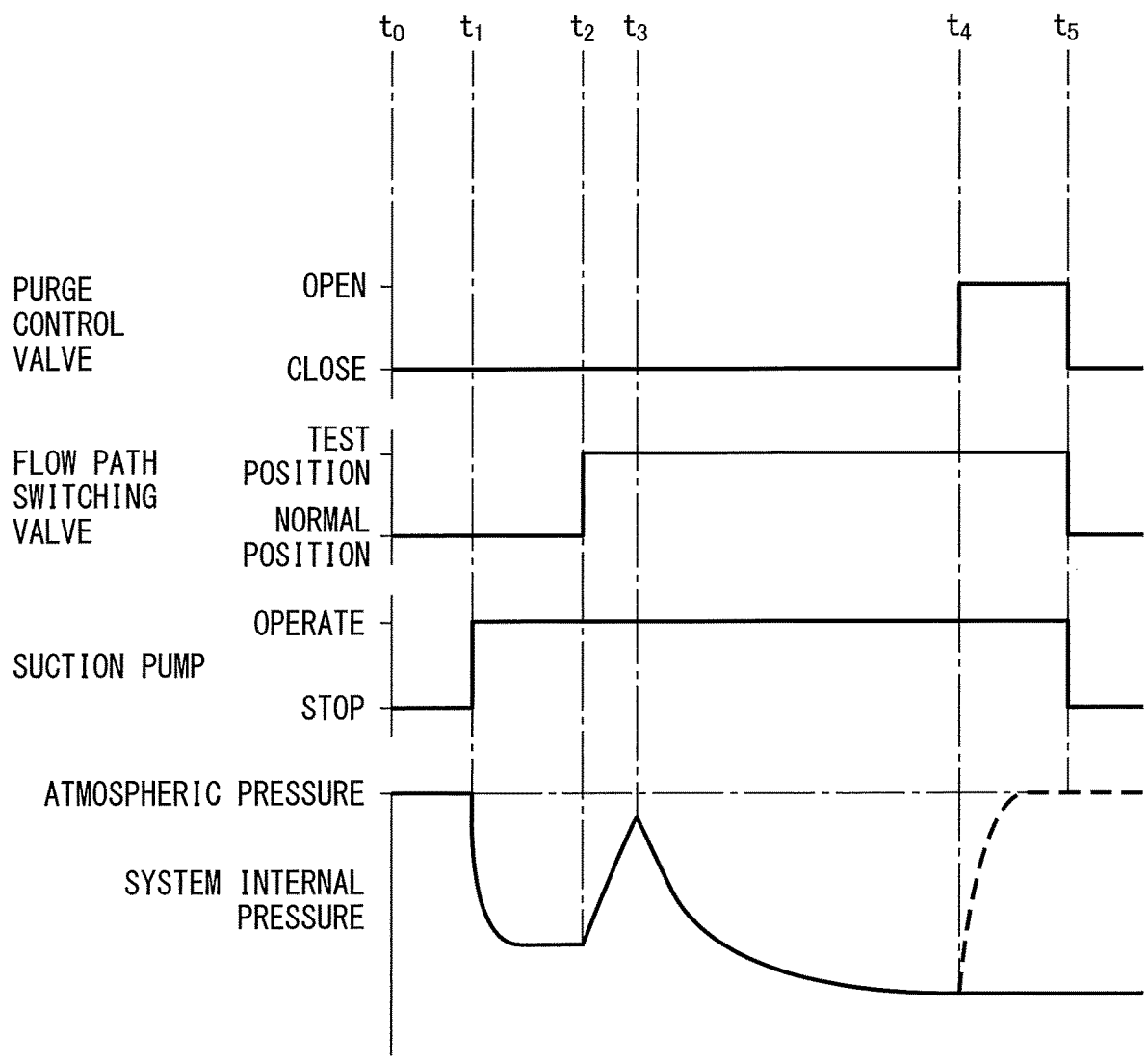
FIG. 32 is a view showing processing for detection of an abnormality and a change in the system internal pressure.

The solid line in FIG. 32 shows when a valve closing abnormality of the purge control valve 14 continuing closed even if a valve opening instruction making the purge control valve 14 open is issued. At this time, at the time $t_4$, even if a valve opening instruction making the purge control valve 14 open is issued, the purge control valve 14 continues closed, so the inside of the fuel tank 5 and the inside of the canister 6 are maintained at a negative pressure and the system internal pressure detected by the pressure sensor 47 is maintained at a low state such as shown in FIG. 32. Therefore, the pattern of change in the system internal pressure in this case also becomes a pattern of change different from the pattern of change in the system internal pressure at the normal time.

If an abnormality occurs in this way, the pattern of change in the system internal pressure becomes a pattern of change different from the pattern of change in the system internal pressure at the normal time. Therefore, in this embodiment as well, as shown in FIG. 24, in the time period xt from the time $t_0$ to the time $t_5$, the system internal pressure is detected at every fixed time $\Delta t$ by the pressure sensor 47. In FIG. 24, $x_1, x_2 \ldots x_{n-1}$, and $x_n$ show the system internal pressure detected at every fixed time $\Delta t$ by the pressure sensor 47. The system internal pressures $x_1, x_2 \ldots x_{n-1}$, and $x_n$ at every fixed time $\Delta t$ detected by the pressure sensor 47 are stored once in the storage device. In this embodiment as well, an abnormality judgment estimation model able to estimate whether an abnormality occurs in the fuel vapor escape prevention system based on the system internal pressures $x_1, x_2 \ldots x_{n-1}$, and $x_n$ at every fixed time $\Delta t$ stored by the storage device by using a neural network is prepared.

Figure 33:
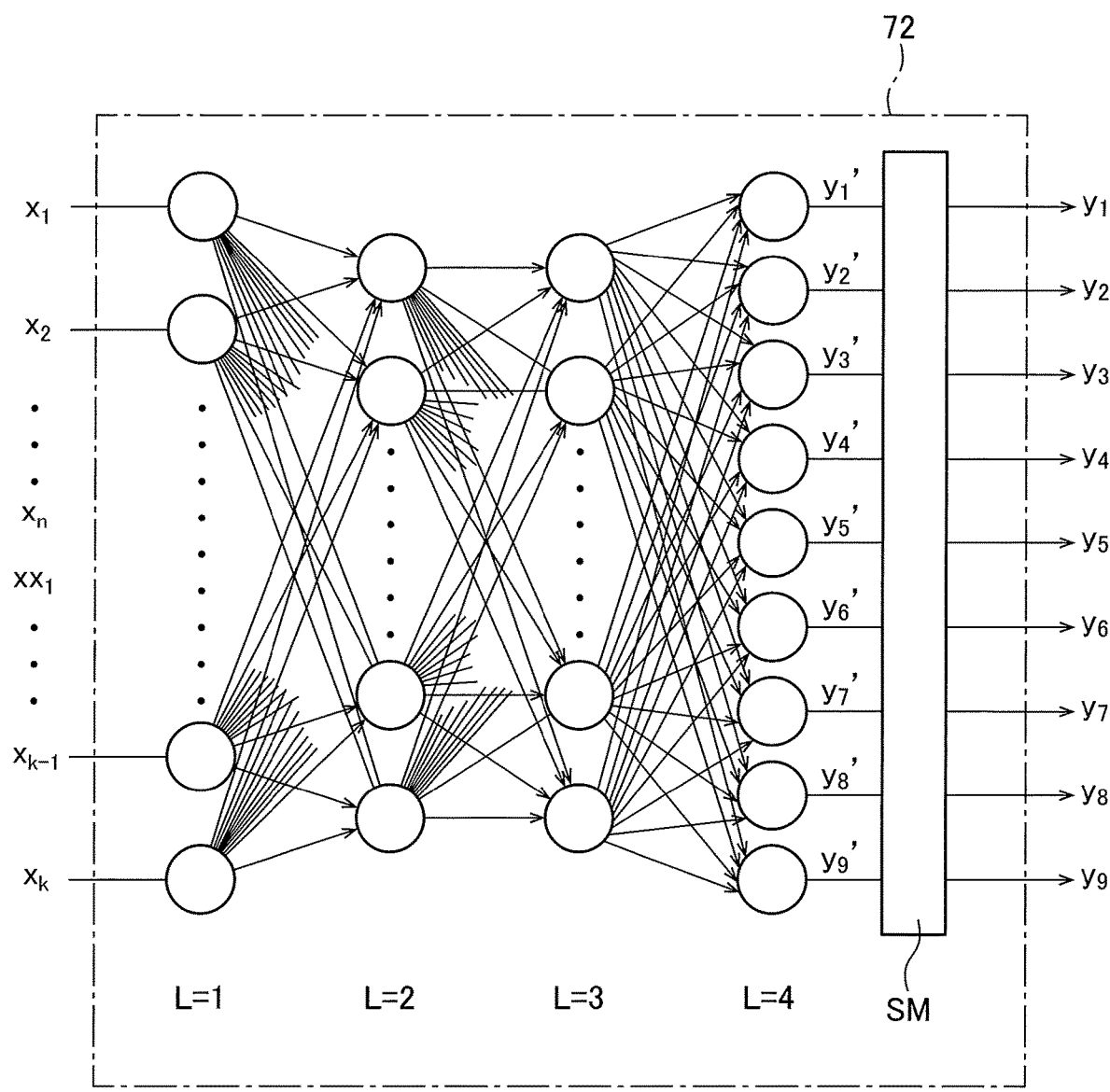
FIG. 33 is a view showing a neural network used in another example according to the present invention.

Next, the neural network 72 used for preparation of the abnormality judgment estimation model will be explained while referring to FIG. 33. If referring to FIG. 33, in this neural network 72 as well, in the same way as the neural network shown in FIG. 12, L=1 shows an input layer, L=2 and L=3 show hidden layers, and L=4 shows an output layer. As shown in FIG. 33, the input layer (L=1) is comprised of n+k number of nodes while the "n" number of input values $x_1, x_2 \ldots x_{n-1}$, and $x_n$ and the "k" number of input values $xx_1, xx_2 \ldots xx_{k-1}$, and $xx_k$ are input to the nodes of the input layer (L=1). In this case, the "n" number of input values $x_1, x_2 \ldots x_{n-1}$, and $x_n$ are system internal pressures $x_1, x_2 \ldots x_{n-1}$, and $x_n$ for each fixed value $\Delta t$ shown in FIG. 24.

On the other hand, FIG. 33 describes the hidden layer (L=2) and hidden layer (L=3), but the number of these hidden layers may also be made a single layer or any other number of layers. Further, the number of nodes of these hidden layers may also be made any number of nodes.

Further, in this embodiment, the number of nodes of the output layer (L=4) is made nine nodes and the output values from the nodes of the output layer (L=4) are shown by $y_1'$, $y_2'$, $y_3'$, $y_4'$, $y_5'$, $y_6'$, $y_7'$, $y_8'$, and $y_9'$. These output values $y_1'$, $y_2'$, $y_3'$, $y_4'$, $y_5'$, $y_6'$, $y_7'$, $y_8'$, and $y_9'$ are sent to the softmax layer SM where they are converted to the respectively corresponding output values $y_1$, $y_2$, $y_3$, $y_4$, $y_5$, $y_6$, $y_7$, $y_8$, and $y_9$. The total of these output values $y_1$, $y_2$, $y_3$, $y_4$, $y_5$, $y_6$, $y_7$, $y_8$, and $y_9$ is 1. The output values $y_1$, $y_2$, $y_3$, $y_4$, $y_5$, $y_6$, $y_7$, $y_8$, and $y_9$ express the ratios to 1.

The input values $xx_1$, $xx_2$ ... $xx_{k-1}$, and $xx_k$ in FIG. 33 are the same as the input values $xx_1$, $xx_2$ ... $xx_{k-1}$, and $xx_k$ in FIG. 12. These input values $xx_1$, $xx_2$ ... $xx_{k-1}$, and $xx_k$ were already explained while referring to the list shown in FIG. 13, so the explanations of these input values $xx_1$, $xx_2$ ... $xx_{k-1}$, and $xx_k$ will be omitted.

FIG. 34 shows a list of what kinds of states the output values $y_1'$, $y_2'$, $y_3'$, $y_4'$, $y_5'$, $y_6'$, $y_7'$, $y_8'$, and $y_9'$ and output values $y_1$, $y_2$, $y_3$, $y_4$, $y_5$, $y_6$, $y_7$, $y_8$, and $y_9$ shown in FIG. 33 show. As will be understood from FIG. 34, the output value $y_1'$ and output value $y_1$ show a perforation abnormality in which the walls of the fuel vapor flow pipe 12 or 13 are perforated by a small hole, the output value $y_2'$ and output value $y_2$ show a valve opening abnormality in which the purge control valve 14 continues opened, the output value $y_3'$ and output value $y_3$ show a valve closing abnormality in which the purge control valve 14 continues closed, the output value $y_4'$ and output value $y_4$ show an abnormality of the pressure sensor 47, the output value $y_5'$ and output value $y_5$ show an abnormality of the flow path switching valve 42 sticking at the normal position, the output value $y_6'$ and output value $y_6$ show an abnormality of the flow path switching valve 42 sticking at the test position, the output value $y_7'$ and output value $y_7$ show an abnormality in which the suction pump 40 continues operating, the output value $y_8'$ and output value $y_8$ show an abnormality in which the suction pump 40 continues to stop operating, and the output value $y_9'$ and output value $y_9$ show the normal times.

Now then, in this embodiment as well, as the input values $x_1$, $x_2$ ... $x_{n-1}$, and $x_n$ and the input values $xx_1$, $xx_2$ ... $xx_{k-1}$, and $xx_k$ of the neural network 72 shown in FIG. 33, the values of only the essential input parameters shown in FIG. 13, that is, only the system internal pressures $x_1$, $x_2$ ... $x_{n-1}$, and $x_n$ and atmospheric pressure $xx_1$, can be used. Of course, in addition to the values of the essential input parameters, it is possible to make the values of the large influence input parameters the input values $xx_1$, $xx_2$ ... $xx_{k-1}$, and $xx_k$ and possible to make the values of the large influence input parameters and the values of the auxiliary input parameters in addition to the values of the essential input parameters the input values $xx_1$, $xx_2$ ... $xx_{k-1}$, $xx_k$. Note that, below, this embodiment will be explained using as an example the case of making the values of the large influence input parameters and the values of the auxiliary input parameters in addition to the values of the essential input parameters the input values $xx_1$, $xx_2$ ... $xx_{k-1}$, $xx_k$ (in this example, k=4).

In this embodiment as well, first, the input values $x_1$, $x_2$ ... $x_{n-1}$, and $x_n$, the input values $xx_1$, $xx_2$ ... $xx_{k-1}$, and $xx_k$, and the training data, that is, the truth labels yt, are used to prepare the training data set shown in FIG. 16. In this embodiment as well, in FIG. 16, the input values $x_1$, $x_2$ ... $x_{n-1}$, and $x_n$ show the system internal pressures for each fixed time $\Delta t$ detected by the pressure sensor 47, and the input values $xx_1$, $xx_2$ ... $xx_{k-1}$, and $xx_k$, that is, the input values $xx_1$, $xx_2$, $xx_3$, and $xx_4$ show the atmospheric pressure, the remaining amount of fuel in the fuel tank 5, the temperature of the fuel in the fuel tank 5, and the characteristic value of flow rate of the suction pump 40.

On the other hand, in FIG. 16, $yt_1$ ... yts (in this example, s=9) show the training data for the output values $y_1'$, $y_2'$, $y_3'$, $y_4'$, $y_5'$, $y_6'$, $y_7'$, $y_8'$, and $y_9'$ and the output values $y_1$, $y_2$, $y_3$, $y_4$, $y_5$, $y_6$, $y_7$, $y_8$, and $y_9$ shown in FIG. 34, that is, the truth labels. That is, in FIG. 16, $yt_1$ shows the truth label when a perforation abnormality occurs in which the walls of the fuel vapor flow pipe 12 or 13 are perforated by a small hole, $yt_2$ shows the truth label when a valve opening abnormality occurs in which the purge control valve 14 continues opened, $yt_3$ shows the truth label when a valve closing abnormality occurs in which the purge control valve 14 continues closed, $yt_4$ shows the truth label when an abnormality occurs in the pressure sensor 47, $yt_5$ shows the truth label when an abnormality occurs in which the flow path switching valve 42 sticks at the normal position, $yt_6$ shows the truth label when an abnormality occurs in which the flow path switching valve 42 sticks at the test position, $yt_7$ shows the truth label when an abnormality occurs in which the suction pump 40 continues operating, $yt_8$ shows the truth label when an abnormality occurs in which the suction pump 40 continues to stop operating, and $yt_9$ shows a truth label at the normal time.

In this case, for example, when a perforation abnormality occurs in which the walls of the vapor flow pipe 12 or 13 are perforated by a small hole, only the truth label yt1 is made 1, while the remaining truth labels $yt_2$, $yt_3$, $yt_4$, $yt_5$, $yt_6$, $y_7$, $yt_8$, and $yt_9$ are all made zero. Similarly, when a valve opening abnormality occurs in which the purge control valve 14 continues opened, only the truth label $yt_2$ is made 1, while the remaining truth labels $yt_1$, $yt_3$, $yt_4$, $yt_5$, $yt_6$, $yt_7$, $yt_8$, and $yt_9$ are all made zero. When a valve closing abnormality occurs in which the purge control valve 14 continues closed, only the truth label $yt_3$ is made 1, while the remaining truth labels $yt_1$, $yt_2$, $yt_4$, $yt_5$, $yt_6$, $yt_7$, $yt_8$, and $yt_9$ are all made zero. When an abnormality occurs in the pressure sensor 47, only the truth label $yt_4$ is made 1, while the remaining truth labels $yt_1$, $yt_2$, $yt_3$, $yt_5$, $yt_6$, $yt_7$, $yt_8$, and $yt_9$ are all made zero. When an abnormality occurs in which the flow path switching valve 42 sticks at the normal position, only the truth label $yt_5$ is made 1, while the remaining truth labels $yt_1$, $yt_2$, $yt_3$, $yt_4$, $yt_6$, $yt_7$, $yt_8$, and $yt_9$ are all made zero. When an abnormality occurs in which the flow path switching valve 42 sticks at the test position, only the truth label $yt_6$ is made 1, while the remaining truth labels $yt_1$, $yt_2$, $yt_3$, $yt_4$, $yt_5$, $yt_7$, $yt_8$, and $yt_9$ are all made zero. When an abnormality occurred in which the suction pump 40 continues operating, only the truth label $yt_7$ is made 1, while the remaining truth labels $yt_1$, $yt_2$, $yt_3$, $yt_4$, $yt_5$, $yt_6$, $yt_8$, and $yt_9$ are all made zero. When an abnormality occurs in which the suction pump 40 continues to stop operating, only the truth label $yt_8$ is made 1, while the remaining truth labels $yt_1$, $yt_2$, $yt_3$, $yt_4$, $yt_5$, $yt_6$, $yt_7$, and $yt_9$ are all made zero. When at the normal time, only the truth label $yt_9$ is made 1, while the remaining truth labels $yt_1$, $yt_2$, $yt_3$, $yt_4$, $yt_5$, $yt_6$, $yt_7$, and $yt_8$ are all made zero.

On the other hand, as shown in FIG. 16, in this training data set, "m" number of data showing the relationship with the input values $x_1$, $x_2$ ... $x_{n-1}$, and $x_n$ and the input values $xx_1$, $xx_2$ ... $xx_{k-1}$, and $xx_k$ and the truth labels yt is acquired. For example, the No. 2 data lists the acquired input values $x_{12}$, $x_{22}$ ... $x_{n-12}$, and $x_{n2}$, input values $xx_{12}$, $xx_{22}$ ... $xx_{k-12}$, and $xx_{k2}$, and truth labels $yt_{12}$ ... $yt_{S2}$, the No. m−1 data lists the acquired input values $x_{1m-1}$, $x_{2m-1}$, ... $x_{n-1m-1}$, and $x_{nm-1}$, input values $xx_{1m-1}$, $xx_{2m-1}$ ... $x_{k-1m-1}$, and $xx_{km-1}$, and truth labels $yt_{Sm-1}$ of the input parameters.

This training data set is also prepared by a method similar to the method already explained with reference to FIG. 17. That is, in this case as well, the test control device 81 shown in FIG. 17 is used to estimate whether an abnormality occurs in the fuel vapor escape prevention system by performing processing for detection of an abnormality in accordance with a predetermined order of operation of the purge control valve 14, flow path switching valve 42, and suction pump 40. At this time, the state of the fuel vapor escape prevention system is successively changed to a state where a perforation abnormality occurs in which the walls of the fuel vapor flow pipe 12 or 13 are perforated by a small hole, a state where a valve opening abnormality occurred in which the purge control valve 14 continues opened, a state where a valve closing abnormality occurs in which the purge control valve 14 continues closed, a state where an abnormality occurred in the pressure sensor 47, a state where an abnormality occurs in which the flow path switching valve 42 sticks at the normal position, a state where an abnormality occurs in which the flow path switching valve 42 sticks at the test position, a state where an abnormality occurs in which the suction pump 40 continues operating, a state where an abnormality occurs in which the suction pump 40 continues to stop operating, and a normal state. In the changed states, the combination of atmospheric pressure, the remaining amount of fuel in the fuel tank 5, the temperature of the fuel in the fuel tank 5, and the characteristic value of flow rate of the suction pump 40 is successively changed while processing for detection of an abnormality is repeatedly performed.

Figure 35:
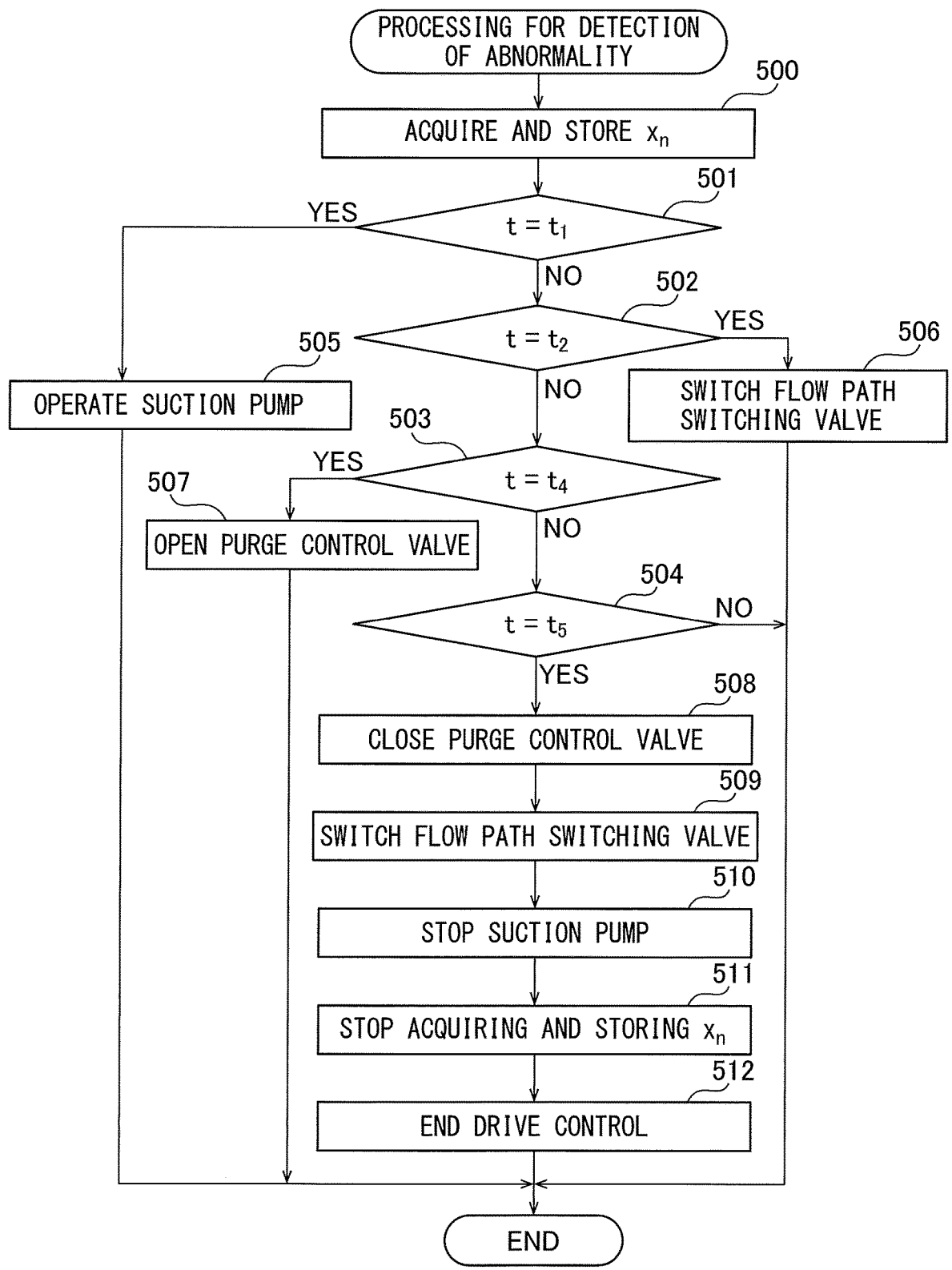
FIG. 35 is a flow chart for performing processing for detection of an abnormality.

While this processing for detection of an abnormality is being performed, the data required for preparing the training data set is acquired. FIG. 35 shows the routine for processing for detection of an abnormality performed in the test control device 81 for performing this processing for detection of an abnormality. This routine for processing for detection of an abnormality routine is performed by interruption at every fixed time Δt shown in FIG. 24. Note that, in the routine shown in FIG. 35, "t" shows the point of time found when defining the time $t_0$ when the engine stops operating at FIG. 24 as zero and using this time $t_0$ as the starting point.

Referring to FIG. 35, first, at step 500, the system internal pressures $x_n$ detected by the pressure sensor 47 are acquired and stored. That is, as shown in FIG. 24, the system internal pressures $x_n$ are acquired at every fixed time Δt. The system internal pressures $x_n$ acquired at every fixed time Δt are stored in the test control device 81. Next, at step 501, it is judged if the time "t" is the time $t_1$ shown in FIG. 24. When the time "t" is not the time $t_1$ shown in FIG. 24, the routine proceeds to step 502 where it is judged if the time "t" is the time $t_2$ shown in FIG. 24. When the time "t" is not the time $t_2$ shown in FIG. 24, the routine proceeds to step 503 where it is judged if the time "t" is the time $t_4$ shown in FIG. 24. When the time "t" is not the time $t_4$ shown in FIG. 24, the routine proceeds to step 504 where it is judged if the time "t" is the time $t_5$ shown in FIG. 24. When the time "t" is not the time $t_5$ shown in FIG. 24, the processing cycle is ended.

On the other hand, when at step 501 it is judged that the time "t" is the time $t_1$ shown in FIG. 24, the routine proceeds to step 505 where an instruction for operating the suction pump 40 is issued. Next, the processing cycle is ended. Further, when at step 502 it is judged that the time "t" is the time $t_2$ shown in FIG. 24, the routine proceeds to step 506 where a switching instruction switching the flow path switching valve 42 to the test position is issued. Next, the processing cycle is ended. Further, when at step 503 it is judged that the time "t" is the time $t_4$ shown in FIG. 24, the routine proceeds to step 507 where a valve opening instruction making the purge control valve 14 open is issued. Next, the processing cycle is ended.

On the other hand, when, at step 504, it is judged that the time "t" is the time $t_5$ shown in FIG. 24, the routine proceeds to step 508 where a valve closing instruction causing the purge control valve 14 to close is issued. Next, at step 509, a switching instruction switching the flow path switching valve 42 to the normal position is issued. Next, at step 510, an instruction for stopping the suction pump 40 is issued. Next, at step 511, the action of acquiring and storing the system internal pressure $x_n$ detected by the pressure sensor 47 is stopped. Next, at step 512, the processing for detection of an abnormality is ended. At the test control device 81 shown in FIG. 17, if the processing for detection of an abnormality ends, the next processing for detection of an abnormality is started.

In this way, the system internal pressure $x_n$ for each fixed time Δt when the combination of the atmospheric pressure, the remaining amount of fuel in the fuel tank 5, the temperature of the fuel in the fuel tank 5, and the characteristic value of flow rate of the suction pump 40 is changed in each state of a state where a perforation abnormality occurs in which the walls of the fuel vapor flow pipe 12 or 13 are perforated by a small hole, a state where a valve opening abnormality occurs in which the purge control valve 14 continues opened, a state where a valve closing abnormality occurs in which the purge control valve 14 continues closed, a state where an abnormality occurs in the pressure sensor 47, a state where an abnormality of the flow path switching valve 42 sticking at the normal position occurs, a state where an abnormality occurs in which the flow path switching valve 42 sticks at the test position, a state where an abnormality occurs in which the suction pump 40 continues operating, a state where an abnormality occurs in which the suction pump 40 continues to stop operating, and a normal state are stored in the test control device 81. That is, the No. 1 to No. "m" input values $x_{1m}, x_{2m} \ldots x_{nm-1}$, and $x_{nm}$, the input values $xx_{1m}, xx_{2m} \ldots xx_{km-1}$, and $xx_{km}$, and the truth label $yt_{sm}$ (m=1, 2, 3 . . . m) of the training data set shown in FIG. 16 are stored inside the test control device 81.

If a training data set is prepared in this way, electronic data of the prepared training data set is used to learn the weights of the neural network 72 shown in FIG. 33. In this case, the weights of the neural network 72 shown in FIG. 33 are also learned by the learning apparatus 82 shown in FIG. 17 using the routine for processing for learning weights of the neural network shown in FIG. 19. If the weights of the neural network 72 finish being learned, the learned weights of the neural network 72 are stored in the memory 84 of the learning apparatus 82. In this way, an abnormality judgment estimation model able to estimate whether an abnormality occurs in the fuel vapor escape prevention system is prepared.

In this embodiment as well, the thus prepared abnormality judgment estimation model of the fuel vapor escape prevention system is used to diagnose a fault of the fuel vapor escape prevention system in a commercially available vehicle. To this end, this abnormality judgment estimation model of the fuel vapor escape prevention system is stored in the electronic control unit 20 of the commercially available vehicle using a routine for reading data into the electronic control unit shown in FIG. 20. That is, referring to FIG. 20, first, at step 300, the number of nodes of the input layer (L=1) of the neural network 72 shown in FIG. 33, the numbers of nodes of the hidden layer (L=2) and hidden layer (L=3), and the number of nodes of the output layer (L=4) are read into the memory 22 of the electronic control unit 20.

Figure 36:
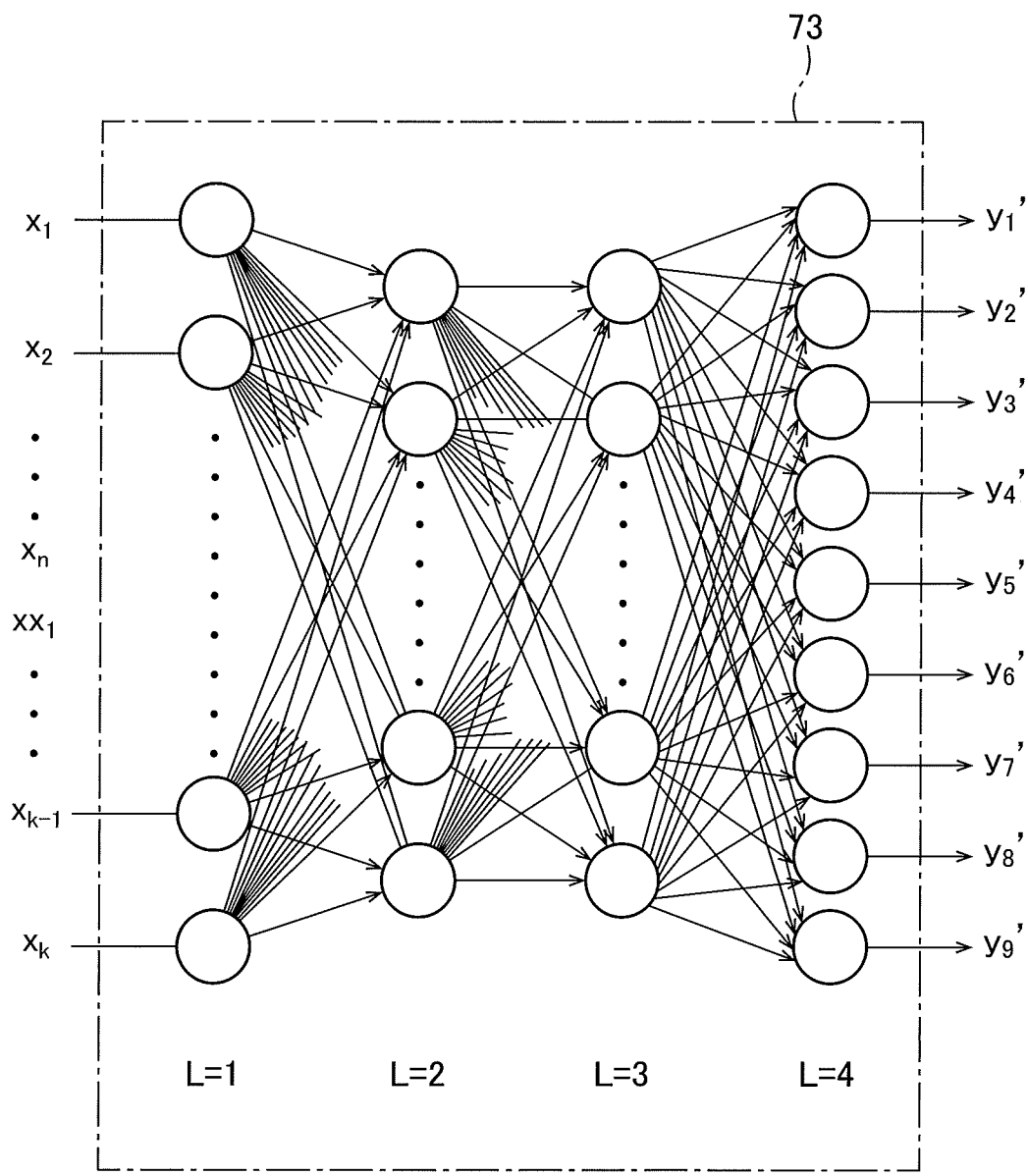
FIG. 36 is a view showing a neural network used in another example according to the present invention.

Next, at step 301, the neural network 73 such as shown in FIG. 36 is prepared based on these numbers of nodes. As will be understood from FIG. 36, in this neural network 73, the softmax layer is removed. Note that, in this case, the neural network 73 may also be provided with the softmax layer 71 such as shown in FIG. 33. Next, at step 302, the learned weights of the neural network 72 are read into the memory 22 of the electronic control unit 20. Due to this, the abnormality judgment estimation model of the fuel vapor escape prevention system is stored in the electronic control unit 20 of the commercially available vehicle.

In this embodiment as well, as the routine for detection of an abnormality of the fuel vapor escape prevention system performed at a commercially available vehicle, the routine shown in FIG. 22 is used. In this embodiment, even when using the routine shown in FIG. 22, step 400 to step 406 are no different from the content explained above, so the explanations of step 400 to step 406 will be omitted. On the other hand, regarding step 407 and on, this differs somewhat from the content explained before, so only step 407 and on will be explained in brief.

That is, at step 407, system internal pressures $x_n x_1$, $x_2 \ldots x_{n-1}$, and $x_n$ for each fixed time $\Delta t$ and input values $xx_1, xx_2 \ldots xx_{k-1}$, and $xx_k$ are input to the nodes of the input layer (L=1) of the neural network 73 shown in FIG. 36. At this time, output values $y_1'$, $y_2'$, $y_3'$, $y_4'$, $y_5'$, $y_6'$, $y_7'$, $y_8'$, and $y_9'$ are output from the nodes of the output layer of the neural network 70. Due to this, at step 408, the output values $y_1'$, $y_2'$, $y_3'$, $y_4'$, $y_5'$, $y_6'$, $y_7'$, $y_8'$, and $y_9'$ are acquired.

Next, at step 409, the largest output value $y_i'$ is selected from among the acquired output values $y_1'$, $y_2'$, $y_3'$, $y_4'$, $y_5'$, $y_6'$, $y_7'$, $y_8'$, and $y_9'$. At this time, it is estimated that the abnormal state shown in FIG. 34 corresponding to this largest output value $y_i'$ occurs. Therefore, at step 410, it is judged that the abnormal state shown in FIG. 34 corresponding to this largest output value $y_i'$ occurs and, for example, a warning light showing the abnormal state shown in FIG. 34 corresponding to the largest output value $y_i'$ occurs is turned on. Next, at step 411, the detection of an abnormality is ended.

In this way, in an abnormality detection device of a fuel vapor escape prevention system according to another embodiment of the present invention, the fuel vapor escape prevention system is provided with the canister 6 at which the fuel vapor chamber 10 and the atmospheric pressure chamber 11 are formed at the two sides of the activated carbon layer 9. The fuel vapor chamber 10 is on the one hand communicated with the inside space above the fuel level of the fuel tank 5 and is on the other hand communicated through the purge control valve 14 with the intake passage of the engine. Furthermore, the fuel vapor escape prevention system is provided with the flow path switching valve 42 able to selectively connect the atmospheric pressure chamber 11 with the atmosphere and suction pump 40. The passage 43 from the flow path switching valve 42 toward the atmospheric pressure chamber 11 and the suction passage 46 from the flow path switching valve 42 toward the suction pump 40 are connected by the reference pressure detection passage 50 having the restricted opening 51. Inside the suction passage 46 from the flow path switching valve 42 toward the suction pump 40, the pressure sensor 47 is arranged. At the time of stopping operation of the vehicle, processing for detection of an abnormality is performed generating a valve closing instruction causing the purge control valve 14 to close, a pump operation instruction making the suction pump 40 operate to make the inside of the fuel tank 5 and inside of the canister 6 a negative pressure while maintaining the switched position of the flow path switching valve 42 at a switched position where the atmospheric pressure chamber 11 is connected to the atmosphere when a predetermined time elapses after stopping operation of the vehicle, a switching instruction switching the switched position of the flow path switching valve 42 after generation of the pump operation instruction to a switched position at which the atmospheric pressure chamber 11 is connected to the suction pump 40, and a valve opening instruction making the purge control valve 14 open after the generation of the switching instruction. At the time the processing for detection of an abnormality is performed, the pressure at the inside of the fuel tank 5 and inside of the canister 6 detected by the pressure sensor 47 at every fixed time are stored in the storage device, a learned neural network learned in weights using the pressures at the inside of the fuel tank 5 and inside of the canister 6 at every fixed time stored in the storage device and at least the atmospheric pressure when the processing for detection of an abnormality is performed as input parameters of the neural network and using a case where perforation occurs in the system causing leakage of fuel vapor as a truth label is stored, and, at the time of stopping operation of the vehicle, a perforation abnormality causing fuel vapor to leak is detected from the input parameters by using the learned neural network.

In this case, in this embodiment according to the present invention, a learned neural network learned in weights using the pressures at the inside of the fuel tank 5 and inside of the canister 6 at every fixed time stored in the storage device and at least the atmospheric pressure when the processing for detection of an abnormality is performed as input parameters of the neural network and using a case where perforation occurs in the fuel vapor escape prevention system causing leakage of fuel vapor, a case where a valve opening abnormality occurs in which the purge control valve 14 continues opened, a case where a valve closing abnormality occurs in which the purge control valve 14 continues closed, a case where an abnormality occurs in the pressure sensor 47, a case where a switching abnormality occurs in which the switched position of the flow path switching valve 42 is maintained at a switched position connecting the atmospheric pressure chamber 11 to the atmosphere, a case where a switching abnormality occurs in which the switched position of the flow path switching valve 42 is maintained at a switched position connecting the atmospheric pressure chamber 11 to the suction pump 40, a case where an abnormality occurs in which the suction pump 40 continues operating, and a case where an abnormality occurs in which the suction pump 40 continues stopped as truth labels is stored, and, at the time of stopping operation of the vehicle, a perforation abnormality causing fuel vapor to leak, a valve opening abnormality of the purge control valve, a valve closing abnormality of the purge control valve, an abnormality of the pressure sensor, a switching abnormality of the flow path switching valve, and an abnormality of the suction pump are detected from the input parameters by using the learned neural network.

Furthermore, in this case, in this embodiment according to the present invention, the above-mentioned input parameters are comprised of the pressures at the inside of the fuel tank 5 and inside of the canister 6 at every fixed time stored in the storage device, the atmospheric pressure when processing for detection of an abnormality is performed, and the remaining amount of fuel in the fuel tank 5 when processing for detection of an abnormality is performed. Further, in this case, in this embodiment according to the present invention, the above-mentioned input parameters are comprised of the pressures at the inside of the fuel tank 5 and inside of the canister 6 at every fixed time stored in the storage device, the atmospheric pressure when processing for detection of an abnormality is performed, the remaining amount of fuel in the fuel tank 5 when processing for detection of an abnormality is performed, the temperature of the fuel in the fuel tank 5, and a parameter showing the capacity of the suction pump 40.

The invention claimed is:

1. An abnormality detection device of a fuel vapor escape prevention system comprising:
   a canister formed with a fuel vapor chamber and atmospheric pressure chamber at the two sides of an activated carbon layer, the fuel vapor chamber being on the one hand communicated with an inside space above a fuel level of a fuel tank and on the other hand communicated through a purge control valve with an intake passage of an engine,
   a flow path switching valve able to selectively connect the atmospheric pressure chamber to the atmosphere and a suction pump, and
   a pressure sensor detecting pressure at an inside of the fuel tank and inside of the canister, wherein
   at the time of stopping operation of the vehicle, processing for detection of an abnormality is performed to generate a valve closing instruction making the purge control valve close, a switching instruction switching a switched position of the flow path switching valve to a switched position at which the atmospheric pressure chamber is connected to the suction pump, and a pump operation instruction making the suction pump operate to make the inside of the fuel tank and inside of the canister a negative pressure,
   at the time the processing for detection of an abnormality is performed, a pressures at the inside of the fuel tank and inside of the canister detected by the pressure sensor at every fixed time are stored in a storage device,
   a learned neural network learned in weights using the pressures at the inside of the fuel tank and inside of the canister at every fixed time stored in the storage device and at least the atmospheric pressure when the processing for detection of an abnormality is performed as input parameters of the neural network and using a case where perforation occurs in the system causing leakage of fuel vapor as a truth label is stored, and
   at the time of stopping operation of the vehicle, a perforation abnormality causing fuel vapor to leak is detected from said input parameters by using the learned neural network.

2. The abnormality detection device of a fuel vapor escape prevention system according to claim 1, wherein the processing for detection of an abnormality includes processing for generating a valve opening instruction making the purge control valve open after generating a valve closing instruction of the purge control valve, a learned neural network learned in weights using the pressures at the inside of the fuel tank and inside of the canister at every fixed time stored in the storage device and at least the atmospheric pressure when the processing for detection of an abnormality is performed as input parameters of the neural network and using a case where when perforation occurs in the system causing leakage of fuel vapor, a case where a valve opening abnormality occurs in which the purge control valve continues opened, and a case where a valve closing abnormality occurs in which the purge control valve continues closed as truth labels, respectively, is stored, and, at the time of stopping operation of the vehicle, a perforation abnormality causing fuel vapor to leak, a valve opening abnormality of the purge control valve, and a valve closing abnormality of the purge control valve are detected from the input parameters by using the learned neural network.

3. The abnormality detection device of a fuel vapor escape prevention system according to claim 1, wherein the input parameters are comprised of the pressures at the inside of the fuel tank and inside of the canister at every fixed time stored in the storage device, the atmospheric pressure when the processing for detection of an abnormality is performed, and a remaining amount of a fuel in the fuel tank when the processing for detection of an abnormality is performed.

4. The abnormality detection device of a fuel vapor escape prevention system according to claim 1, wherein the input parameters are comprised of the pressures at the inside of the fuel tank and inside of the canister at every fixed time stored in the storage device, the atmospheric pressure when the processing for detection of an abnormality is performed, a remaining amount of a fuel in the fuel tank when the processing for detection of an abnormality is performed, a temperature of the fuel in the fuel tank, and a parameter showing a capacity of the suction pump.

5. An abnormality detection device of a fuel vapor escape prevention system comprising:
   a canister formed with a fuel vapor chamber and atmospheric pressure chamber at the two sides of an activated carbon layer, the fuel vapor chamber being on the one hand communicated with an inside space above a fuel level of a fuel tank and on the other hand communicated through a purge control valve with an intake passage of an engine,
   a flow path switching valve able to selectively connect the atmospheric pressure chamber to the atmosphere and a suction pump, a passage from the flow path switching valve toward the atmospheric pressure chamber and a suction passage from the flow path switching valve toward the suction pump being connected by a reference pressure detection passage having a restricted opening, and
   a pressure sensor arranged in the suction passage from the flow path switching valve toward the suction pump,
   at the time of stopping operation of the vehicle, processing for detection of an abnormality is performed to generate a valve closing instruction making the purge control valve close, a pump operation instruction making the suction pump operate to make an inside of the fuel tank and inside of the canister a negative pressure while maintaining a switched position of the flow path switching valve at a switched position where the atmospheric pressure chamber is connected to the atmosphere when a predetermined time elapses after stopping operation of the vehicle, a switching instruction switching the switched position of the flow path switching valve to a switched position at which the atmospheric pressure chamber is connected to the suction pump after generation of the pump operation instruction, and a valve opening instruction making the purge control valve open after the generation of the switching instruction,
   at the time the processing for detection of an abnormality is performed, a pressures at the inside of the fuel tank and inside of the canister detected by the pressure sensor at every fixed time are stored in a storage device,
   a learned neural network learned in weights using the pressures at the inside of the fuel tank and inside of the canister at every fixed time stored in the storage device and at least the atmospheric pressure when the processing for detection of an abnormality is performed as input parameters of the neural network and using a case where perforation occurs in the system causing leakage of fuel vapor as a truth label is stored, and, at the time of stopping operation of the vehicle, a perforation abnormality causing fuel vapor to leak is detected from said input parameters by using the learned neural network.

6. The abnormality detection device of a fuel vapor escape prevention system described in claim 5, wherein a learned neural network learned in weights using the pressures at the inside of the fuel tank and inside of the canister at every fixed time stored in the storage device and at least the atmospheric pressure when the processing for detection of an abnormality is performed as input parameters of the neural network and using a case where perforation occurs in the system causing leakage of fuel vapor, a case where a valve opening abnormality occurs in which the purge control valve continues opened, a case where a valve closing abnormality occurs in which the purge control valve continues closed, a case where an abnormality occurs in the pressure sensor, a case where a switching abnormality occurs in which the switched position of the flow path switching valve is maintained at a switched position connecting the atmospheric pressure chamber to the atmosphere, a case where a switching abnormality occurs in which the switched position of the flow path switching valve is maintained at a switched position connecting the atmospheric pressure chamber to the suction pump, a case where an abnormality occurs in which the suction pump continues operating, and a case where an abnormality occurs in which the suction pump continues stopped, respectively, as truth labels is stored, and at the time of stopping operation of the vehicle, a perforation abnormality causing fuel vapor to leak, the valve opening abnormality of the purge control valve, the valve closing abnormality of the purge control valve, an abnormality of the pressure sensor, the switching abnormality of the flow path switching valve, and an abnormality of the suction pump are detected from the input parameters by using the learned neural network.

7. The abnormality detection device of a fuel vapor escape prevention system according to claim 5, wherein the input parameters are comprised of the pressures at the inside of the fuel tank and inside of the canister at every fixed time stored in the storage device and the atmospheric pressure when the processing for detection of an abnormality is performed and a remaining amount of a fuel in the fuel tank when the processing for detection of an abnormality is performed.

8. The abnormality detection device of a fuel vapor escape prevention system according to claim 5, wherein the input parameters are comprised of the pressures at the inside of the fuel tank and inside of the canister at every fixed time stored in the storage device and the atmospheric pressure when the processing for detection of an abnormality is performed, a remaining amount of a fuel in the fuel tank when the processing for detection of an abnormality is performed, a temperature of the fuel in the fuel tank, and a parameter showing a capacity of the suction pump.

\* \* \* \* \*